US008824022B2

(12) United States Patent
Nakajima

(10) Patent No.: US 8,824,022 B2
(45) Date of Patent: Sep. 2, 2014

(54) OPTICAL SCANNING APPARATUS AND IMAGE FORMING APPARATUS

(75) Inventor: Tomohiro Nakajima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1937 days.

(21) Appl. No.: 10/941,849

(22) Filed: Sep. 16, 2004

(65) Prior Publication Data

US 2005/0062836 A1 Mar. 24, 2005

(30) Foreign Application Priority Data

Sep. 18, 2003 (JP) ................................ 2003-326836
Mar. 1, 2004 (JP) ................................ 2004-056771

(51) Int. Cl.
*H04N 1/04* (2006.01)
*H04N 1/46* (2006.01)

(52) U.S. Cl.
USPC ............................ 358/474; 358/494; 358/505

(58) Field of Classification Search
USPC .......... 358/474, 505, 500, 400, 494; 347/261, 347/243, 232, 222, 233, 224, 171
See application file for complete search history.

(56) References Cited

U.S. PATENT DOCUMENTS 4,853,710 A 8/1989 Shimada et al.
4,869,582 A 9/1989 Nakajima et al.
4,932,732 A 6/1990 Nakajima
4,953,171 A 8/1990 Nakajima et al.
5,018,806 A 5/1991 Nakajima
5,063,409 A 11/1991 Nakajima
5,128,699 A 7/1992 Nakajima et al.
5,532,777 A * 7/1996 Zanen ........................... 396/326
5,594,537 A * 1/1997 Hasegawa ..................... 399/318
5,633,744 A 5/1997 Nakajima
5,671,077 A 9/1997 Imakawa et al.
5,753,907 A 5/1998 Nakajima et al.
5,786,594 A 7/1998 Ito et al.
5,793,408 A * 8/1998 Nakajima ..................... 347/259
5,805,933 A * 9/1998 Takahashi ........................ 710/72
5,913,083 A * 6/1999 Allen ............................ 396/176
5,926,203 A 7/1999 Shimura et al.
5,936,756 A 8/1999 Nakajima (Continued)

FOREIGN PATENT DOCUMENTS

JP 58-194046 11/1983
JP 63-43172 2/1988

(Continued)

OTHER PUBLICATIONS

U.S. Appl. No. 11/520,807, filed Sep. 14, 2006, Nakajima.

(Continued)

*Primary Examiner* — Ming Hon
(74) *Attorney, Agent, or Firm* — Oblon, Spivak, McClelland, Maier & Neustadt, L.L.P.

(57) ABSTRACT

An optical scanning apparatus includes an optical source, a deflection part deflecting an optical beam emitted from the optical source, plural optical elements directing or focusing the optical beam deflected by the deflection part to corresponding one of plural image carrying bodies, a holding member holding the plural optical elements, wherein the optical beam scans the respective image carrying bodies in a main scanning direction, and wherein the holding member includes a pair of holding member elements disposed so as to face each other in the main scanning direction, and the plural optical elements are held between the pair of holding member elements in a bridged state.

20 Claims, 29 Drawing Sheets

(56) References Cited

U.S. PATENT DOCUMENTS

| | | | | |
|---|---|---|---|---|
| 5,999,345 | A | 12/1999 | Nakajima et al. | |
| 6,052,211 | A | 4/2000 | Nakajima | |
| 6,091,534 | A | 7/2000 | Nakajima | |
| 6,236,820 | B1 | 5/2001 | Nakazato et al. | |
| 6,384,950 | B1 * | 5/2002 | Saito et al. | 359/196 |
| 6,400,917 | B2 | 6/2002 | Nakazato et al. | |
| 6,466,754 | B2 | 10/2002 | Nakazato et al. | |
| 6,571,073 | B1 * | 5/2003 | Suzuki et al. | 399/116 |
| 6,580,887 | B2 | 6/2003 | Nakazato et al. | |
| 6,593,951 | B2 * | 7/2003 | Yokoyama et al. | 347/138 |
| 6,621,512 | B2 | 9/2003 | Nakajima et al. | |
| 6,657,765 | B2 * | 12/2003 | Hayashi et al. | 359/225 |
| 6,690,404 | B2 | 2/2004 | Shimada et al. | |
| 6,697,588 | B2 | 2/2004 | Nakazato et al. | |
| 6,760,557 | B2 | 7/2004 | Nakazato et al. | |
| 6,768,886 | B2 | 7/2004 | Nakazato et al. | |
| 6,775,041 | B1 | 8/2004 | Nakajima | |
| 6,917,779 | B2 * | 7/2005 | Fujimori et al. | 399/258 |
| 7,170,660 | B2 * | 1/2007 | Nakajima | 358/505 |
| 2001/0017689 | A1 * | 8/2001 | Iwaki | 355/18 |
| 2002/0171878 | A1 * | 11/2002 | Nakajima | 358/505 |
| 2003/0234990 | A1 * | 12/2003 | Akanuma | 359/819 |
| 2004/0017469 | A1 * | 1/2004 | Itabashi | 347/245 |

FOREIGN PATENT DOCUMENTS

| | | |
|---|---|---|
| JP | 63-73277 | 4/1988 |
| JP | 2-272518 | 11/1990 |
| JP | 06-202018 | 7/1994 |
| JP | 2536711 | 2/1997 |
| JP | 10-133130 | 5/1998 |
| JP | 11-002767 | 1/1999 |
| JP | 11-153765 | 6/1999 |
| JP | 11-326804 | 11/1999 |
| JP | 2000-275559 | 10/2000 |
| JP | 2001-88351 | 4/2001 |
| JP | 2001-215428 | 8/2001 |
| JP | 2001-296494 | 10/2001 |
| JP | 2002-127497 | 5/2002 |
| JP | 2002-148551 | 5/2002 |
| JP | 2002-169353 | 6/2002 |
| JP | 2002-189324 | 7/2002 |
| JP | 2002-311363 | 10/2002 |
| JP | 2002-311369 | 10/2002 |
| JP | 2003-140071 | 5/2003 |
| JP | 2003-195206 | 7/2003 |

OTHER PUBLICATIONS

U.S. Appl. No. 12/028,446, filed Feb. 8, 2008, Nakamura, et al.

U.S. Appl. No. 12/051,404, filed Mar. 19, 2008, Amada, et al.

* cited by examiner

OPTICAL SCANNING APPARATUS AND IMAGE FORMING APPARATUS

BACKGROUND OF THE INVENTION

The present invention relates to an optical scanning apparatus used in an image forming apparatus such as a copying machine, facsimile, printer, and the like, and also to an image forming apparatus having such an optical scanning apparatus. Particularly, the present invention relates to an optical scanning apparatus and an image forming apparatus used for forming a color image by superimposing toner images of plural colors.

In an image forming apparatus that uses a Carlson process, electrostatic latent images are formed on a rotating photosensitive drum used as an image carrier, and development and transfer of the electrostatic latent images are carried out subsequently. In order to carry out such formation of the electrostatic latent images, the image forming apparatus is equipped with an optical scanning apparatus that irradiates an optical beam on the surface of the photosensitive drum in the form of a laser beam according to the image information to be recorded.

In order to obtain high-quality images in such an image forming apparatus, it is necessary to scan the photosensitive drum by the optical beam, which is produced by an optical scanning apparatus, with high precision.

Particularly, in the case the image forming apparatus is a multicolor image forming apparatus that forms color images by arranging plural photosensitive drums in a feeding direction of the image transfer body in the form of plural image-forming stations of respective colors, such that toner images of the respective colors formed in such image-forming stations are superimposed on the image transfer body, there easily occurs degradation of image quality such as color misalignment or incorrect color, unless the irradiation position, and hence the scanning position, of the optical beam is aligned exactly in each of the plural photosensitive drums. Thus, an optical scanning apparatus is required to scan the photosensitive drum with the optical beam exactly.

Further, in the case there exists a variation in the duration between the formation of the electrostatic latent images and the transferring of the toner images to the transfer body or there exists a variation in the spacing between the photosensitive drums of different colors as a result of decentering of the photosensitive drums or as a result of the diametric variation of the photosensitive drums, or in the case there exists a variation in the moving speed or meandering in any of the toner image transfer body, which may be a toner image transfer belt, or a transportation belt that transports the recording sheet, there arises the problem of degradation of the image quality such as color misalignment or wrong color caused by the register error of the toner images of the respective colors.

Conventionally, such register error has been compensated for, irrespective of whether it is caused by the optical scanning apparatus or by other reasons, by detecting the sub-scanning position periodically between the image formation jobs by using a register error detection pattern recorded on the toner image transfer body, and by aligning the timing of the start of writing, such that the start line position of recording is aligned on the toner image transfer body (Patent Reference 1 or Patent Reference 2).

Further, there is proposed a process of compensating for a skew of the scanning line on a photosensitive drum in the Patent Reference 3 by tilting a reflection mirror extending in the scanning direction of the optical beam and used for reflecting the scanning optical beam toward the photosensitive drum, about an end point thereof. Further, there is proposed a process of compensating for a skew of the scanning line in the Patent Reference 4 by tilting a scanning lens.

With regard to the problem of curve of the scanning line caused by the error at the time of manufacturing of the scanning lens or misalignment of the scanning lens, the Patent Reference 5 teaches the use of rectification of the scanning lens, which has the lens power in the sub-scanning direction, at the time of manufacturing of the image forming apparatus.

Particularly, it is very important for the recording of high-quality color images in the optical scanning apparatus that includes plural optical elements such as lenses and mirrors in addition to the optical source such that the optical beam produced by the optical source scans the photosensitive drum after being processed by such plural optical elements, in that such plural optical elements are aligned exactly and exact scanning of the optical beam is made over the photosensitive drum.

Thus, it has been practiced conventionally in the multicolor image forming apparatus according to the Patent Reference 7 or Patent Reference 8 to scan the optical beams from the optical sources of the respective colors simultaneously by using a single polygonal mirror and provide cooperating plural deflection mirrors such that the optical beams of the respective colors are directed to the corresponding photosensitive drums. Thereby, in order to hold the foregoing plural deflection mirrors with high precision such that exact scanning is made in each of the photosensitive drums of the respective colors, there is proposed a construction that holds these deflection mirrors on a common housing of the optical scanning apparatus.

Further, with regard to the multicolor image forming apparatus, the Patent Reference 9 or Patent Reference 10 discloses the construction in which an optical unit is provided for each of the multiple colors and hold the optical units on a common side plate frame with positioning for maintaining the mutual positional relationship between the scanning lines of the respective colors.

In the multicolor image forming apparatuses of the type in which plural image formation stations of respective colors are disposed along the transportation direction of the toner image transfer body for superimposing color toner images thereon, it is thus necessary to align the positions of the color toner images transferred from the respective photosensitive drums to the toner image transfer body exactly for avoiding color misalignment or recording of wrong color images. Further, deviation of the scanning position causes also the degradation of images even in the case of carrying out formation of monochromatic images.

Thus, in the conventional optical scanning apparatuses, it has been practiced to increase the rigidity of the housing of the optical scanner by using a metal plate for this purpose or by forming the optical scanner housing by using die-cast aluminum, as disclosed in the Patent Reference 6, so as to avoid deviation of the scanning position caused by mechanical vibration or for to enable high-precision positioning.

REFERENCES

Japanese Patent Publication 7-19084
Japanese Patent Publication 7-19085
Japanese Laid-Open Patent Application 10-13310
Japanese Laid-Open Patent Application 11-153765
Japanese Laid-Open Patent Application 2002-148551
Japanese Laid-Open Patent Application 2002-311369
Japanese Utility Model 2,536,711
Japanese Laid-Open Patent Application 2002-127497

Japanese Laid-Open Patent Application 2002-169353
Japanese Laid-Open Patent Publication 2003-195206

As explained heretofore, it is necessary, in the multicolor image forming apparatus that includes plural image formation stations aligned in the transportation direction of the toner image transfer body for superimposing color toner images thereon, that the toner images of the respective colors transferred thereto from the photosensitive drums of the respective colors are aligned exactly.

However, conventional optical scanning apparatuses such as the one disclosed in the Patent Reference 5 have suffered from the problem of misalignment of irradiation positions on the respective photosensitive drums because of the use of the resin housing, which allows the deflection mirrors held thereon to change the relative positions or angles thereof with the change of the environmental condition. Thereby, there occurs the problem of register error as a result of change of the time for reaching from the irradiation position to the transfer position, in which transfer of the toner image is made from the photosensitive drum to the toner image transfer body.

Because of this, variation of the beam irradiating position on the photosensitive drum is inevitable, even when the beam irradiation position is adjusted for different image formation stations by detecting the register error between the jobs, in the case the number of printing in each job is increased and there occurs temperature increase during the job.

Of course, it is possible to interrupt the printing during the job and apply a correction. However, detection of the register error requires recording of a detection pattern on the image transfer body, and the apparatus cannot perform the recording operation during such an adjustment process. Thereby, there appears a long waiting time for printing, and the efficiency of printing operation is seriously deteriorated. Further, such increased adjustment process increases the consumption of toner. Thus, it is preferable to suppress the number of such adjustment process as much as possible.

Particularly, with increased interval between the image formation stations, it becomes necessary to increase the size of the housing of the optical scanning apparatus, while such an increase in the size of the optical scanning apparatus tends to invite occurrence of deformation of the housing. Further, it becomes difficult to form the housing with sufficient precision. Further, there arises the problem that the housing has to be formed by using a bulky material of increased thickness, while the use of such a bulky material increases the weight and the cost.

Conventionally, the components forming the optical scanning apparatus have been mounted on the top surface and bottom surface of the bottom plate of the housing. However, the bottom surface of the scanner housing is a simple flat plate of large size and includes an elongated opening in the scanning direction of the optical beam for exiting the optical beam deflected by the polygonal mirror toward the photosensitive drum. Thereby, such a bottom surface is susceptible for vibration.

Contrary to this, there is proposed a method of using a metal component such as a die-cast aluminum material for the housing of the optical scanning apparatus. However, such a use of die-cast aluminum material requires high-precision machining at the contacting surface of the components to be mounted thereon, and the productivity of the optical scanning apparatus is deteriorated seriously. Further, there arises a problem of increased cost.

Further, there is a proposal of using a metal plate for the housing of the optical scanning apparatus as proposed in the Patent Reference 6. However, the use of a metal plate for entire housing of the optical scanning apparatus raises the problem that it requires a complex structure for supporting the optical sources and the scanning lenses of the optical scanning apparatus provided in correspondence to the plural image formation stations. Thus, there occurs an increase of manufacturing steps, and assembling of the image forming apparatus becomes complicated.

SUMMARY OF THE INVENTION

Accordingly, it is a general object of the present invention to provide a novel and useful optical scanning apparatus and an image forming apparatus wherein the foregoing problems are eliminated.

Another object of the present invention is to provide an optical scanning apparatus for use in an image forming apparatus such as a copying machine, a facsimile machine, a printer, and the like, capable of being formed with compact size with low cost and capable of suppressing error in the scanning position of the optical beam over an extended time period.

Another object of the present invention is to provide an image forming apparatus using such an optical scanning apparatus and capable of suppressing color misalignment or wrong color and capable of forming high-quality images.

Another object of the present invention is to provide an optical scanning apparatus comprising:

an optical source;

a deflection part deflecting an optical beam exited from said optical source;

a plurality of optical elements guiding and/or imaging said optical beam deflected by said deflection part on respective image carriers; and a holding part that holds said plural optical elements thereon, said optical beam causing a scanning over said respective image carriers in a main scanning direction thereof;

said holding part comprising a pair of holding members disposed so as to face with each other in said main scanning direction;

said plural optical elements being held between said pair of holding members in a bridging manner.

According to the present invention, it becomes possible to suppress the occurrence of color misalignment in the images thus formed even in the case the interval between the image formation stations is large while eliminating the need of increasing the rigidity of the housing of the optical scanning apparatus or the need of increasing the thickness of the housing, by merely holding the optical elements of the respective image formation stations while using the pair of holding members commonly. Thus, according to the present invention, it becomes possible to suppress the cost of the optical scanning apparatus by saving the material used therefor.

Further, according to the present invention, the housing accommodating the optical source and the deflection part is held separately between the foregoing pair of the holding members with respect to the plural optical elements disposed in correspondence to the image forming stations of the respective colors and held also between the foregoing pair of the holding members. With this construction, the part accommodated in the housing can be used commonly for various image forming apparatuses of different designs. Further, the image forming apparatus using such an optical scanning apparatus can be formed to have a compact size.

Further, according to the present invention, there are provided plural compartmenting members, each having an opening for causing said optical beam to exit to a corresponding image carrier selectively, in such a manner that the plural compartmenting members are bridged across the foregoing pair of holding members. With this construction, it becomes possible to suppress the leakage of ghost light that may be caused by optical scattering to the image carrier or contamination of the mirrors caused by the toner particles scattered from the image carrier, even in the case of using an open construction for the housing, and thickness or concentration of the images is maintained stably.

Further, according to the present invention, it becomes possible to determine the position of the reflection surfaces of the optical elements with high precision by forming the foregoing holding members by a metal plate having cutout openings and by holding the optical elements on the holding members in the state that the reflection surfaces of the optical elements engage with the corresponding cutout openings. Thereby, the problem of variation of the optical beam position on the photosensitive drum is eliminated and stable color image formation becomes possible.

Further, according to the present invention, in which the optical source includes plural light emission elements producing respective optical beam elements as the optical beam such that the optical beam elements are incident to the respective, corresponding image carriers, it becomes possible to maintain the relative positional relationship for the optical beams for the plural image forming stations even when there is caused a change of refractive index or curvature in the optical elements as a result of environmental change, by constructing the deflection part such that the deflection part includes an optical element provided commonly to the foregoing plural optical beam elements. With such a construction, the direction of the optical beam elements change similarly in the foregoing different image forming stations. With this, register error of the images is suppressed, and it becomes possible to form stabilized color images over a prolonged duration.

Further, according to the present invention, there are provided a plurality of imaging elements that focus the optical beams to be directed to the respective, corresponding image carriers in the plane parallel to the sub-scanning direction perpendicular to the main scanning direction, such that the imaging elements are held afloat in a space when viewed in the cross-sectional diagram taken along the sub-scanning direction, similarly to the case of the optical elements, by holding the imaging elements in a bridging manner across the foregoing pair of holding members. By doing so, it becomes possible to design the optical scanning apparatus such that the optical beam passes any of above or below of each optical element. Thereby, the constraint imposed on the layout of the optical beam paths in the conventional optical scanning apparatuses is reduced in the present invention as in the conventional case of providing the imaging elements on the bottom surface of the optical scanner housing. Because of this, the optical scanning apparatus of the present invention can easily adapted to the change of design of the image forming apparatus such as the case in which the interval between the image forming stations is changed, by merely replacing the sidewall plates used for the holding members. Thereby, the cost of the optical scanning apparatus is reduced.

Further, according to the present invention, it becomes possible to adjust the scanning lines formed in the image forming stations of the respective colors by the optical beams, by holding each imaging element on the holding members such that one end of the imaging element is held on one of the holding members and the other end is held on the other holding member movably on a supporting member that is rotatable in the plane perpendicular to the optical axis of the optical beam. As a result, it becomes possible to correct a deviation of rotational axes of the image carriers from parallelism, and the register error is reduced. Thereby, high quality color image formation is achieved.

Further, according to the present invention, it becomes possible to compensate for the curve of the scanning lines formed in the image formation stations by the optical beam, by providing a warp rectification mechanism on the foregoing supporting member such that the warp of the imaging element held thereon is rectified at least in the sub scanning direction. For example, it becomes possible to compensate for the curve of the scanning lines caused by the warp of the imaging element itself or by the misalignment of the imaging elements, and it becomes possible to achieve high quality color image formation by suppressing the register error.

Further, according to the present invention, the optical source and the deflection part are accommodated in a housing and the housing is held between the pair of holding members forming the holding part in such a manner that a part of the housing is located outside the region defined by the foregoing holding members. With this construction, it becomes possible to reduce the size of the optical scanning apparatus supporting the optical elements in the main scanning direction as compared the interval between the holding members facing each other in the main scanning direction. Thereby, a compact and low cost optical scanning apparatus is obtained. Further, with such a construction, vibration of the optical elements such as banding is reduced, and it becomes possible to suppress the deviation of the beam scanning position caused with such a vibration. Further, the scanning position is maintained with high precision for prolonged durations, and formation of high quality images becomes possible.

Further, by constructing the foregoing housing in a detachable manner in the main scanning direction with respect to the holding members, it becomes possible to improve the productivity and easiness of maintenance of the image formation apparatus that uses such an optical scanning apparatus.

Further, by constructing the optical scanning apparatus such that the foregoing housing is positioned as a result of the engagement of the housing with the holding members in the main scanning direction, the vibration of the optical elements is suppressed, and deviation of the optical beams on the image carrier is suppressed. Thereby, high precision optical scanning is achieved stably over a prolonged duration, and high quality image formation becomes possible.

Further, according to the present invention, connection of wiring harness to the optical source is facilitated substantially by constructing the optical scanning apparatus such that the optical source is located outside the foregoing region in the state the housing is mounted on the holding members. Thereby, operability of assembling the optical source is improved, and the easiness of maintenance and productivity of the image formation apparatus are improved with the use of such an optical scanning apparatus.

Another object of the present invention is to provide an image forming apparatus comprising:

an optical source;

a deflection part deflecting an optical beam exited from said optical source;

a plurality of image carriers written with an electrostatic latent image by said optical beam from said optical source;

a plurality of developing units developing said electrostatic latent images at said respective image carriers, such that toner images are formed on said respective image carriers with colors corresponding to said image carriers; and a transfer unit transferred with said toner images of said respective colors consecutively at said plural developing units, said toner unit transferring said toner images of said respective colors on a sheet;

said image forming apparatus further comprising an optical scanning unit, comprising:

a plurality of optical elements respectively imaging said optical beam deflected by said deflecting part on said corresponding image carriers; and a holding part holding said plural optical elements, said optical scanning unit causing said optical beam to scan over each of said image carriers in a main scanning direction, said holding part comprising a pair of holding members facing with each other in said main scanning direction, said plural optical elements being held by said holding members in a manner bridging across said holding members, said holding members further holding said plural image carriers therebetween such that each of said image carriers bridges across said pair of holding members.

According to the present invention, it becomes possible to align the image carriers at the time of replacement of the same, and the problem of deviation of the beam irradiation position on the image carriers is avoided. Thus, the register error is held minimum and stable color image formation becomes possible for a prolonged time period.

Further, as a result of the construction in which each of the holding members forming the holding part is provided with a bearing member that determines the position of the bearing parts of the plural image carriers media, it becomes possible to align the relative positions of the image carriers exactly at the time the image carriers are replaced. Thereby, it should be noted that positioning of the optical scanning apparatus with respect to the image carriers in the cross section taken parallel to the sub scanning direction is achieved for the same holding members, and the relative positional relationship of the image carriers is maintained positively. With this, the resister error is reduced and high quality color image formation becomes possible.

Further, according to the present invention, it becomes possible to construct the image formation apparatus to have a compact size by accommodating the optical source and the deflection part in a housing and holding the housing between the pair of holding members.

Further, according to the present invention, it becomes possible to transfer the electrostatic latent images, of which formation is started in the image formation stations of the respective colors generally simultaneously, to the image transfer body at the respective transfer positions also generally simultaneously, by providing a beam position adjustment mechanism that adjusts the beam position on the image carrier for each of the image carriers and by adjusting the beam position adjustment mechanism such that the phase of the toner images transferred to the toner image transfer body are aligned. Thereby, it becomes possible to suppress the register error by merely setting the write start timing in correspondence to the interval of the image carriers determined by the holding members, and high quality image formation becomes possible stably for a prolonged time.

Further, according to the present invention, it becomes possible to adjust the time needed for a toner image formed at an arbitrary image formation station to reach the transfer position of the next image formation station, by adjusting the distance between the bearing parts of the image carriers to be equal to a multiple integer of the duration for the image carrier to make a one full rotation. With this, the toner images are superimposed on the toner image transfer body with exactly the same positional relationship by way of the plural image carriers, and a stable color image formation can be achieved for each rotation of the image carriers.

BRIEF DESCRIPTION OF THE DRAWINGS

FIG. 5A is an enlarged cross-sectional view showing the overall construction of the support part of the reflection mirror, while

FIG. 10A is an enlarged view diagram showing the relationship between the focus line and the sub scanning direction while

FIG. 13A is an oblique view diagram showing the assembling state of the optical axis changing means while

DETAILED DESCRIPTION OF THE INVENTION

In one mode of the present invention, there is provided an optical scanning apparatus usable for an image forming apparatus of the tandem construction having plural image forming stations for formation of respective different color images and providing high positional precision for the scanning lines in each of the foregoing image forming stations, by using a low cost but rigid metal plate for the side plate members used for supporting the deflection mirrors such that the optical beams are directed to the respective photosensitive drums constituting the image carrier by way of such deflection mirrors. As a result of such a construction, the problem of unwanted size increase of the housing of the optical scanning apparatus with the use thereof in the image forming apparatus having plural image forming stations, is successfully eliminated.

Further, with the construction that gathers together those components of the respective image forming stations used with the optical beam before the optical beam is divided into the optical beams corresponding to the photosensitive drums into the housing of the optical scanning apparatus and holding those components of the respective image forming stations used with the optical beam after it is divided into the optical beams for the respective image forming stations, between the side plates, it becomes possible to eliminate the resource wasting process of redesigning the housing of the optical scanning apparatus each time the distance between the image forming station is changed. With the present construction, only the side plates are needed to be redesigned. Thus, the present invention can attend to the change of design flexibly, and the image forming apparatus of the tandem type is produced with high efficiency.

Further, the present invention provides an image forming apparatus of the tandem type in which the positional relationship between the beam irradiation position and the photosensitive drum corresponding thereto for each of the image forming stations and also the positional relationship between the plural image forming stations, are held stably and invariably even when the photosensitive drums are replaced.

Hereinafter, various embodiments of the present invention will be explained with reference to the drawings.

Figure 1:
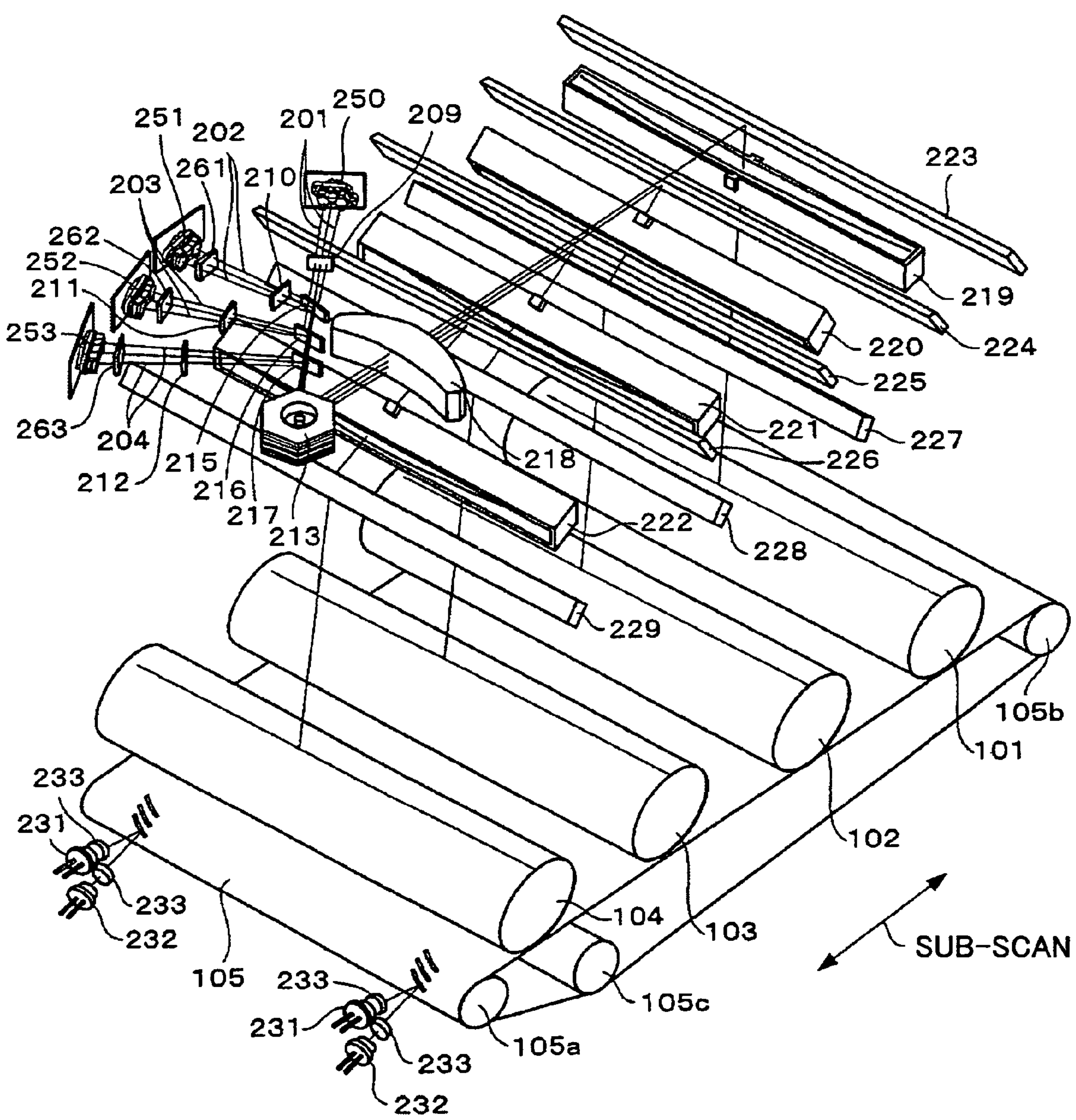
FIG. 1 is an oblique view diagram showing the general construction of the optical scanning system and image formation station of the present invention.
Figure 2:
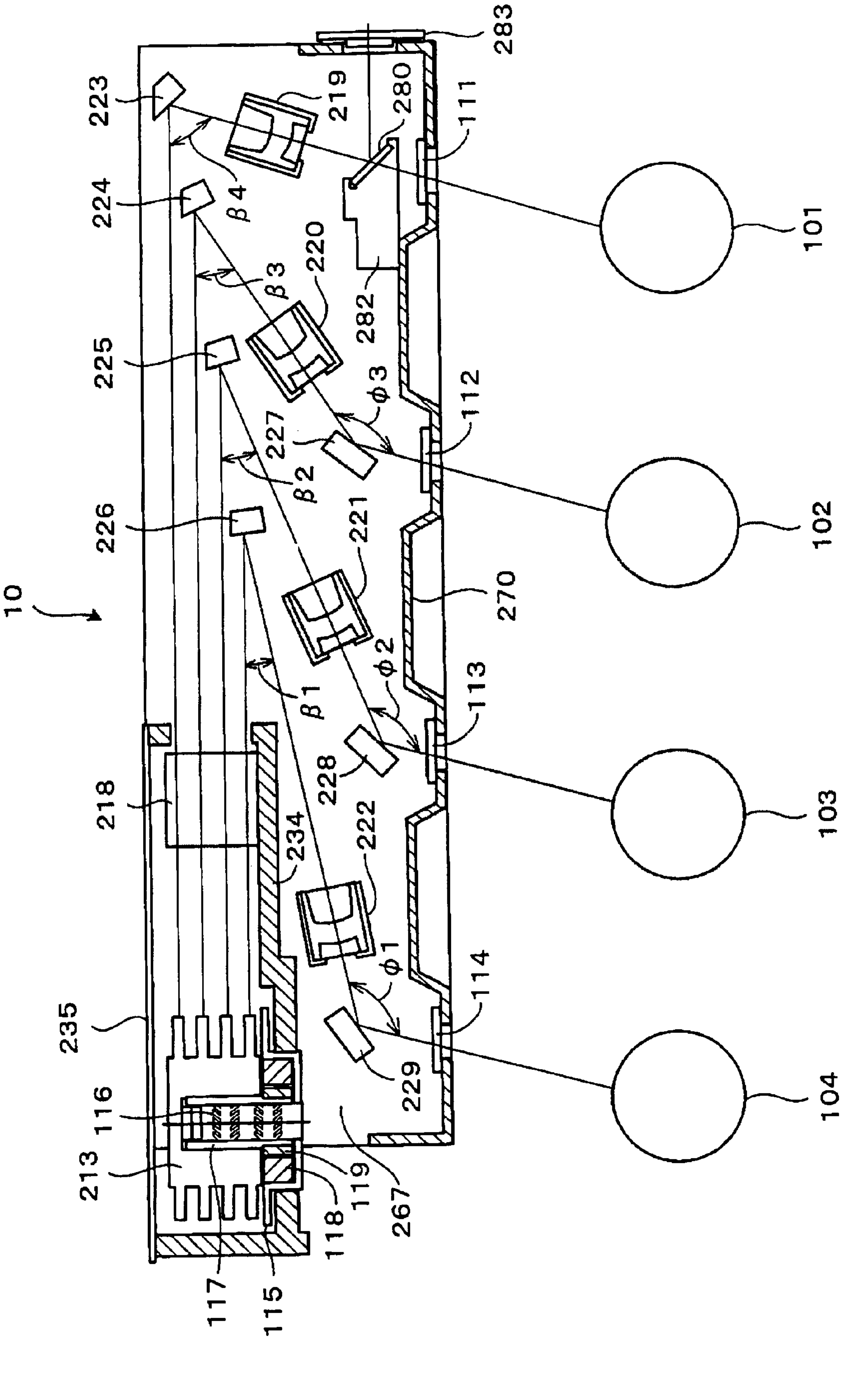
FIG. 2 is a cross-sectional diagram showing the schematic construction of the optical scanning apparatus according to an embodiment of the present invention.

FIG. 1 shows the schematic construction of an optical system used in an image forming apparatus in which plural (four) image forming stations respectively including four photosensitive drums 101, 102, 103 and 104 as the major constituent elements are disposed in one direction, while FIG. 2 shows the construction of an optical scanning apparatus 10 used with such an image forming apparatus.

The image forming apparatus arranges the foregoing four photosensitive drums 101, 102, 103 and 104 in the moving direction of an image transfer belt 105 disposed underneath the photosensitive drums as the image transfer medium, and color images are formed by transferring toner images of different colors consecutively to the foregoing transfer belt 105.

In the image forming apparatus of the present invention, the optical scanning apparatuses used for writing of electrostatic latent images upon respective photosensitive drums 101, 102, 103 and 104 are integrated, and thus, plural optical beams 201, 202, 203 and 204 respectively produced by optical sources 250, 251, 252 and 253 used as plural optical source means are deflected by the same facet of a polygonal mirror 213 used as a single deflection means in the same direction. Thereby, the optical beams 201, 202, 203 and 204 scan over the respective photosensitive drums 101, 102, 103 and 104. In the present embodiment, a pair of laser diodes are disposed for each of the photosensitive drums such that two scans are made simultaneously with an offset of one line pitch in the sub scanning direction according to the recording density.

The optical beams 201, 202, 203 and 204 of the respective optical sources are formed to have respective beam paths different in the sub scanning direction.

In the present embodiment, the optical source 250 produces the optical beams with the highest position, and the height of the beam position is decreased consecutively in the optical source unit 251, optical source unit 252 and the optical source unit 253. Thus, with regard to the optical sources 250, 251, 252 and 253, it should be noted that the optical source 250 is located at the farthest position from the bottom surface of the housing 234 and the optical source 253 is located closest to the bottom housing bottom surface.

With regard to the main scanning direction, the optical beams are directed to the deflection point on the rotating polygonal mirror 213 in a radial pattern, such that the optical path from the optical source to the foregoing deflection point of the polygonal mirror 213 becomes equal for each of the optical sources.

Further, cylindrical lenses 209, 210, 211 and 212 are provided for the imaging means such that each cylindrical lens has a shape defined by a flat surface at one side and a curved surface curving in the sub scanning direction the at the other side, wherein the curvature is the same for all of the cylindrical lenses 209, 210, 211 and 212. Thereby, the cylindrical lenses are disposed also that the optical path length to the deflection point on the polygonal mirror 213 becomes equal for all of the lenses 209, 210, 211 and 212. Thus, the optical beams are focused at the deflection facet of the polygonal mirror 213 to form a line in the sub scanning direction thereon, and there is formed an optical face tangle error correction system for laser scanning system such that the deflection point and the photosensitive drum surface become conjugate in the sub scanning direction by combining a toroidal lens to be described later.

Further, there are disposed non-parallel plates 261, 262 and 263 respectively between the optical source 251 and the cylindrical lens 210, the optical source 252 and the cylindrical lens 211, and the optical source 253 and the cylindrical lens 212, wherein it should be noted that the non-parallel plates 261, 262 and 263 are formed of a glass plate having one of the surfaces tilted slightly in the main scanning direction or sub scanning direction. It should be noted that the non-parallel plates 261, 262 and 263 are disposed to the stations other than the one for the reference color (beam path of the beams other than the beam from the optical source 250) and achieve fine adjustment of the sub scanning position and correct register error of the respective colors in the sub scanning direction as will be explained later.

Further, there are disposed plural reflection mirrors 215, 216 and 217 as the beam merging means in such a manner that the mirrors provides a more acute reflection angle as the beam reflection position at the beam merging means is located closer to the deflection point. The reflection mirrors 215, 216 and 217 are disposed such that the position thereof from the polygonal mirror 213 increases with this order, and with this, the optical path length from the reflection point to the light emission point of the optical source is changed. Thereby, the optical sources do not overlap with each other and the problem of interference of the printed circuit boards carrying the optical sources is eliminated.

In the present embodiment, the optical beam from the optical source 250 is directed straight to the polygonal mirror 213 without being reflected by a reflection mirror. Of course, it is possible to reflect this optical beam also similarly to other optical beams by providing a reflection mirror.

It should be noted that each of the reflection surfaces have a different height, and thus, the optical beam from the optical source 250 reaches the polygonal mirror 213 along a path passing above the foregoing reflection mirrors. On the other hand, the optical beam from the optical source 251 is reflected by the reflection mirror 215 and approaches the optical path of the optical beam from the optical source 250. Thereby, the optical beam is directed to the polygonal mirror 213 after passing above the reflection mirrors 216 and 217. Further, the optical beam from the optical source 252 is reflected by the reflection mirror 216 and approaches the optical beam from the optical source 250, wherein the optical beam thus reflected is directed to the polygonal mirror 213 after passing above the reflection mirror 217.

Thus, the optical beams of the optical sources are directed to the polygonal mirror 213 in alignment with the main scanning direction one by one starting from the optical beam from the farthest optical source 250.

It should be noted that each of the optical beams are emitted from the corresponding laser diode used for the optical source generally parallel in the sub scanning direction with a uniform interval of 5 mm (L=5 mm) in the present example and the optical beams it the reflection surface of the polygonal mirror 213 perpendicularly while maintaining this interval L. Because it is difficult to dispose the optical sources including the laser diodes and associated coupling lenses with such a small interval vertically (sub scanning direction), the optical sources are disposed with offset in the main scanning direction.

The polygonal mirror 213 is formed to have a substantial thickness in the axial direction thereof and carries six facets on the circumferential surface thereof in the present example, wherein the polygonal mirror 213 is further formed with grooves on its circumferential surface so as to cut slightly into the part of the polygonal mirror 213 inside an inscribed circle for reducing the aerial resistance. Thereby, the polygonal mirror 213 has an appearance that plural mirrors are stacked in the axial direction thereof each with the thickness of about 2 mm.

Further, there is provided a fθ lens 213 as the imaging means of the optical beams, wherein the fθ lens 213 is provided commonly to the foregoing optical beams from the optical sources 250-253. The fθ lens 213 is formed to have a substantial thickness in the sub scanning direction of the optical beams and has no power of optical convergence in the sub scanning direction.

On the other hand, the fθ lens 218 has a non-arc form in the main scanning direction so as to have a converging power such that each optical beam moves over the surface of the corresponding photosensitive drum with a uniform speed with the rotation of the polygonal mirror 213. Thereby, the fθ lens 218 cooperates with the toroidal lenses 219, 220, 221 and 222 provided in correspondence to the respective optical beams and constituting the image forming means having the function of optical face tangle error correction for laser scanning system and focuses the respective optical beams on the respective photosensitive surfaces in the form of an optical beam spot.

With such a construction, the optical scanning means recording four electrostatic latent images simultaneously is obtained.

In such optical scanning means, there are provided plural reflection mirrors for directing the optical beams deflected by the polygonal mirror 213 to the respective, corresponding photosensitive drums disposed with a uniform interval, such that the optical path length from the polygonal mirror to the photosensitive drum agrees with each other for each of the optical beams and such that the optical beams hit the respective, corresponding photosensitive drums at the same incident position with the same incident angle.

With regard to the optical beams exiting from the optical scanning means, an optical beam 201 from the optical source 250 is deflected by the uppermost layer of the polygonal mirror 213 and is directed to the photosensitive drum 101 by a mirror 223 after passing through the fθ lens 218 and thereafter passing through a toroidal lens 219. Thereby, a yellow image is formed on the photosensitive drum 101. The polygonal mirror 213, the fθ lens 218, the reflection mirror 223 and the toroidal lens 219 constitute the first optical scanning means.

On the other hand, an optical beam 202 from the optical source 251 is deflected by the second layer of the polygonal mirror 213 and is directed to the photosensitive drum 102 by a mirror 224 after passing through the fθ lens 218 and thereafter passing through a toroidal lens 220. Thereby, a magenta image is formed on the photosensitive drum 102. The polygonal mirror 213, the fθ lens 218, the reflection mirror 224 and the toroidal lens 220 constitute the second optical scanning means.

Further, an optical beam 203 from the optical source 252 is deflected by the third layer of the polygonal mirror 213 and is directed to the photosensitive drum 103 by a mirror 225 after passing through the fθ lens 218 and thereafter passing through a toroidal lens 221. Thereby, a cyan image is formed on the photosensitive drum 103. The polygonal mirror 213, the fθ lens 218, the reflection mirror 225 and the toroidal lens 221 constitute the third optical scanning means.

Further, an optical beam 204 from the optical source unit 253 is deflected by the lowermost layer of the polygonal mirror 213 and is directed to the photosensitive drum 104 by the mirror 226 after passing through the fθ lens 218 and thereafter passing through a toroidal lens 222. Thereby, a black image is formed on the photosensitive drum 104. The polygonal mirror 213, the fθ lens 218, the reflection mirror 226 and the toroidal lens 222 constitute the fourth optical scanning means.

Here, it should be noted that the mirrors 224, 225 and 226 constitute beam dividing means that divides out the optical beams merged by the optical beam merging means consecutively, in such a manner that the last merged optical beam from the optical source 253 by the beam merging means is divided first, then the optical beam from the optical source 252, and so on.

In the present embodiment, the reflection angles β4, β3, β2, β1 of the foregoing mirrors 223, 224, 225 and 226 are set respectively to satisfy the relationship $$\beta 1<\beta 2<\beta 3<\beta 4,\ \beta 4-\beta 1<90 \text{ degree},$$

by designating the reflection angles of the mirrors 227, 228 and 229 to φ3, φ2 and φ1. Thereby, the optical paths of the optical beams are reflected consecutively, starting from the optical beam closest to the housing bottom surface. Thereby, the reflected optical beam passes underneath the housing 234 of the optical scanning apparatus. With this construction, the overall size of the optical scanning apparatus is reduced with regard to the arrangement of the photosensitive drums.

Further, the incident angles of the optical beams to the respective photosensitive drums are identical and have the following relationship.

$$\pi-\beta 4=\phi 1-\beta 1=\phi 2-\beta 2=\phi 3-\beta 3$$

Figure 4:
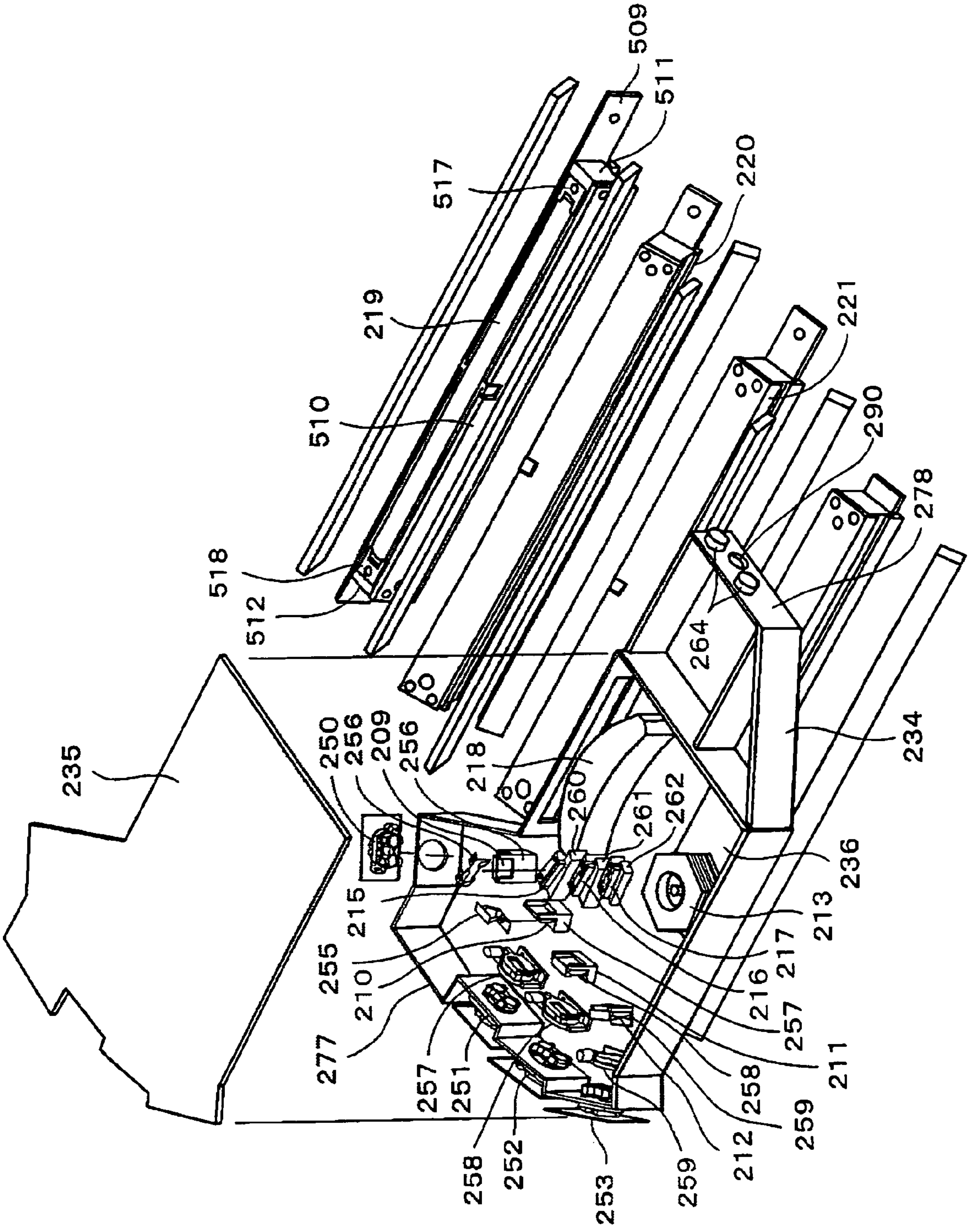
FIG. 4 is an enlarged view diagram showing the internal structure of the housing, the imaging means and the plural reflection mirrors.

As shown in FIG. 4, the part of the optical scanning means where the optical beams travel from the four optical sources 250, 251, 252 and 253 to the fθ lens 218 is accommodated in a single housing 234 having an opened top, and a cover 235 is used to close the foregoing opened top of the housing 234.

The polygonal mirror 213 is rotated at high speed by a motor 236 having a dynamic air bearing, wherein the motor 236 is mounted on the bottom surface of the housing 234 via the base part 115 used as the reference member.

The base part 115 is provided with a fixed shaft 116 carrying herring-bone grooves on the outer surface thereof, and the polygonal mirror 213 is mounted upon the fixed shaft 116 as a rotary member in the state that a cylindrical sleeve is fitted to a hole drilled at the center of the polygonal mirror 213 in correspondence to the shaft 116. Further, there is disposed a ring-shaped magnet 119 at the bottom part of the rotary body, and the ring-shaped magnet 119 is driven by a magnetic coil 118 disposed so as to face the magnet 119 in the circumferential direction.

The optical sources 250, 251, 252 and 253 are fixed upon the wall of the housing 234 by screws in the state that a contact surface of the optical source holder that forms a plane perpendicular to the optical axis of the optical source, makes an abutting engagement with the wall of the housing 234 and that the cylindrical part of the base member is inserted into corresponding holes formed in the wall surface.

The cylindrical lenses 209, 210, 211 and 212 are supported by L-shaped abutting members 209, 210, 211 and 212 formed on the housing bottom surface respectively with different heights, in the state that the bottom surface part and the flat surface part of the cylindrical lens are urged against the corresponding L-shaped member by a leaf spring 255.

The leaf spring 255 is fixed upon the housing bottom surface by using a screw. Similarly, the reflection mirrors 215, 216 and 217 are supported by abutting parts 260, 261 and 262 respectively, wherein the abutting parts 260, 261 and 262 are formed on the housing bottom surface with different heights in the state that the lower part of the reflection surface is urged by a leaf spring 256 in each of the mirrors 215, 216 and 217.

The fθ lens 218 is adhered upon a central part of the base part provided on the housing bottom surface, and the optical beam passed through the fθ lens 218 are exited to the outside of the housing each in the sub scanning direction via an opening formed on the housing wall.

In the drawing, the reference numerals 257, 258 and 259 are optical axis changing means having the construction in which the non-parallel plates 261, 262 and 263 are mounted upon a rotating mechanism. Details of the optical axis changing means will be explained later.

On the front and rear surfaces 277 and 278 of the housing 234, there are formed a pair of pins 264 (265). Further, it should be noted that a pair of side plates 266 and 267 are disposed so as to face with each other in the main scanning direction.

The side plates 266 and 267 are formed of a metal plate bent in the U-shaped form, and each of the side plates is formed with a reference hole 268 (269). The housing 234 is aligned with respect to the optical axis and the sub scanning direction (height direction) by inserting the pins 264 (265) into the reference hole 268 (269) and is fixed between the side plates by screwing a screw into a hole 290 via each of the side plates.

Underneath the side plates 266 and 267, there is disposed a bottom plate 270 of metal plate as a compartment member, wherein the bottom plate 270 is shaped to have a corrugation pattern and includes slit-shaped openings 271, 272, 273 and 274 respectively in corresponding to the photosensitive drums 101, 102, 103 and 103. Thereby, the bottom plate 270 is connected to the side plates 266 and 267 by engaging plural projections 275 extending from both lateral edges thereon into corresponding engagement holes 276 formed in the side plates 266 and 267. Thereby, the bottom plate 270 makes a calking connection with the side plates 266 and 267, and the side plates 267 and 267 are held parallel with each other.

In each of the side plates 266 and 267, there are provided plural cutout openings so as to hold respective ends of the supporting members supporting thereon the mirrors 223-226 or the toroidal lenses as will be explained later. Thereby, the side plates 266 and 267 are positioned properly with respect to the housing 234 by positioning pins 264 (265) provided at the front wall and rear wall of the housing 234 such that an opening formed in the side plate 266 is aligned in the main scanning direction with a corresponding opening in the side plate 267. At the edge part of each cut out opening, there are provided a cutout edge surface as will be explained later.

Figure 5A:
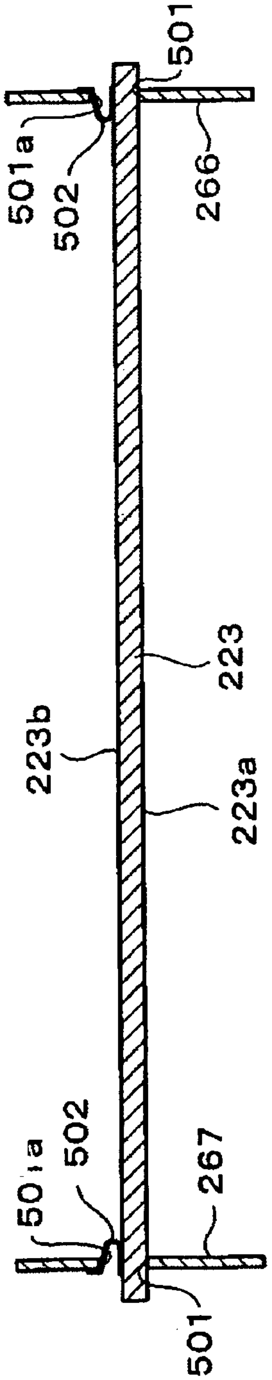
Figure 5B:
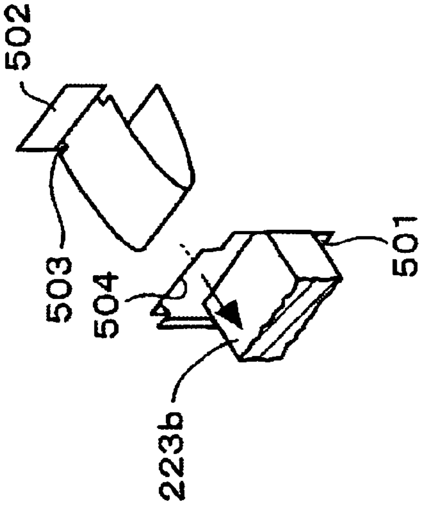
FIG. 5B is an enlarged view of the support part of the reflection mirror.

FIGS. 5A and 5B show the details of support of the reflection mirror 223 on the side plates 266 and 267. Because other mirrors 224, 225 and 226 are supported similarly, the description will be made hereinafter for the mirror 233.

Referring to the drawings, the mirror 223 is fixed upon the side plates 266 and 267 at the cutout openings 501 formed therein by engaging a reflection surface 223*a* of the mirror 233 with a cutout edge of the cutout openings 501 and by urging the mirror 233 against the cutout edge by a wedge-formed leaf spring 502, by inserting the leaf spring 502 into a space between a rear surface 223B of the mirror and an opposing edge 501*a* of the cutout opening 501 from outside such that a cutout part 503 formed in the leaf spring 502 engages with an edge of the cutout opening 501 in each of the side plates 266 and 267. In the present example, the same leaf spring 502 is used throughout.

Figure 6:
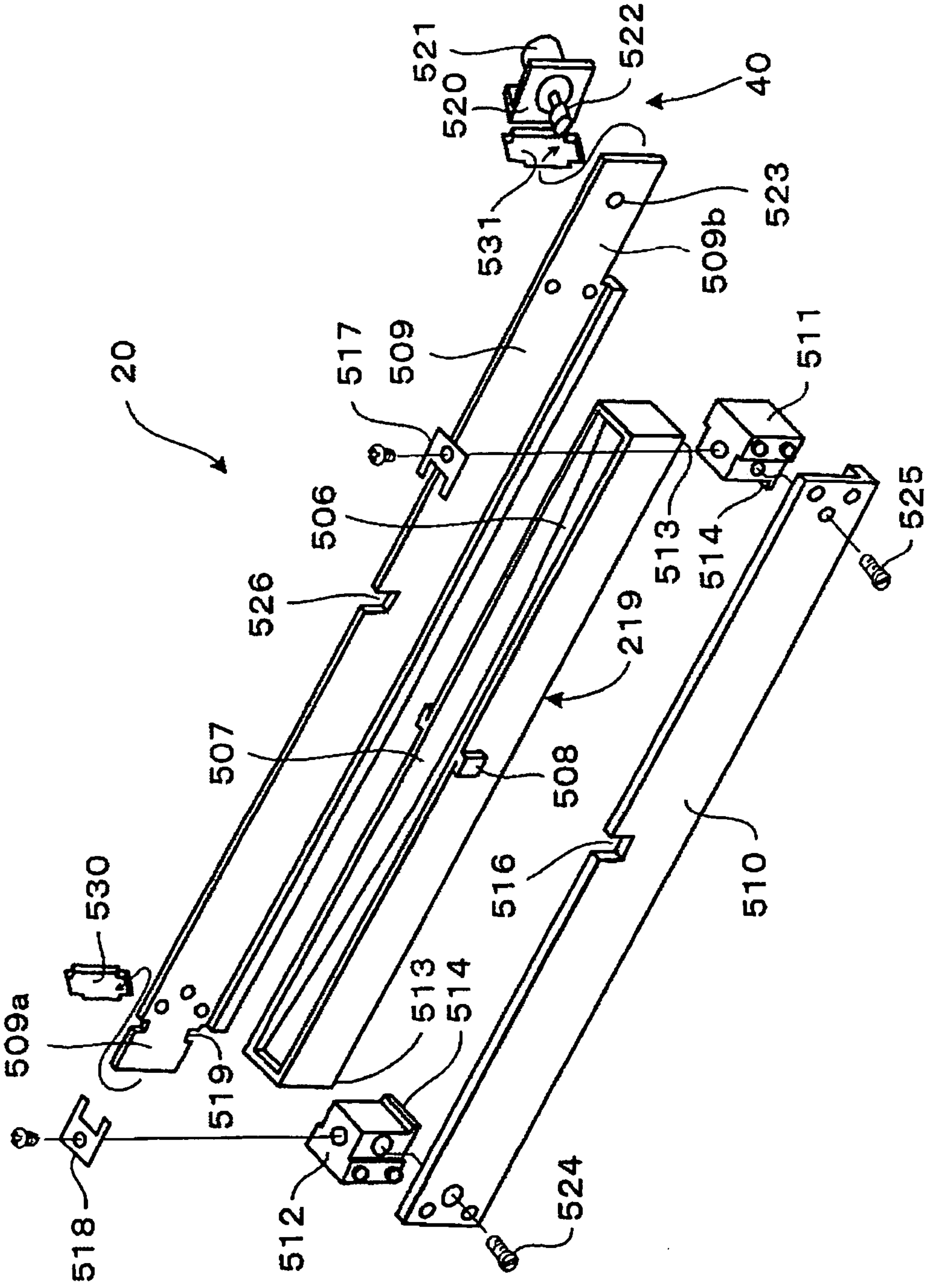
FIG. 6 is an exploded oblique view diagram showing the construction of a support body of a toroidal lens uses as the imaging means in the present invention.

FIG. 6 shows the construction of a support body 20 used for supporting the toroidal lenses 219-222 and the details of the support of the toroidal lens on the side plates 266 and 267. Because the same support mechanism is used for supporting the toroidal lenses 219-222 on the side plates 266 and 267, only the case of the toroidal lens 219 will be explained with reference to FIG. 6 as a representative example.

The toroidal lens 219 includes a lens part 506 formed of a resin, and there is formed a rib part 507 so as to surround the lens part 506. Further, a positioning projection 508 is formed at the central part of the rib part 507. The support body 20 is formed of a metal plate and has a construction so as to sandwich resin blocks 511 and 512 between a first support plate 509 and a second support plate 510 forming the support member.

In the present embodiment, the blocks 511 and 512 are connected to the respective first and second support plates 509 and 510 by calking, by inserting the projections formed on the top and bottom surfaces of the blocks into corresponding engaging holes formed at the end parts of the support plates 509 and 510. Thereby, the toroidal lens 219 is held in the state that an edge part 513 of the rib part 507 facing the optical axis direction is abutted to reception parts 514 and 515 formed on the respective blocks 511 and 512 and urged thereto by leaf springs 517 and 518. With this, positioning of the toroidal lens 219 is achieved with regard to the optical axis direction. Further, positioning of the toroidal lens 219 in the main scanning direction is achieved by engaging the projection formed on the rib part 507 with corresponding cutouts 516 and 526 formed in the respective support plates 509 and 510. Thereby, the rib part 517 holding therein the toroidal lens 219 is firmly held by the plates 509 and 510.

Because of the elongated shape and low rigidity, the toroidal lens 219 easily causes deformation (warp) with small external stress. Further, it easily causes deformation as a result of non-uniform thermal expansion when there is a temperature gradient in the up and down directions with change of the environmental temperature.

In the present invention, on the other hand, deformation of the toroidal lens 219 is effectively prevented and the linearity of the base line is maintained even when there is applied localized stress as in the case of the tilt adjustment to be described later, by accommodating the toroidal lens 219 in the support body 20 and stabilizing the form thereof.

In the support body 20, the toroidal lens 219 is supported in the state that an end part 509*a* of the first support plate 509 in the sub scanning direction is abutted to an edge of an opening 530 formed in the side plate 267 in such a manner that a cut 519 formed in the foregoing end 509*a* is engaged with the edge of the opening. Thereby, the toroidal lens 219 is fixed by a leaf spring 502 of the same shape used for fixing the mirror 223.

At the other end 509*b* of the first support plate 509, there is formed a screw hole 523. Thereby, the first support plate 509 is supported by the side plates 266 in the state that the foregoing the other end 509*b* is inserted into a corresponding opening formed on the side plate 266 by engaging a lead screw formed at a tip end of a stepping motor 521 used for driving means. Further, in order to eliminate backlash of the lead screw 522, the other end 509*b* is also urged in one direction by inserting the leaf spring 502.

The stepping motor 521 is mounted on an L-shaped bracket 520 welded to the outside of the side plate 266 in a movable manner in the sub scanning direction (height direction of the toroidal lens). Thus, by driving the stepping motor 521 in the forward and backward directions, the toroidal lens 219 is tilted about the edge of the opening 530 formed in the side plate 267 within a plane perpendicular to the optical axis, and with this, a base line 421 of the toroidal lens 219 in the sub scanning direction can be tilted as shown in FIG. 10B. Thereby, a scanning line 422 formed on the photosensitive drum 101 at the imaging position of the toroidal lens 219 is also tilted. The edge of the opening 530 functions as a fulcrum.

Thus, the optical scanning apparatus 10 includes adjustment means 40 that rotates the toroidal lens 219 acting as the imaging means within the plane perpendicular to the optical axis of the toroidal lens 219.

In the present embodiment, the toroidal lenses 219-221 excluding the lens 222 for the black color, are disposed in the similar manner with same orientation for the fulcrum of the tilting movement, and the toroidal lenses 219-221 are adjusted such that the scanning lines of respective colors are made parallel to the reference black scanning line on the corresponding photosensitive drums after the image forming apparatus is shipped.

Figure 7:
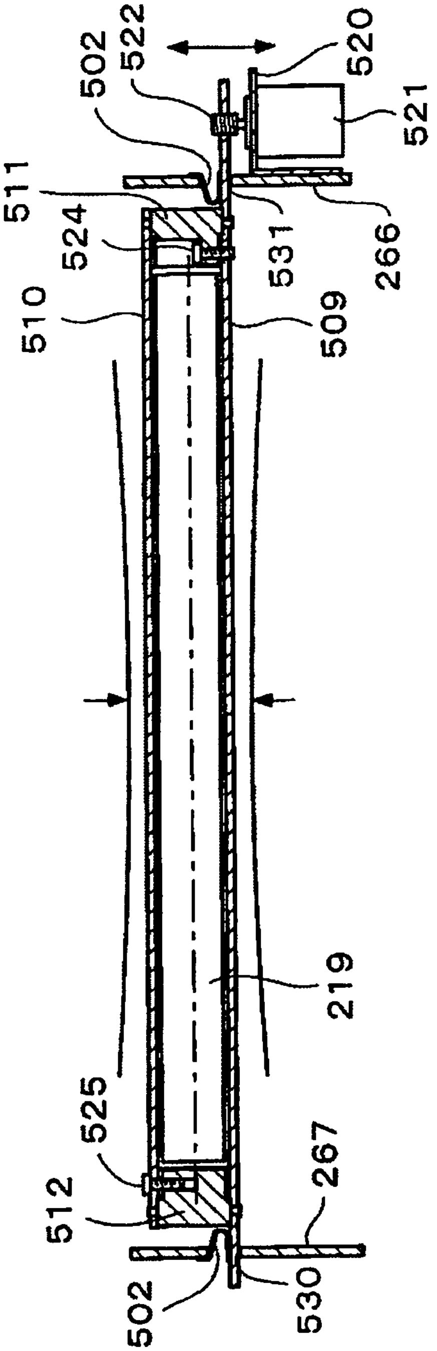
FIG. 7 is an enlarged cross-sectional diagram showing the state in which the toroidal lens bridges across the side plates.

FIG. 7 is a diagram showing the state of the toroidal lens 219 mounted on the side plates 266 and 267 from the direction of the optical axis.

Referring to FIG. 7, the blocks 511 and 512 are formed at the same height as the toroidal lens 219, and the top and bottom surfaces of the rib part holding the toroidal lens 219 are supported between the block 511 or 512 and the first support plate 509 and between the block 511 or 512 and the second support plate 510 with intimate contact.

Thereby, it should be noted that the upper and lower contact surfaces of the blocks 511 and 512 are formed to have steps such that there is formed a slightly receded surface in each of the contact surfaces respectively for contact with the first support plate 509 and the second support plate 510. In correspondence to the foregoing receded surfaces, there is formed a region not contacting with the block 511 or 512, and a first adjustment screw 524 engaging with the first support plate 509 or a second adjustment screw 525 engaging with the second support plate 510 are provided across the respective gap regions formed with such receded surfaces.

With such a construction, the first support plate 509 is deformed to have a convex shape at the top surface thereof with tightening of the first adjustment screw 524 and the second support plate 510 is deformed to have a concave shape at the bottom surface thereof with tightening of the second adjustment screw 525.

Figure 10A:
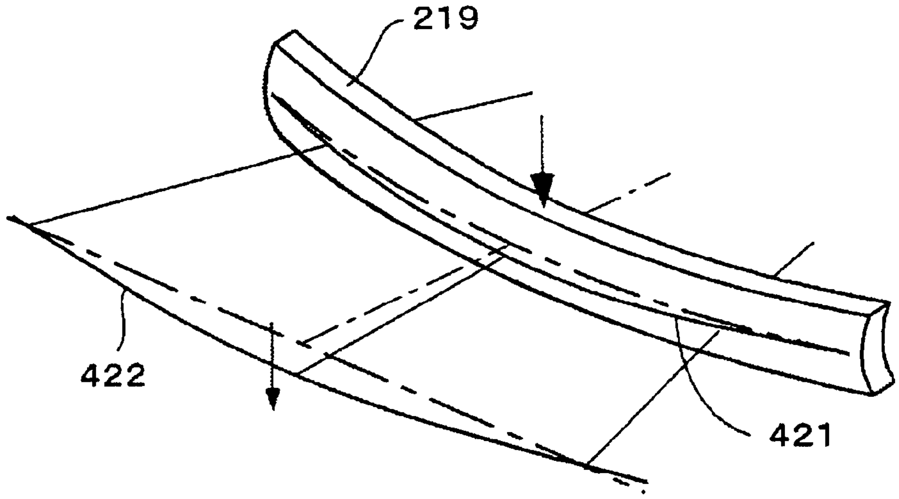
Figure 10B:
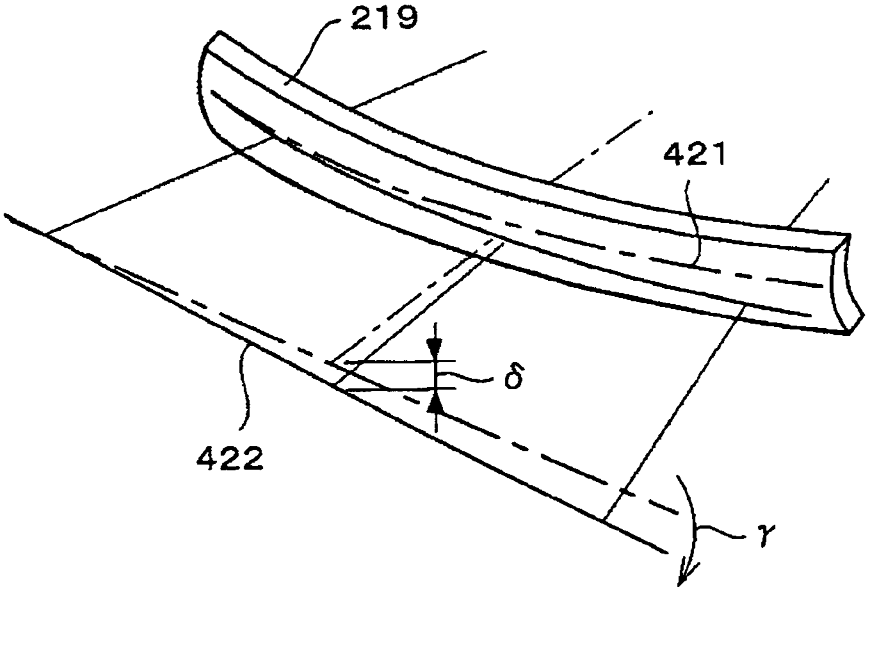
FIG. 10B is an enlarged oblique view diagram showing the tilting of the scanning line formed by the imaging action of the toroidal lens.

As a result of adjustment of the respective adjustment screws, the bas line 421 of the toroidal lens 219 is curved in the sub scanning direction as shown in FIG. 10A, and the scanning line 422 can be curved uniformly. Thus, the support plate 509 is provided with warp rectification means rectifying the warp of the base line at least in the sub scanning direction of the toroidal lens.

Generally, the curve of the scanning line is caused by the alignment error of the optical elements constituting the optical system or deformation of the optical elements at the time of manufacture thereof. By curving the toroidal lens 219 in the direction so as to cancel out such curve of the scanning line, it becomes possible to improve the linearity of the scanning line or align the direction and magnitude of curve for different scanning lines for different color images.

In the present embodiment, the warp rectification means is provided to all the toroidal lenses including the one used for formation of the black images (fourth scanning means), and with this, it becomes possible to align the scanning lines for the respective color images in conformity with the scanning line for the black color images with regard to the direction of curve and magnitude of the curve, and further it becomes possible to conduct the foregoing tilting adjustment while maintaining this state. Further, it should be noted that while the present embodiment has used the construction that causes indirect deformation of the toroidal lens by causing deformation in the first support plate 509 acting as the support member such that toroidal lens is not subjected to local stresses, it is also possible to deform the toroidal lens by contacting the adjustment screws directly.

Figure 3:
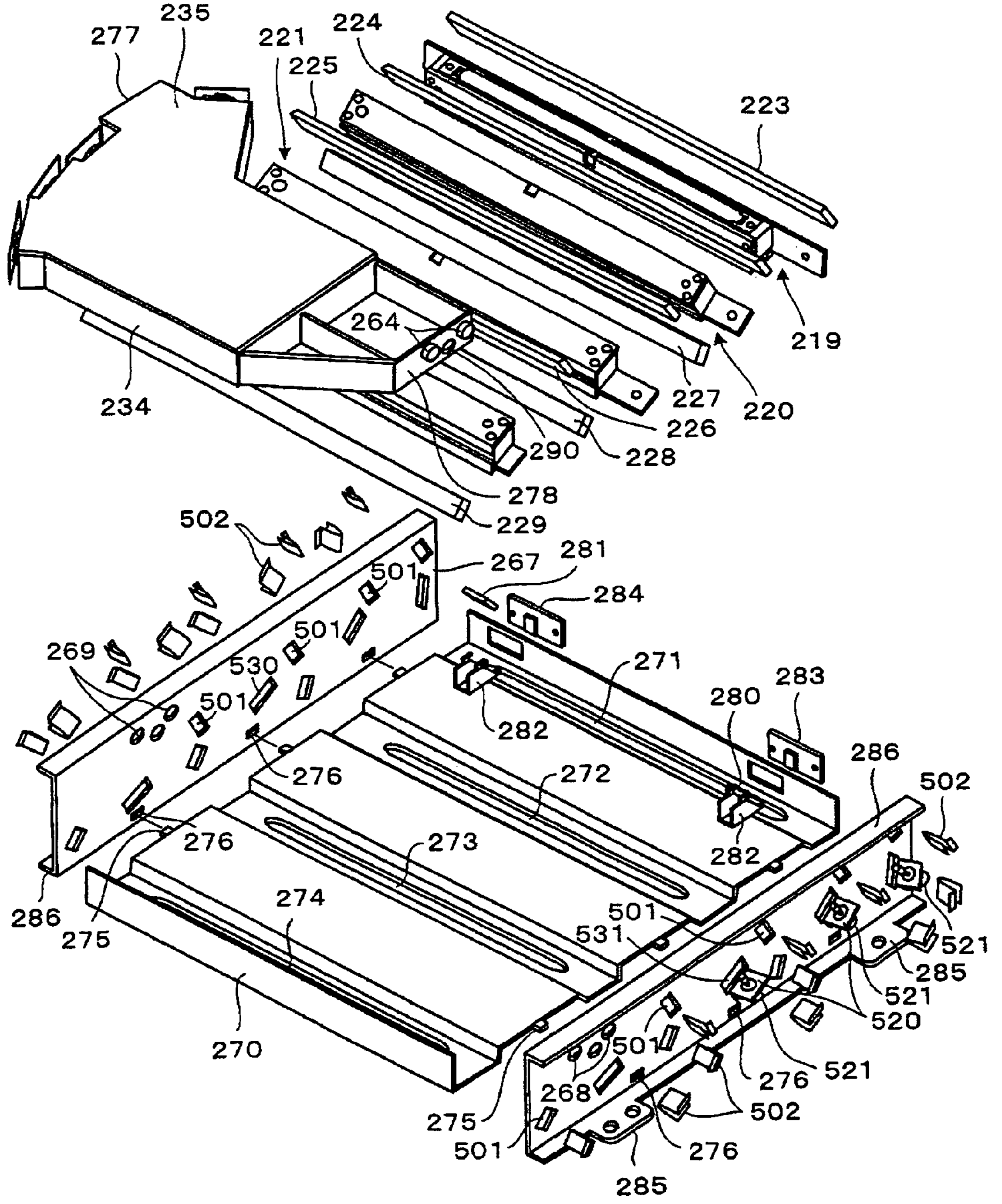
FIG. 3 is an enlarged oblique view diagram showing the side plates, compartment members, image forming means and the support structure of the plural reflection mirrors.

The optical units of such a construction are mounted on a main body while using the mounting surfaces 285 and 286 formed on the side plates 266 and 267 at the respective bent part as the reference surface as shown in FIG. 3. In FIG. 2, it should be noted that the reference numerals 111, 112, 113 and 114 form a dust cover glass and are connected so as to close the openings 271, 272, 273 and 274 formed in the bottom plate 270, which acts as the compartment member.

In the first optical scanning means, mirrors 280 and 281 are mounted on the support member 282 welded upon the base plate 270 for deflecting back the scanning beam at the scan start position and scan end position of the image recording area, and the optical beam is detected by photo sensors carried by substrates 283 and 284 (see FIG. 2).

The substrates 283 and 284 are screwed upon a vertically bent part of the bottom plate 270 in the state that the photo sensors are exposed at respective openings. In the present embodiment, the substrate 283 provides a synchronization sensor and is used commonly by all the image forming stations as the reference for detecting the timing of start writing.

On the other hand, the substrate 284 detects the change of image width (width magnification) by measuring the time difference with respect to the detection signal of the synchronization detection sensor 283. Thereby, it becomes possible to maintain the image width constant by changing the frequency used for modulating the respective laser diode in inverse proportion to the detected change of the image width.

Figure 11:
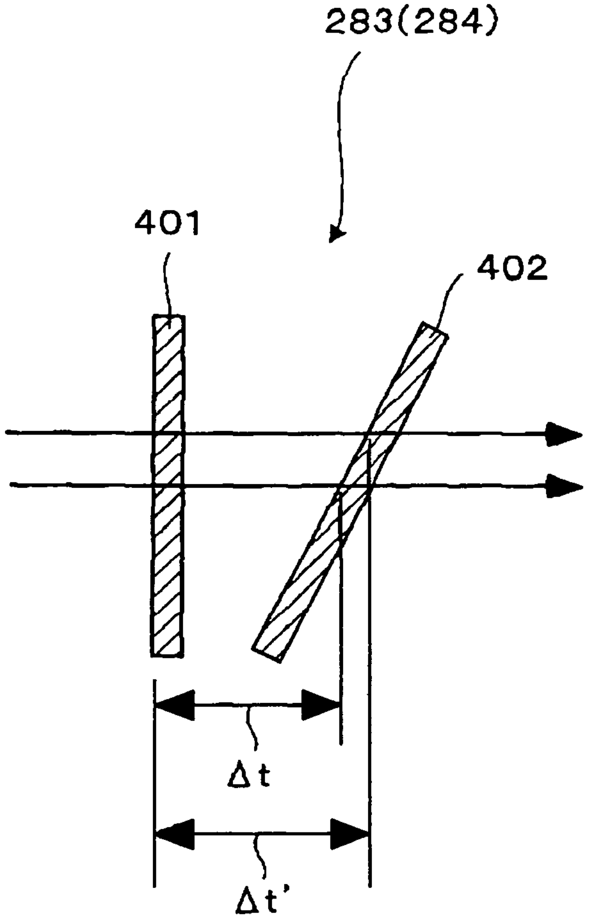
FIG. 11 is an enlarged cross sectional diagram showing a mode of the synchronization detection sensor and the edge detection sensor.

Further, by constructing the respective sensors by a photodiode 351 perpendicular to the main scanning direction and a photodiode 352 non-parallel to the main scanning direction as shown in FIG. 11, it becomes possible to detect the error $\Delta y$ of the optical beam in the sub scanning direction by producing a synchronization detection signal or end point detection signal upon passage of the optical beam at the edge of the photodiode 351 and by measuring the dime difference $\Delta t$ for the optical beam to reach the photodiode 352 from the photodiode 351.

It should be noted that $\Delta y$ is represented by a tilting angle $\gamma$ of the photodiode 352 and the scanning speed V of the optical beam as $$\Delta y=(V/\tan\gamma)\cdot\Delta t.$$

Thus, when $\Delta t$ is constant, this means that there is caused no error in the sub scanning direction.

It should be noted that such deviation of the sub scanning direction can be corrected by the optical axis deviation means, and it is possible to use the foregoing detection of $\Delta y$ in place of the sub scanning register detection carried out by using the detection pattern on the image transfer belt 101 shown in FIG. 1.

Further, it is possible to use the foregoing detection of $\Delta y$ by measurement of $\Delta t$ together with the detection of the sub scanning register error made by the image transfer belt 105. Alternatively, the detection of the register error by the image transfer belt 105 is carried out with long interval with less frequency and carry out the feedback correction in the meantime by carrying out the detection of $\Delta y$. With this, it becomes possible to shorten the stand-by time of the image forming apparatus at the time of printing.

According to the present embodiment, the deviation between the optical scanning means is made uniform, and thus, the sensors 351 and 352 are provided to only the first scanning means. Of course, it is possible to provide these sensors to all of the optical scanning means.

Figure 8:
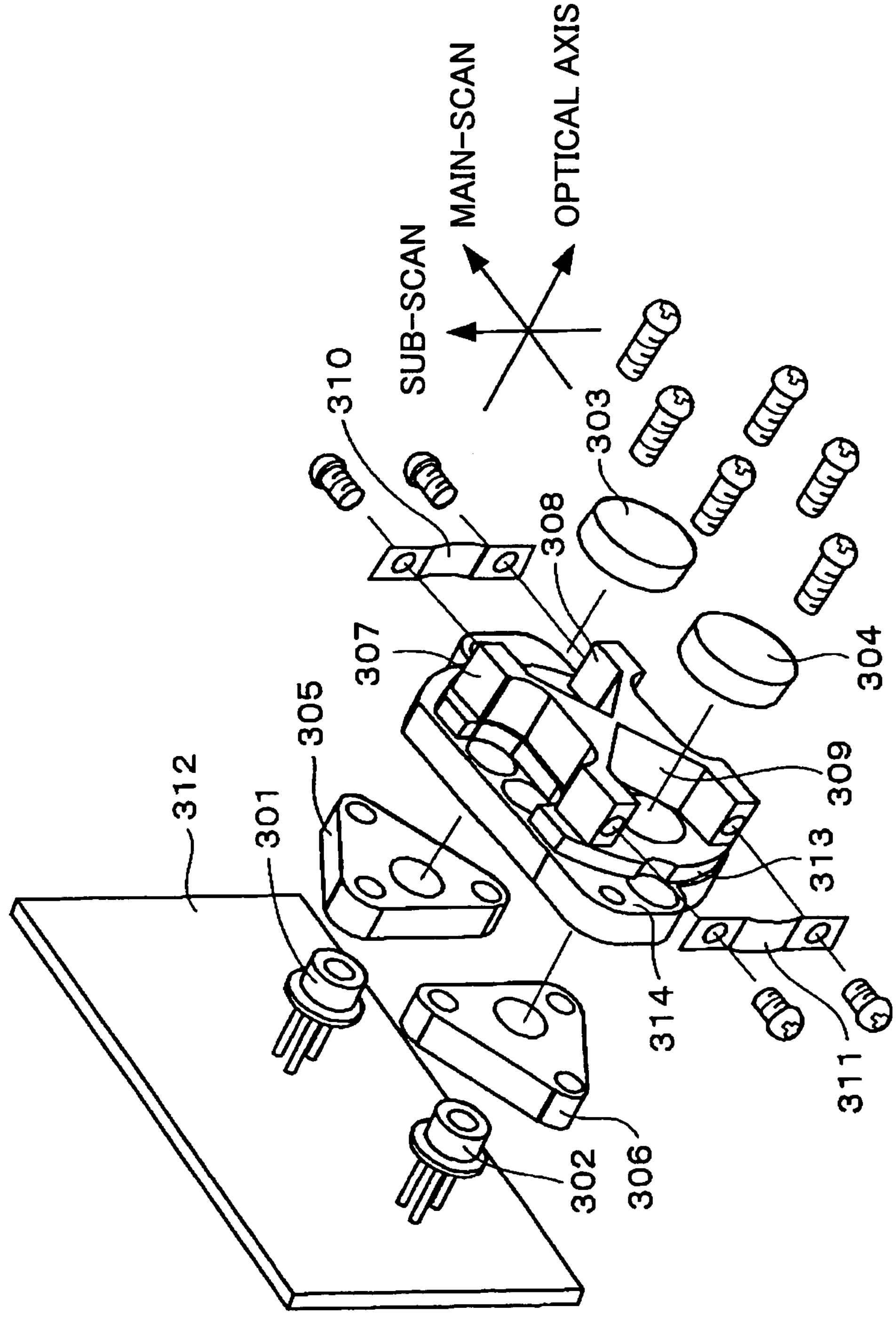
FIG. 8 is an exploded oblique view diagram showing the construction of the optical source unit.

FIG. 8 is an oblique view diagram showing the construction of the optical source. It should be noted that the same construction is used to all of the optical sources 250-253.

Referring to FIG. 8, each optical source includes laser diodes 301 and 302 and coupling lenses 303 and 304, wherein the laser diodes 301 and 302 and the coupling lenses 303 and 304 are deposed in each of the color optical scanning means generally in the main scanning direction in symmetry with respect to a beam emission axis C to be explained later with reference to FIG. 9.

Each of the laser diode is pressed into respective corresponding base members 305 and 306 from the rear direction in the state that the circumference of the laser package engages with the base member, wherein the base members 305 and 306 are held upon a holder member 307 by three screws inserted from the rear surface of the holder member 307.

The coupling lenses 303 and 304 are held in respective V-shaped grooves 308 and 309 formed in the holder member 307 in the mutually opposite relationship in the manner that the circumference surfaces thereof engage with the respective V-shaped grooves. Thereby, the lenses 303 and 304 are urged toward the V-shaped grooves 308 and 309 by respective leaf springs 310 and 311.

The laser diodes 301 and 302 are disposed with respective optical axes of the coupling lenses 303 and 304 on a contact surface of the base member 307 perpendicular to the respective optical axes such that the points of optical emission of the laser diodes 301 and 302 align with respective optical axes of the coupling lenses 303 and 304. Further, the coupling lenses 303 and 304 are positioned on the V-shaped grooves 308 and 309 such that the optical beam emitted from the coupling lens forms a parallel optical beam in each of the coupling lenses 303 and 304.

Figure 9:
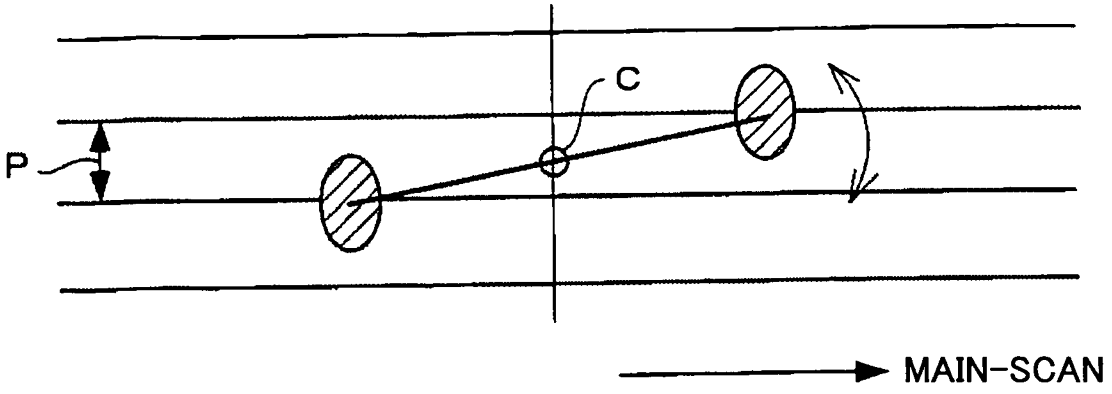
FIG. 9 is a diagram showing the relationship between the beam spot interval and the scanning line pitch.

It should be noted that the laser diodes 301 and 302 are disposed such that the line connecting the optical emission points of the respective laser diodes 301 and 302 is tilted about the beam emission axis C with respect to the main scanning direction as shown in FIG. 9, wherein the tilting of the support member 307 is determined such that the intersection point is located close to the reflection surface of the polygonal mirror 213.

In FIG. 8, the printed circuit board 312 carrying a driver circuit is screwed upon a base provided vertically to the holder member 307. By soldering the leads of the respective laser diodes inserted into corresponding through holes of the printed circuit board 312, the optical source is assembled in the form of an optical source unit.

The optical source unit thus formed is positioned by engaging a cylindrical part 313 of each holder member 307 into corresponding holes formed on the wall of the housing 234 with different heights and is fixed by screwing in the state that the contact surface 314 is engaged with the housing wall.

Thereby, by adjusting the tilting angle $\gamma$ of the holding member 307 about the cylindrical part 313, the beam spots can be aligned with the scanning line pitch P determined according to the recording density on the photosensitive drum as shown in FIG. 9. It should be noted that the optical source unit is not limited to the construction that includes two laser diodes 301 and 302, but it is possible to construct the optical source unit to include only one laser diode or a laser diode array in which plural optical sources are integrated on a single chip monolithically.

Meanwhile, the image transfer belt 105 of FIG. 1 is moved in the state it is would around three rollers 105*a*, 105*b* and 105*c* respectively forming a driving roller, a follower roller and a tension roller, and the toner images are transferred to the transfer belt consecutively from the respective photosensitive drums in the state that the register position is aligned by using the write start timing in the sub scanning direction.

The resister positions of the respective toner images are adjusted periodically, and a detector for reading the register position of the toner images formed on the toner image transfer belt 105 is provided at both ends of the belt.

The detector includes an LED 231 for illumination, a photo sensor 232 for detecting a reflected light and a pair of condenser lenses 233 and reads a detection pattern formed by an array of toner images of the reference color (black) and other colors (cyan, magenta and yellow), wherein the detection pattern is formed with an offset of 45 degrees from the main scanning direction in the illustrated example. Based on the detection timing thereof, a register error is calculated for the reference color in the sub scanning direction, and the write timing is aligned based on the result of the detection for every one polygonal mirror facet or one scanning line pitch P.

In these days, however, there arises a need, with the increase in the demanded quality of the color images, to achieve register alignment within the precision of one scanning line pitch.

Thus, the present embodiment achieves fine adjustment of the beam irradiation position by using optical axis changing means 30 to be described later.

Figure 13A:
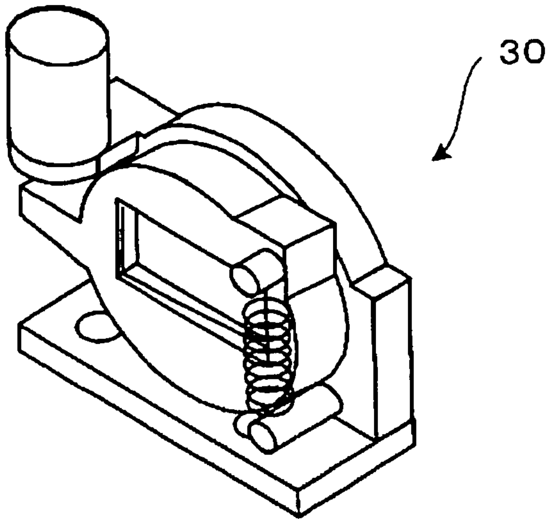
Figure 13B:
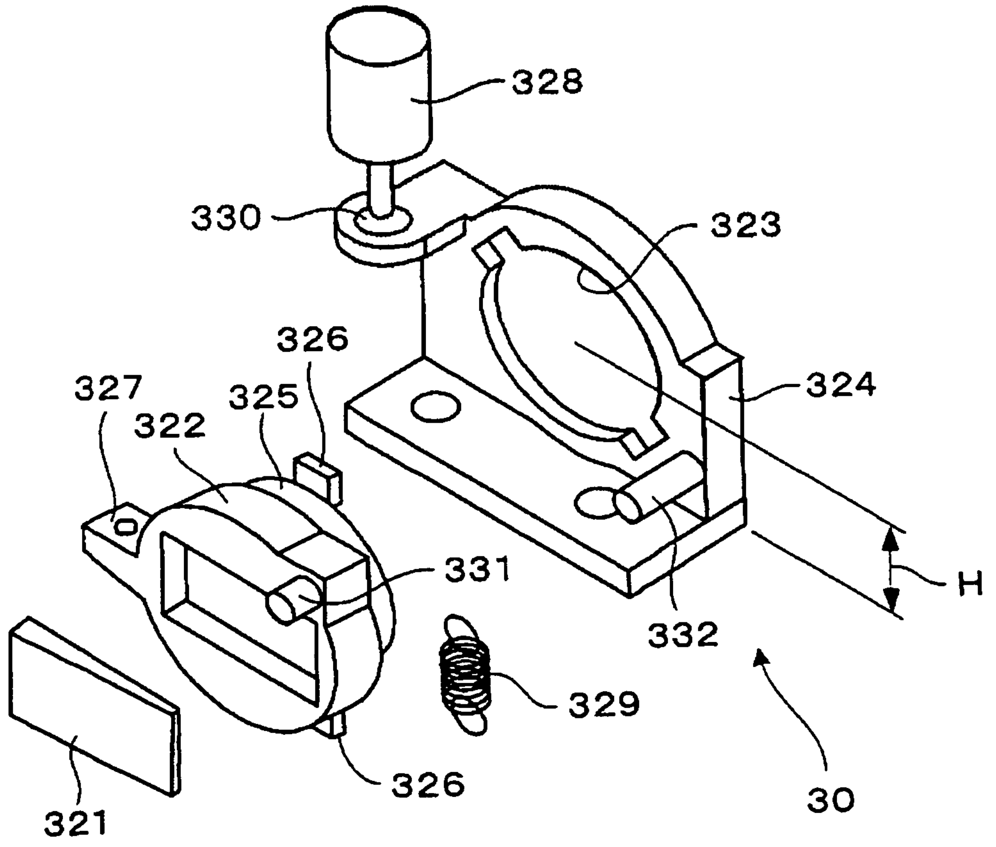
FIG. 13B is an exploded oblique view diagram showing the construction of the optical axis changing means.

FIGS. 13A and 13B are oblique view diagrams showing a support part used for supporting a non-parallel plate constituting the optical axis changing means 30 in an oblique view, wherein it should be noted that this optical axis changing means 30 functions as a beam irradiation position changing means changing the beam irradiation position on each of the photosensitive drums.

The non-parallel plate 321 is fixed in a central frame part of a cylindrical holder member 322 and is inserted into a support member 324 formed with a bearing part 323 in such a manner that a pair of collar part 326 formed on the holder member 322 engage with a cutout part formed on the support member 324. Then the holder member 322 is rotated in the bearing part 323 and the foregoing color part 326 holds the rear side of the support member 324. Thereby, the holder part 324 is in the state rotatable freely about a fitting part 325 in the state the fitting part 325 makes an intimate contact with the support member 324. As noted before, the support member 324 is screwed upon the housing of the optical scanning apparatus at the bottom surface thereof, which is used as a reference surface, such that the center of rotation of the bearing part 323 coincides with the beam exit axis of the optical source unit at the height H, and it becomes possible to tilt the beam exit axis slightly with the rotation of the holder member 322.

At an end part of the holder member 322, there is formed a lever part 327, and a lead screw formed on a shaft of a stepping motor 328 is engaged with such a lever part 327, wherein the stepping motor 328 is fixed upon a penetration hole 330 formed in the support member 324 as the driving means. Thus, with up and down motion of the stepping motor 328, the non-parallel plate 321 is rotated. Further, in order to eliminate the backlash at the time of the up and down movement, there is provided a spring 329 between a pin 331 of the holder member 322 and a pin 332 on the support member 324 such that the tensile force of the spring 329 urges the holder member 322 in one direction.

Designating the rotational angle of the holder member 322 as γ, the apex angle of the non-parallel plate as ε, the focal distance of the coupling lens as fc, and the overall magnitude of the optical system in the sub scanning direction as ζ, the change of the beam position on the photosensitive drum surface in the sub scanning direction is given as $$\Delta y = \zeta \cdot fc \cdot (n-1) \cdot \epsilon \sin \gamma,$$

where n is the refractive index of the non-parallel plate. In the illustrated example, the apex angle ε is set to about 2 degrees.

As explained before, the register error of sub scanning for different colors is detected by using the detection pattern. Thereby, it becomes possible to match the sub scanning register periodically for every one facet of the polygonal mirror 213 by adjusting the write start timing for each one scanning line pitch P. Thereby, there holds a relationship $$D \cdot \alpha / 2 = N \cdot P + \Delta P,$$

where D represents the diameter of the photosensitive drum, α represents the rotational angle from the beam irradiation position to the image transfer position of the photosensitive drum, N is a natural number, and ΔP is a deviation of write start timing caused by the phase difference of the synchronization detection timing. Further, by designating, for each of the photosensitive drums of the respective colors, the distance of the image transfer position from the image transfer position of the photosensitive drum of the reference color, there holds the relationship $$B = M \cdot P + \Delta P.$$

Thus, even when there exists difference in any of D, α or B, there remains only the deviation ΔP of the write start timing as long as there is no change of speed and no change of write start position.

This ΔP takes the value of ½ one pitch in the maximum and thus takes a value represented as $\Delta P \leq P/2$. Thus, in the present embodiment, the optical axis can be changed slightly in the sub scanning direction by using the foregoing optical axis changing means 30, such that ΔP becomes zero based on the periodical detection for the register of sub scanning direction made by detecting the detection pattern on the toner image transfer belt 105.

In the present embodiment, it is assumed that the toner image transfer belt 105 moves without variation in the speed. In fact, however, there exists a slight speed variation of about 1 period in one rotation. Thus, there appears a deviation of sub scanning position having a maximum variation σ0 as shown in FIG. 14, wherein the variation pattern of FIG. 14 changes the phase thereof at different color transfer positions.

The variation of speed of the toner image transfer belt 105 is caused by various reasons such as variation of thickness or particularity of the belt, leading to different tangential speed at the driving roller. On the other hand, the effect of such variation of speed can be compensated for by making a reference mark at the edge of the belt and by inputting the phase distance from the reference mark.

Figure 14:
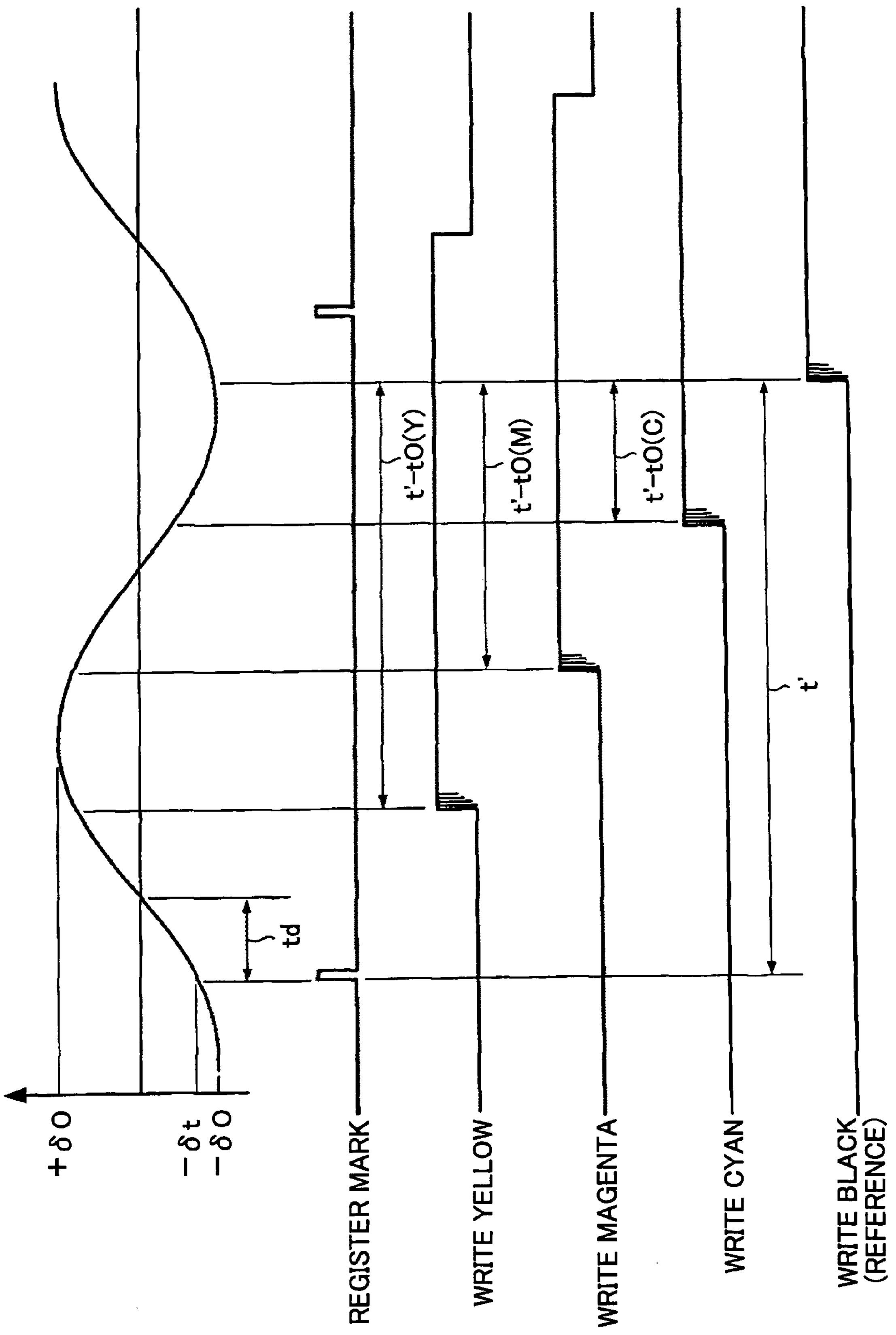
FIG. 14 is a chart showing speed variation of the transfer belt and the write timing of the optical scanning apparatus.

Assuming that there exist a node in the diagram of FIG. 14 at the position offset from the reference mark by a phase distance td and that the time interval tm from writing of the electrostatic latent image to transferring of the toner image is constant, the deviation of the sub scanning position for a color image with respect to the reference color image at an arbitrary time t from the start of writing is given as $$\Delta y = \sigma 0 \cdot \sin 2\pi \cdot (t - t0 + t' - td)/T - \sin 2\pi (t + t' - td)/T,$$

where the t0 represents the deviation of timing of image transfer with respect to the timing of image transfer of the reference color image, while t' represents the time from the reference mark detection to the start of writing of the reference color image, and T represents the time for the transfer belt 105 to make one full rotation.

Thus, by swinging the non-parallel plate 321 periodically within a predetermined range with a phase opposite to the foregoing phase, the images are transferred to the position where the change of speed of the belt is canceled out. Further, such a construction can deal with the deviation that occurs with time.

As explained before, the scanning line changes its tilting about an end part thereof, and thus, there occurs a shift in the optical axis located at the center of the scanning line in each of the toroidal lenses by one half of the variable amount of the scanning line as shown in FIG. 10B. As a result, there appears an eccentricity δ in the beam incident position. While this eccentricity causes no problem as long as it is small, there arises a problem that the beam spot on the photosensitive drum undergoes deformation in the case it exceeds a tolerable limit (about 0.5 mm in the present embodiment) and irregularity occurs in the concentration of the images.

Although it is conceivable to provide a structure having a fulcrum position at the central part of the toroidal lens in the elongating direction thereof for eliminating this eccentricity, it is unavoidable to provide the urging means of the toroidal lens at the end part thereof, and the distance between the fulcrum position and the urging position is increased inevitably. Thereby, there occurs an increase in the torque associated with this urging force due to the lever principle, and the toroidal lens is easily deformed. This is contrary to what is intended.

Thus, in the present embodiment, adjustment is made after the foregoing tilting adjustment such that the optical beam hits generally in coincident to the optical axis by carrying adjustment that changes the optical axis direction by the non-parallel plate with the amount corresponding to the eccentricity. It should be noted that the amount of tilting adjustment and the variation amount of the optical axis are calculated easily in view of the generally proportional relationship between the distance from the fulcrum to the variable part and the distance from the fulcrum to the lens center. Further, even in the case such calculation is not easy, it is possible to carry out the correction similarly by grasping the correlation therebetween in advance. Further, the shift of the scanning position on the photosensitive drum caused as a result of such correction can be compensated for by the write start timing adjustment explained already.

Summarizing above, it becomes possible with the present embodiment to carry out the correction based on the register position detection signal obtained from the toner images formed on the toner image transfer belt 105 at both ends thereof, with the order as follows.

First, the stepping motor 521 is driven such that the scanning lines become parallel with each other between different image forming stations.

Second, the stepping motor 328 shown in FIG. 13 is activated and coarse adjustment of the optical axis is made in correspondence to the amount of tilting adjustment.

Third, the write start timing is adjusted at the write control part such that the register is ace hived up to one line pitch.

Fourth, the stepping motor 328 is activated and the deviation less than one line pitch is fine tuned.

With this, the tilting and curve of the scanning lines are aligned, and the rotational angle of the photosensitive drum from the beam irradiation position to the toner image transfer position is also aligned. Thereby, the register error of images is suppressed between the image forming stations, and color images of reduced color misalignment are obtained.

Figure 15:
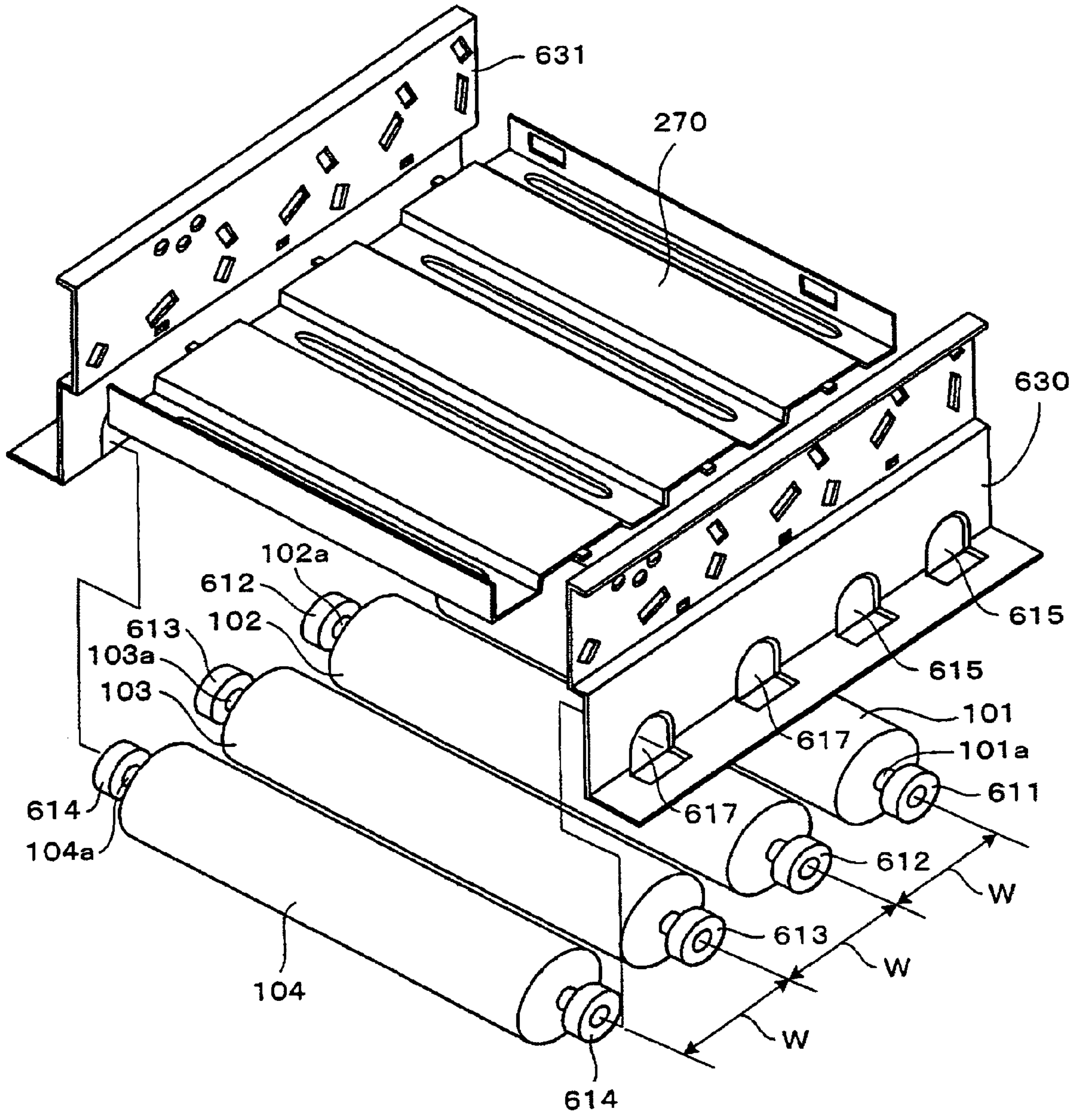
FIG. 15 is an enlarged view diagram showing another mode of the side plate structure.

FIG. 15 shows another embodiment of the side plate structure.

Referring to FIG. 15, side plates 630 and 631 are formed with U-shaped positional parts 615, 616, 617 and 618 at respective extension parts thereof, such that the positing parts 615, 616, 617 and 618 engage with corresponding bearings 611, 612, 613 and 614 provided at the end parts of the respective photosensitive drums 101-104.

In the present embodiment, the housing 234 of the optical scanning apparatus and the arrangement of the mirrors are identical with those explained with reference to FIG. 3.

It should be noted that the bearings 611, 612, 613 and 614 are bearing members supporting the axes 101*a*, 102*a*, 103*a* and 104*a* of the photosensitive drums 101-104, respectively.

In this case, there is provided no independent optical unit, and the side plates 630 and 631 function also as the body of the image forming apparatus. Thus, the side plates 630 and 631 achieve the positioning of the photosensitive drums in the moving direction of the toner image transfer body and simultaneously the positioning of the mirrors constituting the optical scanning means with respect to the photosensitive drums.

In the present embodiment, the photosensitive drums have the same diameter and are disposed with a distance W between adjacent drum axes such that the distance W becomes an integer multiple of the drum diameter. Because the rotational angle of the drum from the beam irradiation position to the toner image transfer position is identical for all the photosensitive drums, the beam irradiation positions forming the electrostatic latent images of different colors are formed always with the same phase at the time the images are transferred from the respective photosensitive drums.

Thus, by disposing the photosensitive drums such that the phase of drum eccentricity matches with each other, it becomes possible to make the magnitude of variation of the circumferential speed to become the same for all of the photosensitive drums. In other words, the phase of high circumferential speed and low circumferential speed a the toner image transfer position can be made equal for all of the image forming stations. Thereby, the register error of images is suppressed between the respective image forming stations, and high-quality color images free from color misalignment are obtained.

Figure 16:
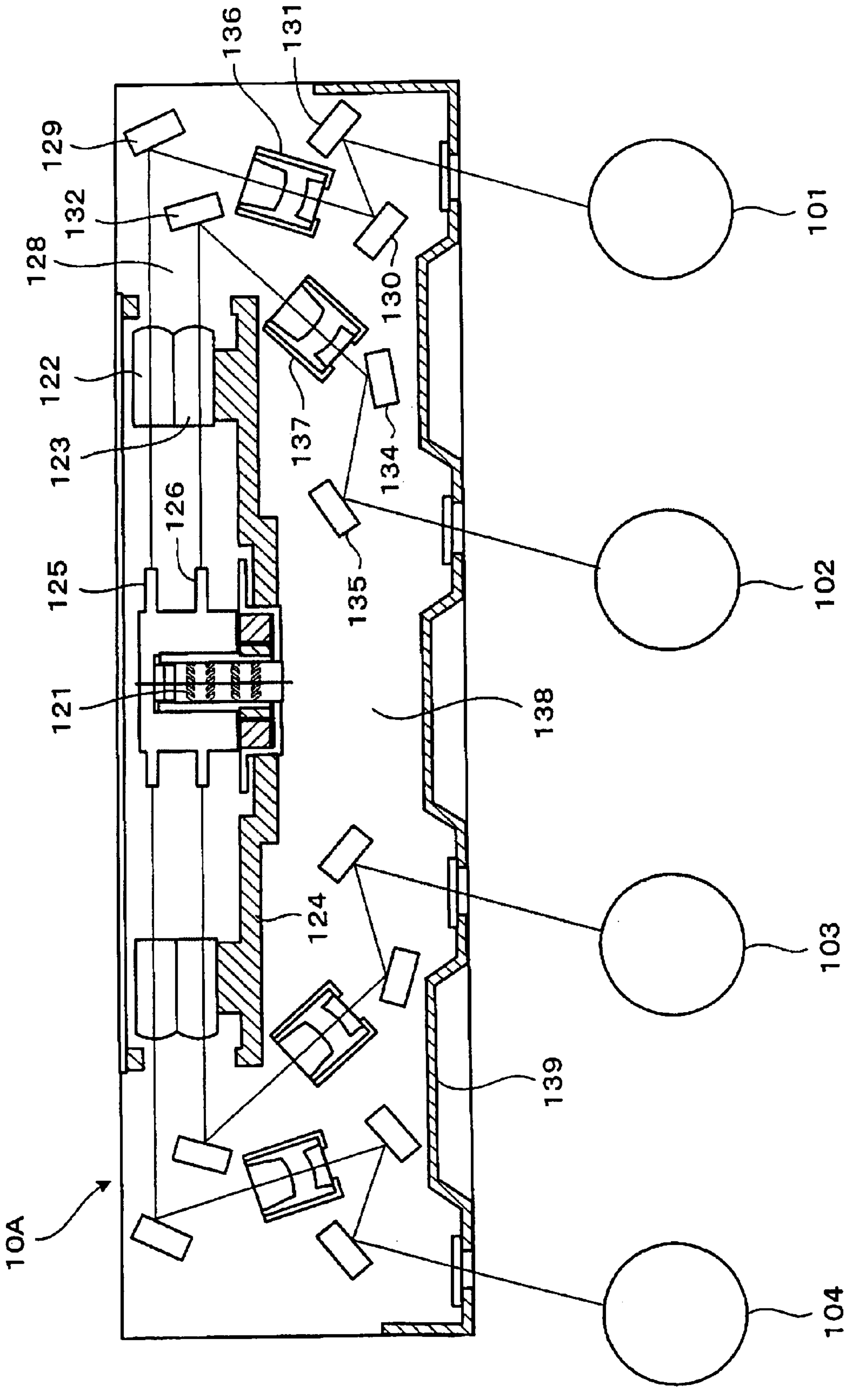
FIG. 16 is a cross-sectional diagram showing the schematic construction of the optical scanning apparatus of another mode of the present invention.

FIG. 16 is a cross-sectional diagram of the example suitable for scanning in two directions by a single polygonal mirror.

In the optical scanning apparatus 10 of FIG. 2, it should be noted that the polygonal mirror 213 has been formed to have a four-layer structure. Contrary to this, an optical scanning apparatus 10A according to the present embodiment uses a two-layer structure and is disposed symmetrically to the right and left with regard to the rotational axis of the polygonal motor 121. Because the right part and the left part are identical, only the right part will be explained.

Referring to the drawings, the reference numerals 122 and 123 represent the fθ lens, wherein the fθ lens of the present embodiment has a power also in the sub scanning direction. The fθ lenses 122 and 123 are stacked to form a unitary body.

The fθ lenses 122 and 123 are mounted on the housing 124 while using the bottom surface as the reference surface, wherein the optical beam deflected by the upper polygonal mirror 125 is emitted to the outside of the housing 127 via an opening 128 of the housing 127 while the optical beam deflected by the lower polygonal mirror 126 is emitted to the outside of the housing 127 via the same opening 128 of the housing 127. Thereby, the optical beam emitted through the lens 122 and the optical beam emitted through the lens 123 travel along parallel optical paths.

The optical beams of the respective optical scanning means are directed to the respective photosensitive drums 101 and 102 via mirrors 129, 130 and 131 and via mirrors 132, 134 and 135, respectively. Further, the toroidal lenses 136 and 137 are disposed intermediate to the first and second mirrors, 129 and 130, or 132 and 134.

The side plate 138 has a basically similar construction to the side plate explained before although the openings are formed at different positions. Further, the mirrors and the toroidal lenses are held similarly to the embodiment explained before.

Figure 12:
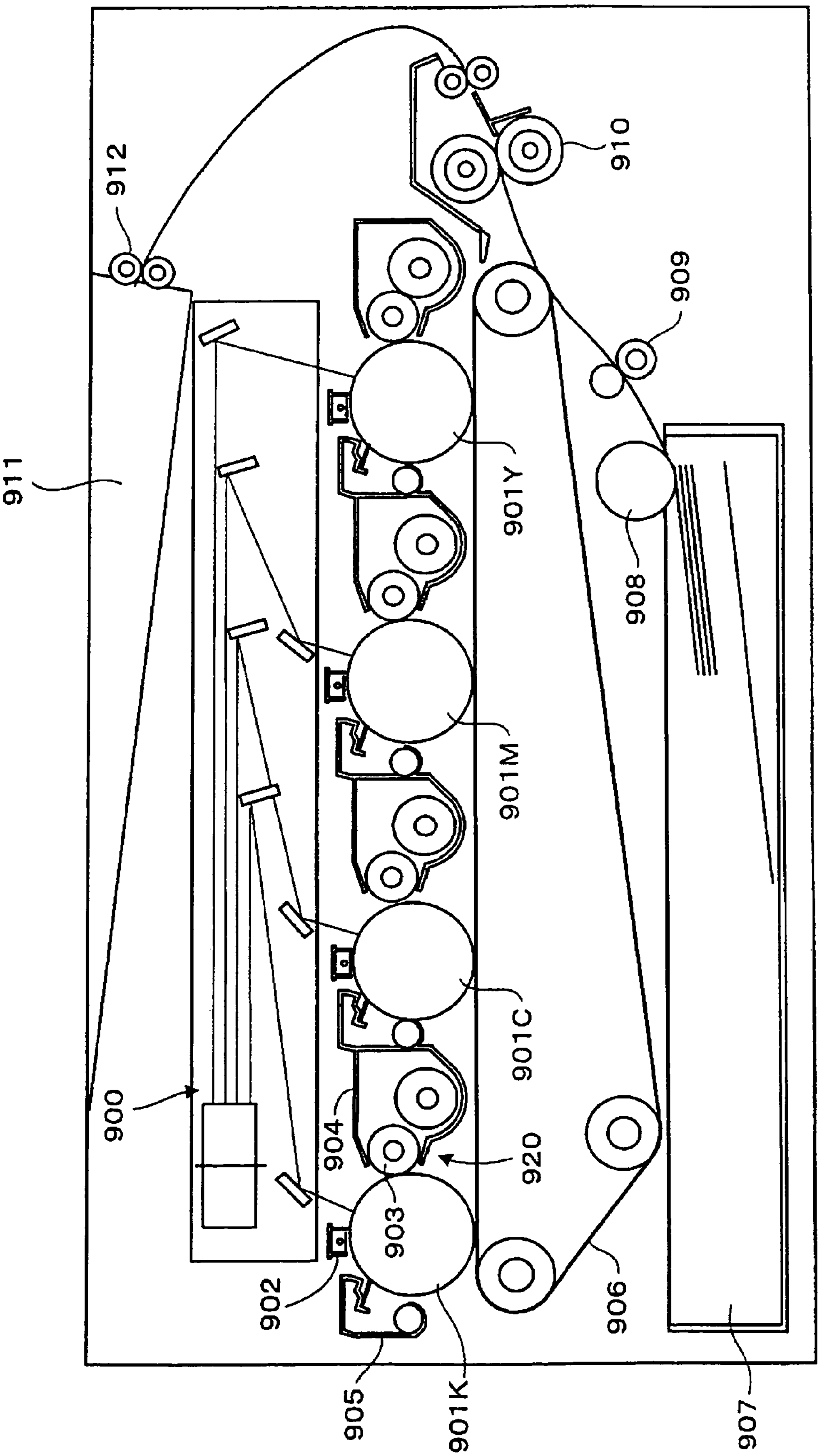
FIG. 12 is a schematic diagram showing the construction of an embodiment of the image forming apparatus that uses the optical scanning apparatus of the present invention.

FIG. 12 shows an embodiment of the image forming apparatus that uses an optical scanning apparatus 900 having a construction identical to that of the optical scanning apparatus 10.

In this diagram, there are disposed, around a photosensitive drum 901Y, a charger 902 for charging the photosensitive drum 901Y to high voltage, a developing roller 903 for developing the electrostatic image recorded on the photosensitive drum 901Y by the optical scanning apparatus 900 by attaching charged toners, and a toner cartridge 904 supplying toners to the developing roller 903, wherein the developing roller 903 and the toner cartridge 904 constitutes a developing apparatus 920. Further, there is disposed a cleaning case 905 for scraping off the toners remaining on the photosensitive drum 901Y and storing the scraped toners.

The charger 902, the developing apparatus 920 and the cleaning case 905 are provided also around other photosensitive drums although not provided with reference numerals.

On the photosensitive drum, plural scanning lines are recorded simultaneously by each facet of the polygonal mirror. In the present embodiment, five scanning lines are recorded simultaneously.

The image forming station explained before are arranged in the moving direction of the toner image transfer belt 906, and thus, toner images of yellow, magenta, cyan and black are formed consecutively on the toner image transfer belt 906 with synchronized timing. Thereby, the toner images are superimposed and a color toner image is formed on the toner image transfer belt 906. It should be noted that the construction the image forming station is identical for each of the image forming stations except for the color of the toner.

Further, recording sheet is fed from a sheet tray 907 by sheet feed roller 908 with a timing synchronized to the start of recording in the sub scanning direction by a resist roller pair 909, and the color image is recorded thereto from the toner image transfer belt 926. The toner image thus transferred is developed by a developing roller 910, and after this, the sheet is discharged to a collection tray 911 by a discharge roller 912.

Figure 17:
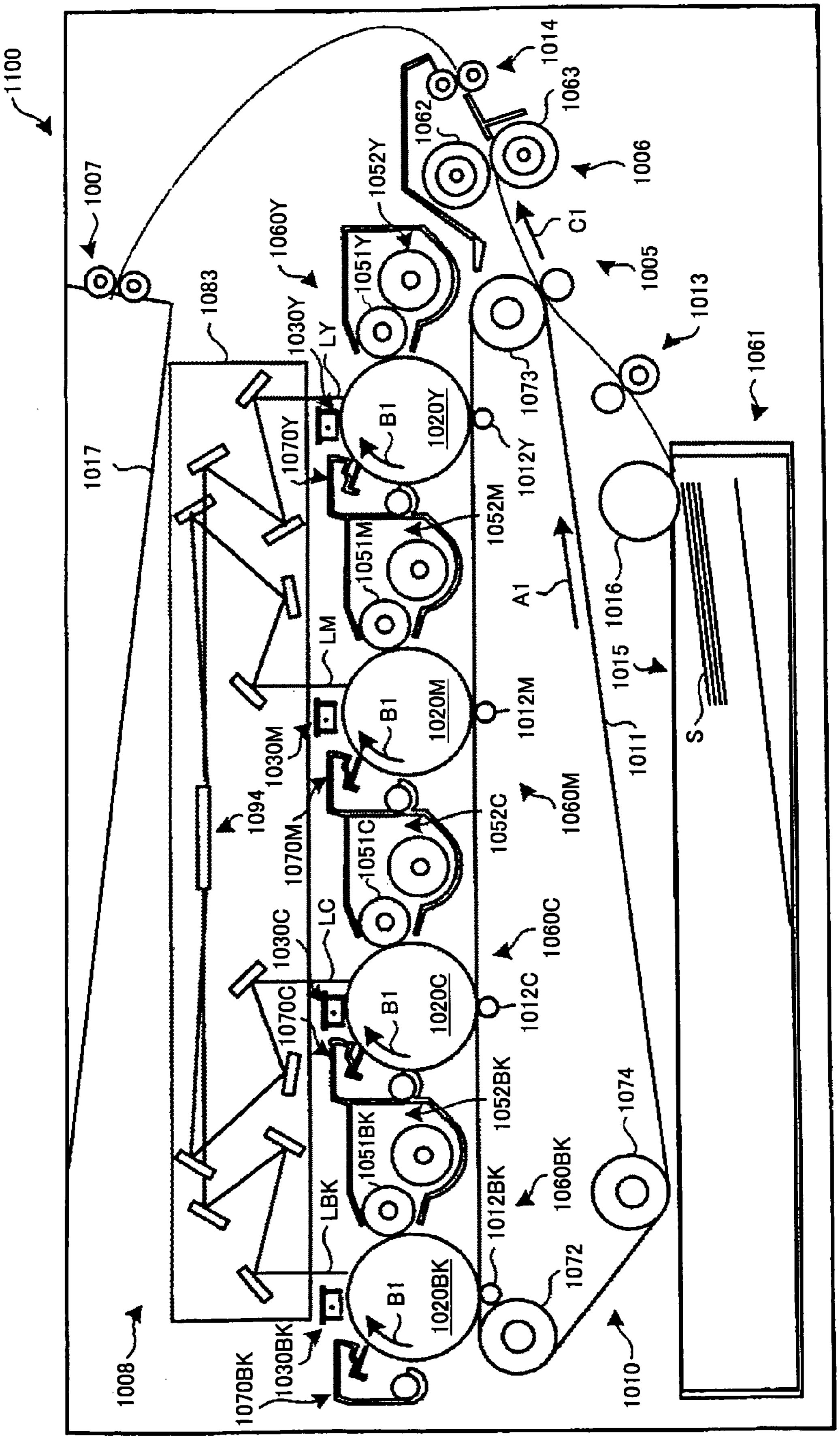
FIG. 17 is a schematic front view diagram showing the image forming apparatus to which the present invention is applied.

FIG. 17 shows the outline of an image forming apparatus 1100, which is a multicolor image forming apparatus capable of forming color images to which the present invention is applied. The image forming apparatus 1100 is explained as a color laser printer, but the image forming apparatus 1100 can be used also for other printers of different types such as facsimile, copier, a composite machine of copier and printer, and the like.

The image forming apparatus 1100 carries out image formation based on image signal corresponding to image information received from outside. The same applies also to the case in which the image forming apparatus 1100 is used as a facsimile. The image forming apparatus 1100 can carry out image formation not only on plain paper used commonly for copying but also on other sheet such as an OHP sheet, a thick sheet such as a card or postcard, or on an envelope.

The image forming apparatus 1100 is an image forming apparatus of tandem type in which photosensitive drums 1020Y, 1020M, 1020C and 1020BK are arranged parallel to form a tandem structure of plural image carrying bodies formed with respective color-decomposed images of yellow, magenta, cyan and black. The photosensitive drums 1020Y, 1020M, 1020C and 1020BK have the same diameter, and are arranged with the same interval at the outer surface side of an intermediate toner image transfer belt 1011, which is an endless belt disposed generally centrally to a main body of the image forming apparatus 1100.

The intermediate belt 1011 is movable in the direction of an arrow A1 in the state of facing to the photosensitive drums 1020Y, 1020M, 1020C and 120BK. Thereby, the visible images or toner images formed on the photosensitive drums 1020Y, 1020M, 1020C and 1020BK are transferred to the intermediate transfer belt 1011 moving in the A1 direction in superimposed state, and the superimposed images thus formed are transferred to a sheet S used as a recording medium simultaneously.

The superimposing transfer of the toner images to the intermediate toner image transfer belt 1011 is conducted by applying a voltage to the primary transfer roller 1012Y, 1012M, 1012C and 1012BK respectively provided so as to face the photosensitive drums 1020Y, 1020M, 1020C and 1020BK across the intermediate transfer belt 1011 such that the toner images formed on the photosensitive drums 1020Y, 1020M, 1020C and 1020BK are transferred to the intermediate transfer belt 1011 at respective positions corresponding to the photosensitive drums 1020Y, 1020M, 1020C and 1020BK with different timing from the upstream direction to the downstream direction or A1 direction, while transporting the intermediate transfer belt 1011 in the A1 direction. Thereby, transfer of the toner image takes plate at respective transfer positions located immediately underneath the photosensitive drums 1020Y, 1020M, 1020C and 1020BK.

The intermediate transfer belt 1011 is an elastic belt, the entire layers of which being formed by an elastic member such as rubber. On the other hand, the transfer belt 1011 may be a single layer elastic belt or an elastic belt that uses an elastic member in a part thereof. Alternatively, the transfer belt 1011 may be formed of a fluoric resin, a polycarbonate resin, or the like. Further, the transfer belt 1011 may be a non-elastic belt.

It should be noted that the photosensitive drums 1020Y, 1020M, 1020C and 1020BK are arranged in the A1 direction from the upstream side to the downstream side with this order. Because the photosensitive drums 1020Y, 1020M, 1020C and 1020BK are used to form images of yellow, magenta, cyan and black, respectively, the photosensitive drums 1020Y, 1020M, 1020C and 1020BK are provided respectively to the image forming stations 1060Y, 1060M, 1060C and 1060BK respectively acting as image formation parts of yellow images, magenta images, cyan images and black images.

It should be noted that the image forming apparatus 1100 includes: four image forming stations 1060Y, 1060M, 1060C and 1060BK; a transfer belt unit 1010 disposed underneath the respective photosensitive drums 1020Y, 1020M, 1020C and 1020BK and including the transfer belt 1011; a secondary transfer roller 1005 disposed so as to face the transfer belt 1011 in contact therewith and causing transfer of the images on the transfer belt 1011 to a sheet moved in the same direction as the transfer belt 1011 at the contact position to the transfer belt; a cleaning blade not illustrated used for a cleaning device of the intermediate transfer belt disposed so as to face the transfer belt 1011 for cleaning the transfer belt 1011; and an optical scanning apparatus 1008 formed by an optical writing apparatus and provided above the image forming stations 1060Y, 1060M, 1060C and 1060B as writing means of images.

Further, the image forming apparatus 1100 includes a sheet feeding device 1061 loaded with sheets S to be transported along a path between the photosensitive drums 1020Y, 1020M, 1020C and 1020BK and the toner image transfer belt 1011; a resist roller pair 1013 sending the sheet S from the sheet feeding device 1061 to the image transfer part formed by the image transfer belt 1011 and the secondary transfer roller 5 with a predetermined timing corresponding to the timing of toner image formation at the image formation stations 1060Y, 1060M, 1060C and 1060BK; and a sensor not illustrated for detection that the leading edge of the transfer sheet has reached the resist roller pair 1013.

Further, the image forming apparatus 1100 includes a fixing device 1006 realized in the form of a roller fixing unit and fixing the toner images upon the sheet S as it is transported in the direction C1 in the state of carrying the unfixed toner images thereon; a transfer roller 1014 for transferring the sheet fixed with the toner images; a sheet discharging roller 1007 for discharging the sheet transported by the transportation roller 1014 to the outside of the body of the image forming apparatus 1100; a sheet tray 1017 disposed at the upper part of the body of the image forming apparatus 1100 and collecting the sheets discharged by the discharge roller 1007; and toner bottles not illustrated for holding toners of respective colors of yellow, magenta, cyan and black.

The transfer belt unit 1010 includes, in addition to the transfer belt 1011 itself, primary transfer rollers 1012Y, 1012M, 1012C and 1012BK, a drive roller 1072, a transfer entrance-side roller 1073, a tension roller 1074 and a spring not illustrated for urging the tension roller 1074 in the direction of increasing the tension of the transfer belt 1011, wherein the rollers 1072, 1073 and 1074 are wound around with the transfer belt 1011 and form plural sheet rolling members. The drive roller 1072 is driven by a motor not illustrated and used as the driving source, and with this, the transfer belt 1011 is rotated in the A1 direction.

The sheet feeding apparatus 1061 includes a sheet feed tray 1015 loaded with the sheets S and a sheet feeding roller 1016 for sending out the sheet on the sheet feed tray 1015 one by one.

The fixing apparatus 1006 includes a fixing roller 1062 having a heat source inside, and a pressure roller 1063 is pressed against the fixing roller 1062, wherein the unfixed toner image held on the sheet S is fixed upon the surface of the sheet S by the pressure and heat as it is passed through the fixing part where the fixing roller 1062 and the pressure roller 1063 are pressed together.

The optical scanning apparatus 1008 produces laser beams LY, LM, LC and LBK in response to an image signal such that the laser beams scan the respective surfaces of the photosensitive drums 1020Y, 1020M, 1020C and 1020BK and cause formation of electrostatic latent images thereon.

Hereinafter, the construction of the image forming stations 1060Y, 1060M, 1060C and 1060BK will be explained for the example of the image forming station 1060Y that includes the photosensitive drum 1020Y.

Because other image forming stations have substantially the same construction, detailed description thereof will be omitted by using the same reference numerals for the sake of convenience, except that designation Y, M, C and K are attached to the end of each reference numeral. Here, Y, M, C and K respectively represent the part used for image formation of yellow, magenta, cyan and black.

The image forming station 1060Y includes, in addition to the photosensitive drum 1020Y: a primary transfer roller 1012Y; a cleaning device 1070Y used as the cleaning means for cleaning the photosensitive drum 1020Y; a charging device 1030Y used as the charging means for charging the photosensitive drum 1020Y with high voltage; and a developing device 1050Y used as the developing means for developing the photosensitive drum 1020Y with toner, wherein the primary transfer roller 1012Y, the cleaning device 1070Y, the charging device 1030Y and the developing device 1050Y are arranged around the photosensitive drum 1020Y along a rotational direction B1 (clockwise direction in the drawing) thereof.

The developing device 1050Y includes a developing roller 1051Y disposed so as to oppose with respect to the photosensitive drum 1020Y and a toner cartridge 1052Y supplying toners to the developing roller 1051Y.

With such a construction, the photosensitive drum 1020Y is charged at the surface thereof uniformly by the charging device 1030Y as it is rotated in the B1 direction, and electrostatic latent image corresponding to yellow color is written by scanning of the laser beam LY from the optical scanning apparatus 1008. It should be noted that the formation of this electrostatic latent image is made with the scanning of the optical beam LY in the main scanning direction perpendicular to the plane of the drawing and further in the sub-scanning direction coincident to the circumferential direction of the photosensitive drum 1020Y with the rotation of the photosensitive drum 1020Y made in the B1 direction.

The electrostatic latent image thus formed is developed by adhering the charged toners of yellow color supplied from the developing device 1050Y, and a yellow toner image is formed as a visible image. This yellow toner image thus obtained as a result of developing is transferred upon the transfer belt 1011 moving in the A1 direction by the action of the primary transfer roller 1012Y, while residual toners or other exotic materials remaining on the photosensitive drum 1020Y after the developing are scraped off by the cleaning device 1070Y and stored. Thereafter, the photosensitive drum 1020Y is subjected for next discharging and charging process by the charging device 1030Y.

In other photosensitive drums 1020C, 1020M and 1020BK, the toner images of the respective colors are formed similarly, and the toner images of the respective colors thus formed are transferred to the photosensitive belt 110 moving in the A1 direction at the same position consecutively by the action of the primary transfer rollers 1012C, 1012M and 1012BK.

The toner images thus superimposed on the transfer belt 1011 are moved to a secondary transfer position corresponding to the secondary transfer roller 1005 with the movement of the transfer belt 1011 in the A1 direction and are transferred to the sheet S in this secondary transfer position.

It should be noted that the sheet S is fed from the sheet feeding device 1061 along the path between the transfer belt 1011 and the secondary transfer roller 1005 by the resist roller pair 1013 with a timing determined by a detection signal from the sensor such that the leading edge part of the superimposed toner images on the transfer belt 1011 reaches the secondary transfer roller 1005.

The sheet S is then transferred with all the superimposed color toner images simultaneously. The sheet S thus carrying the superimposed color toner images is then transported in the C1 direction to the fixing device 1006, and the color toner images thereon are fixed in the form of a fixed, permanent color image as the sheet is passed between the fixing roller 1062 and the pressure roller 1063 forming the fixing part as a result of action of heat and pressure.

The sheet S thus fixed with the color image in the developing device 1006 is then transported by the transportation roller 1014 and the discharge roller 1007 and is stacked on the collection tray 1017 provided at the upper part of the body of the image forming apparatus 1100. On the other hand, the toner image transfer belt 1011 thus finished with the toner image transfer (secondary transfer) is cleaned by the cleaning device for preparation of the next toner image transfer (primary transfer) from the photosensitive drums.

Figure 18:
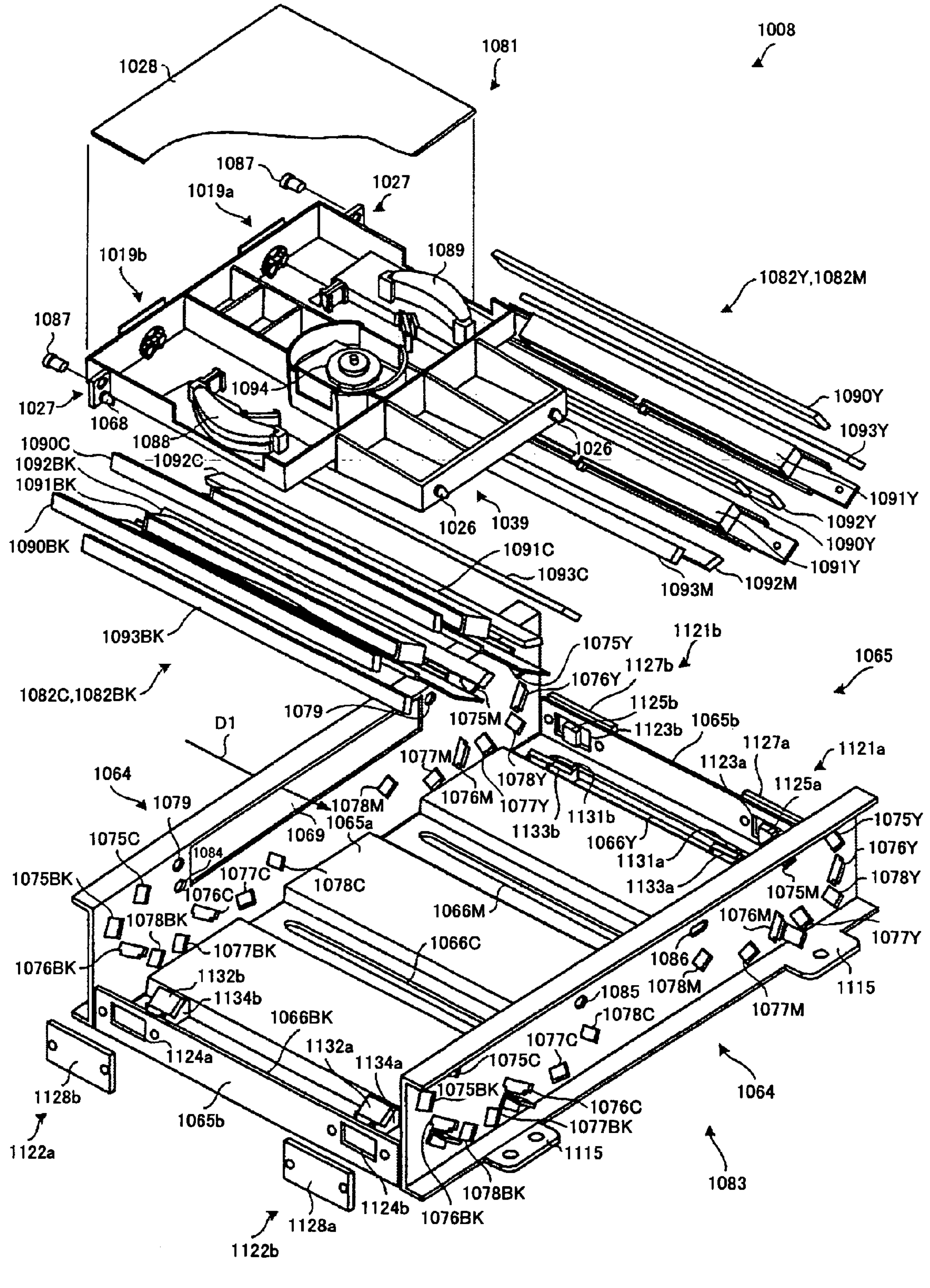
FIG. 18 is an exploded oblique view diagram of the optical scanning apparatus used in the image forming apparatus of FIG. 17.

FIG. 18 shows the construction of the optical scanning apparatus 1008. In the explanation hereinafter, the designation Y, M, C and BK attached to the end of the reference numerals indicates that the part designated by these is either for yellow color component, magenta color component, cyan color component or black. In the case it is thought not necessary to distinguish the parts by the color, the designation of Y, M, C and BK may be omitted.

Figure 19:
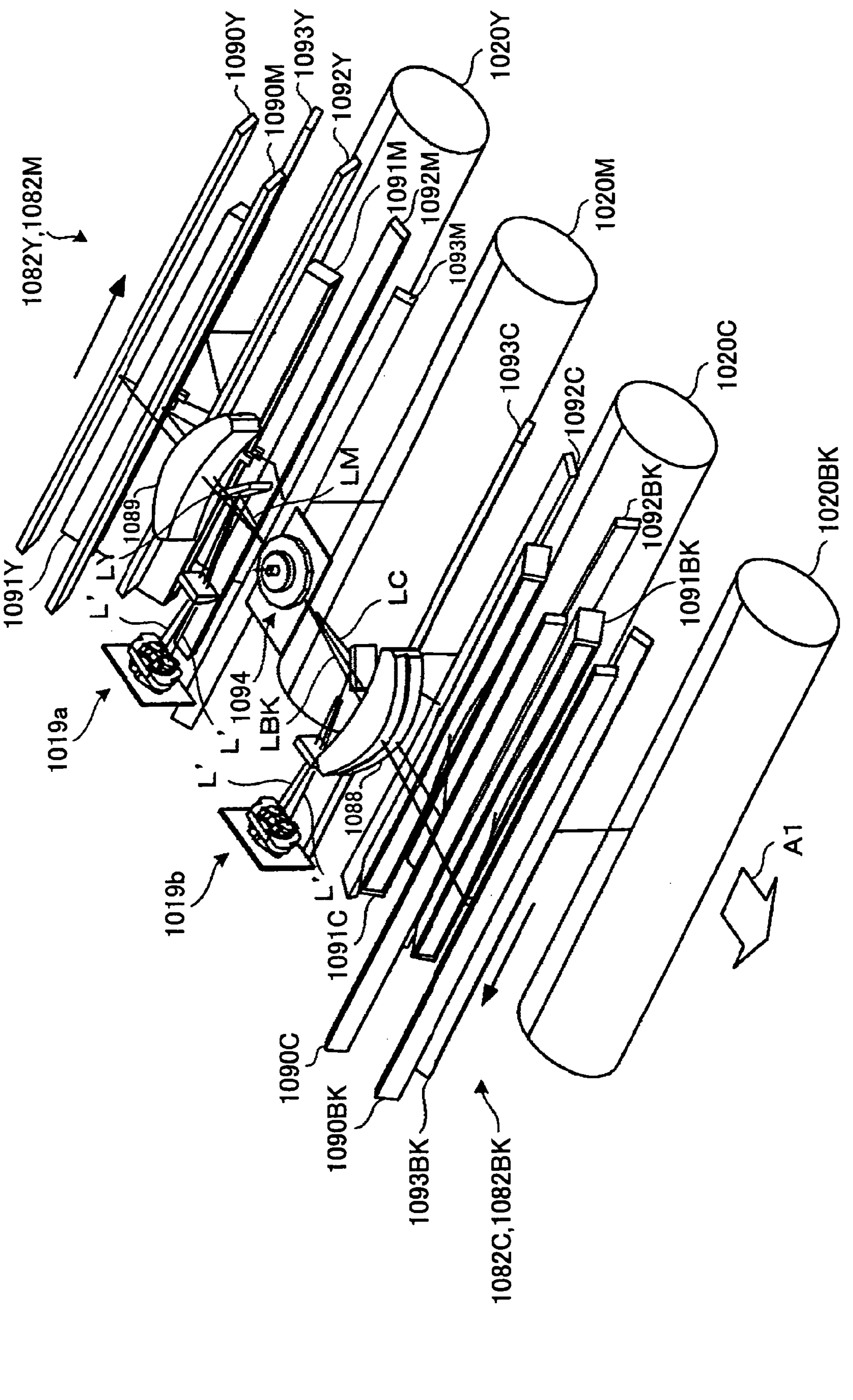
FIG. 19 is an oblique view diagram showing the optical source, deflection member and plural optical elements used in the optical scanning apparatus of FIG. 18 together with the image carriers used in the image forming apparatus of FIG. 17.

As shown in FIG. 18, the optical scanning apparatus 1008 has an integrated construction in which all the parts thereof are integrated into a single body and includes: an optical source unit 1019*a* producing laser beams L' and L' shown in FIG. 19 respectively in correspondence to yellow and magenta color components; an optical source unit 1019*b* producing laser beams L' and L' respectively in correspondence to cyan and black color components; an optical deflector 1081 provided by a polygonal mirror functioning as the optical deflection means for deflecting the optical beams emitted from the optical source units 1019*a* and 1019*b*; and a scanning and imaging optical system 1082Y, 1082M, 1082C and 1082BK provided in the form of an optical element group including plural optical elements that direct the optical beams LY, LM, LC and LBK deflected by the optical deflector 1081 to the scanning surfaces of the respective corresponding photosensitive drums 1020Y, 1020M, 1020C and 1020BK as shown in FIG. 19.

Figure 25:
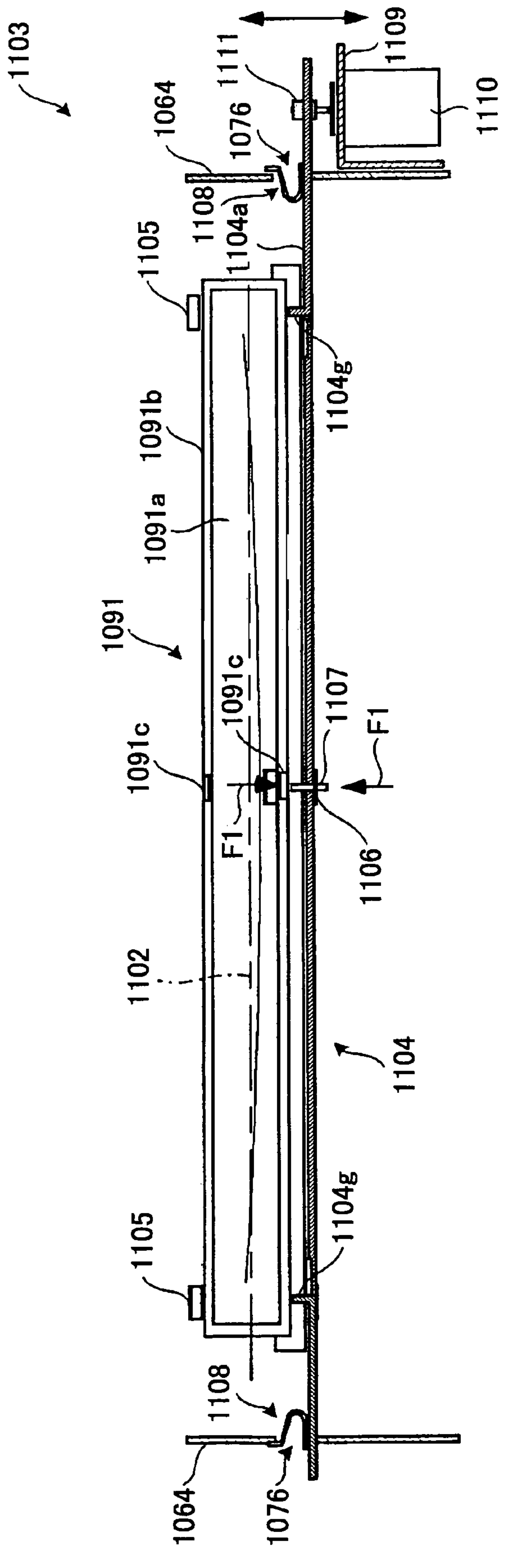
FIG. 25 is a cross-sectional diagram showing one of the optical elements used in the optical scanning apparatus of FIG. 18 and having a power at least in the main scanning direction together with the construction of the positioning adjustment means thereof.

Further, the optical scanning apparatus 1008 includes a frame 1083 supporting the optical source units 1019*a* and 1019*b*, the optical deflector 1081 and the scanning and imaging optical system 1082Y, 1082M, 1082C and 1082BK; beam detectors 1121*a* and 1121*b*, 1122*a* and 122*b* respectively acting as the beam detection means for detecting start and end of scanning of the optical beam LY and start and end of scanning of the optical beam LBK; mirrors 1131*a* and 1131*b*, 1132*a* and 1132*b* respectively reflecting the optical beam LY to the beam detectors 1121*a* and 1121*b* and the optical beam LBK to the detectors 1122*a* and 1122*b*; support members 1133*a*, 1133*b*, 1134*a* and 1134*b* respectively holding mirrors 1131*a*, 1131*b*, 1132*a* and 1132*b*; a support mechanism 1103 shown in FIG. 25; and control means not illustrated such as a CPU that controls scanning of the optical beams LY, LM, LC and LBK based on the detection by the beam detectors 1121*a*, 1121*b*, 1122*a* and 1122*b*.

The optical units 1019*a* and 1019*b* are substantially identical with those explained before with reference to FIG. 8 and the description thereof will be omitted.

It should be noted that the optical deflector 1081 is located generally at the center of the frame 1083 in the direction A1 in which the photosensitive drums 1020Y, 1020M, 1020C and 1020BK are aligned.

Figure 20:
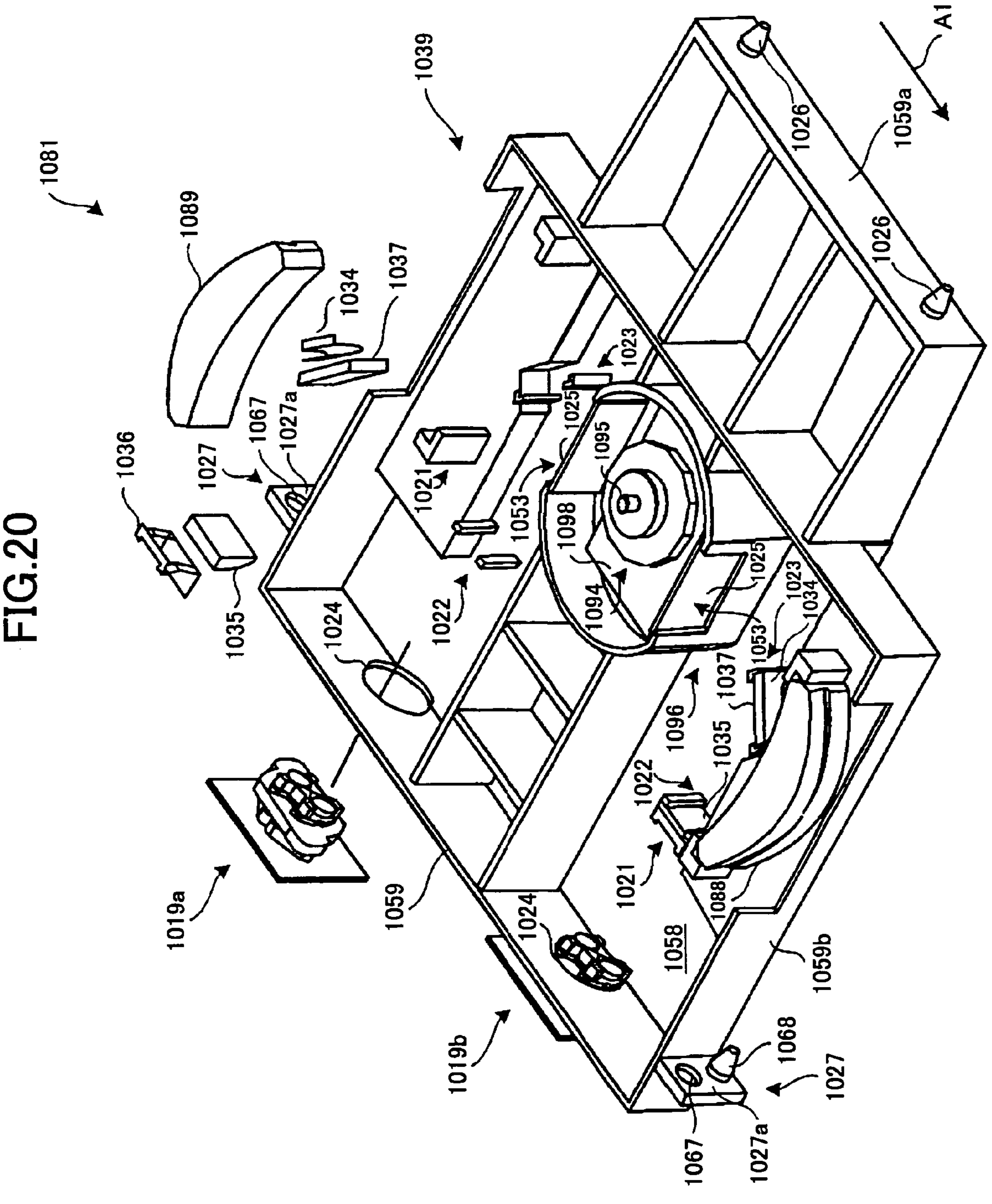
FIG. 20 is an exploded oblique view diagram showing the internal structure of the optical scanner provided to the optical scanning apparatus of FIG. 18.

As shown in FIG. 20, the optical deflector 1081 includes: scanning lenses 1088 and 1089 forming the scanning and imaging optical system 1082; a polygonal mirror 1094 provided between the scanning lenses 1088 and 1089 as a rotary optical deflection member; a shaft 1095 used as a bearing shaft at the center of rotation of the polygonal mirror 1094 as a rotational axis of the polygonal mirror 1094; a polygon motor rotating the polygonal mirror 1094 via the rotational shaft 1095; a drive circuit not illustrated for driving the polygon motor; a substrate 1098 carrying the drive circuit; and transparent covers 1025 and 1025 disposed at both sides of the polygonal mirror 1094 in the direction A1 in which the photosensitive drums 1020Y, 1020M, 1020C and 1020BK re arranged.

Further, the optical deflector 1081 includes cylindrical lenses 1035 and 1035 to which the optical beams L' from the optical source units 1019*a* and 1019*b* impinge first; leaf springs 1036 and 1036 contacting with the cylindrical lenses 1035 and 1035 respectively; mirrors 1037 and 1037 deflecting the optical beams L' passed through the cylindrical lenses 1035 and 1035 to the polygonal mirror 1094; leaf springs 1034 and 1034 contacting with the mirrors 1037 and 1037 respectively; and a housing 1039 accommodating therein the polygonal mirror 1094, the shaft 1095, the polygonal motor and the driver circuit, the substrate 1098, the transparent covers 1025 and 1025, cylindrical lenses 1035 and 1035, leaf springs 1036 and 1036, mirrors 1037 and 1037, and the leaf springs 1034 and 1034. Further, the housing 1039 is mounted with the optical source units 1019*a* and 1019*b*.

The housing 1039 includes a bottom plate 1058, a wall part bent vertically to the bottom plate 1058 so as to surround the bottom plate 1058, a pair of rib parts 1021 and 1021 each formed of two rib members and provided on the bottom plate 1058 so as to extend vertically therefrom for mounting the scanning lenses 1088 and 1089, a pair of ribs 1022 and 1022 each formed of two rib members and provided on the bottom plate 1058 so as to extend vertically therefrom for mounting the cylindrical lenses 1035 and 1035, a pair of ribs 1023 and 1023 each formed of two rib members and provided on the bottom surface 1058 so as to extend vertically therefrom for mounting the mirrors 1037 and 1037, and a pair of holes 1024 and 1024 provided on the wall part 1059 so as to allow insertion of a part of the optical source units 1019*a* and 1019*b* from outside.

The housing 1039 further includes a pair of projecting pins 1026 and 1026 provided on a front surface 1059*a* of the wall part 1059 and a pair of projecting flange parts 1027 and 1027 or ear formed on sidewall surfaces 1059*b* of the wall part 1059, wherein the projections 1026 and 1027 are provided for the positioning part positioning the housing 1039 with respect to the frame 1083.

Further, the housing 1039 includes a motor housing part 1096 provided at the central part thereof so as to cover the polygonal mirror 1094, the shaft 1095, the polygon motor, the driver circuit and the substrate 1098 together with the transparent covers 1025 and 1025, in the manner that the motor housing part 1096 opposes the scanning lenses 1088 and 1089.

The flanges 1027 and 1027 are formed respectively with screw holes 1067 and 1067.

One of the flanges 1027 has a projecting pin 1068 at the front surface 1078*a* thereof.

The motor housing part 1096 includes a wall part provided at the central part of the housing 1039 so as to extend vertically therefrom in a cylindrical form surrounding the polygonal mirror 1094, the shaft 1095, the polygonal motor, the driver circuit and the substrate 1098, and cutout parts 1053 and 1053 are formed in the wall part 1029 in the part opposing the scanning lenses 1088 and 1089 such that the optical beam L passes therethrough. The cutout parts 1053 and 1053 are closed by transparent covers 1025 and 1025 from inside of the motor housing part 1096.

As shown in FIG. 19, the upper opening of the housing g1039 is sealed by a cover 1028, and with this, the housing 1039 and the interior of the motor housing 1096 are closed. With such closure of interior of the motor housing part 1096, the viscous drag of the air at the corner part of the rotating polygonal mirror is reduced and the load to the motor is reduced. Further, the noise is reduced.

Figure 21:
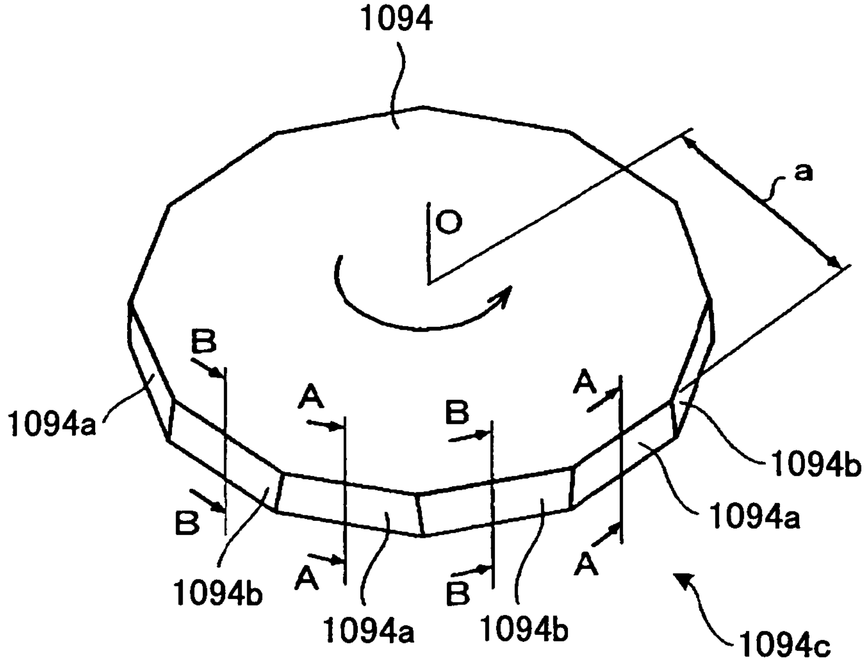
FIG. 21 is an oblique view diagram showing the construction of the deflecting member provided to the optical scanning apparatus of FIG. 18.

As shown in FIG. 21, the polygonal mirror 1094 has the shape in which two different deflection facets 1094*a* and 1094*b* are formed alternately along a circumferential surface 1094*c* with respective tilting angles to a base plane perpendicular to the rotational axis O of the mirror 1094 coincident to the center. In FIG. 21, it should be noted that the reference numeral a shows the diameter of an inscribing circle of the polygonal mirror 1094 inscribing the circumferential surface 1094*c*.

Figure 22A:
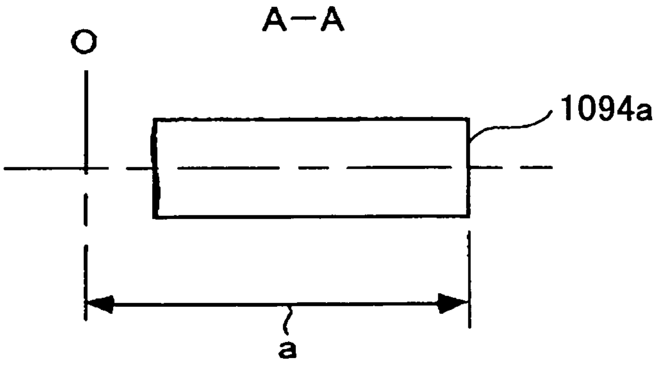
FIGS. 22A and 22B are enlarged cross-sectional diagrams of deflection facets of the deflection member shown in FIG. 21.
Figure 22B:
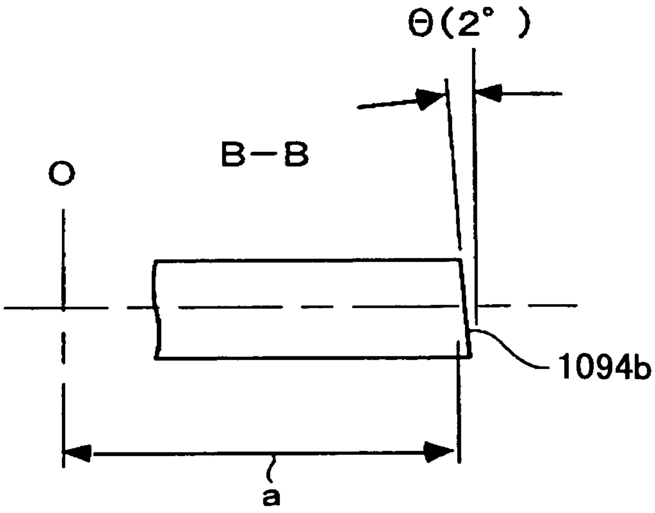
Figure 23:
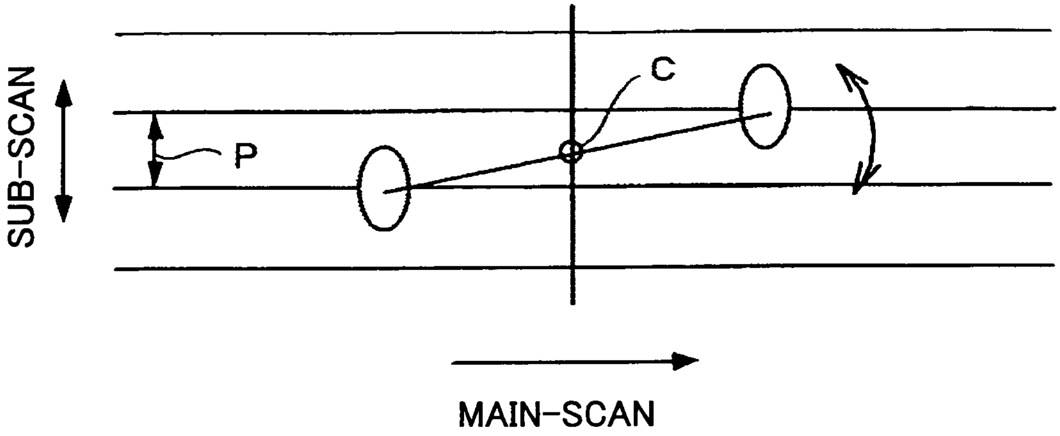
FIG. 23 is a schematic diagram showing an example of scanning caused by the optical source in the optical scanning apparatus of FIG. 18.

As shown in the cross-sectional view of FIG. 22A, the deflection facet 1094*a* is a surface perpendicular to the reference surface when viewed in a cross-section A-A, while the deflection facet 1094*b* is a surface tilted by a predetermined angle θ, which is about 2 degrees in the present example, with respect to the deflection facet 1094*a* when viewed in a cross-section B-B.

It should be noted that the radius a is set to be equal in each of the deflection facet 1094*a* and 1094*b* in the cross-section taken parallel to the reference surface at the height of about ½ the thickness of the polygonal mirror 1094.

Thus, at the circumferential surface 1094*c* of the polygonal mirror 1094, the normal direction is different between the deflection facet 1094*a* and the deflection facet 1094*b* and there is formed an angle of about 4 degrees between the optical beam LM reflected by the deflection facet 1094*a* and the optical beam LY reflected by the deflection facet 1094*b*. Similarly, there is formed an angle of about 4 degrees between the optical beam LC reflected by the deflection facet 1094*a* and the optical beam LBK reflected by the deflection facet 1094*b*, and the optical path of the optical beam is switched in the vertical scanning direction in each facet 1094*a* and 1094*b*.

Further, it should be noted that the scanning direction of the optical beam L by the polygonal mirror 1094, and hence the main scanning direction, is opposite in the mutually opposing sides of the optical scanning apparatus. Thus, the main scanning direction at the side where the optical beams LY and LM cause the scanning and the main scanning direction at the side where the optical beams LC and LBK cause the scanning are opposite. Further, it should be noted that the polygonal mirro 1094 write a line image such that the write start position of one side coincides with the write end position of the other side.

Further, it should be noted that the shaft 1095 of the polygonal mirror 1094 is deposed perpendicularly to the reference surface and parallel to the sub scanning direction.

The scanning lenses 1088 and 1089 are jointed to the bottom plate 1058 and supported thereon in the state that the first surface side, to which the beam L comes in, is abutted to the rib 1021.

Further, the cylindrical lenses 1035 and 1035 has a cylindrical surface having a curvature only in the sub scanning direction at the first side to which the beam L' comes in, and there is formed a flat surface at the second side, from which the optical beam L' exits.

The cylindrical lenses 1035 and 1035 are held in the state that the flat surface side is abutted to the rib 1022 and urged toward the housing 1039 by a leaf spring 1038 screwed upon the housing 1039.

Further, it should be noted that the cylindrical lenses 1035 and 1035 have a semi-cylindrical shape in which only the lower side to the optical axis is left. Thus, the optical beam L' is incident with eccentricity in the sub scanning direction and is exit in the state slightly inclined upward with respect to the horizontal plane.

As will be explained later, the cylindrical lenses 1035 and 1035 form an optical face tangle error correction for laser scanning system together with a toroidal lens 1091 included in the scanning and imaging optical system 1082 as will be explained layer for making the deflection facets 1094*a* and 1094*b* and the surface 1020 of the photosensitive drum to be conjugate in the sub scanning direction. The beam L is focused upon the deflection facets 10945*a* and 1094*b* in the form of line extending in the sub scanning direction.

The mirrors 1037 and 1037 are supported in the state that the reflection surfaces thereof are abutted to the ribs 1023 and 1023 and being urged thereto by leaf springs 1034 and 1034 inserted between the mirror 1037 and the housing.

It should be noted that the mirrors 1037 and 1037 changes the direction of the optical beam L' tilted in the sub scanning direction such that the optical beam L' hits the polygonal mirror 1094 directly from the front direction.

The optical units 1019*a* and 1019*b* are screwed upon the wall part 1059 from outside by inserting cylindrical parts 1054*a* and 1054*b* of holder members 1139*a* and 1139*b* to corresponding holes 1024 and 1024 in the state that contact surfaces 1071*a* and 1071*b* make an abutting engagement with the wall part 1059. Thereby, by adjusting a tilting angle γ with respect to the cylindrical parts 1054*a* and 1054*b*, the beam spot interval in the sub scanning direction can be adjusted to be equal to the scanning line pitch P determined by the recording density.

Thus, in the construction of the present embodiment, the optical source units 1019*a* and 1019*b* cause scanning of two lines simultaneously with separation in the vertical scanning direction by one line pitch, and thus the scanning line pitch P, which is determined by the recording density. Thus, there occurs no decrease of recording speed of images even when the deflection facets 1094*a* and 1094*b* of the polygonal mirror 1094 cause intermittent scanning.

In the optical deflector 1081 of such a construction, the optical beams L' emitted from the optical source unit 1019*a* and 1019*b* enter the cylindrical lens 1035 and are directed to the motor housing part 1096 via the mirror 1037.

Thereby, incidence of the optical beams L' to the polygonal mirror 1094 is made in the motor housing part 1096 in opposite directions when viewed in the plane of sub scanning cross section including the shaft 1095. It should be noted that the scanning lenses 1088 and 1089 and other optical elements 1090, 1091, 1092 and 1093 constituting the scanning imaging optical system 1082 are constructed such that respective optical axes are also included in this sub scanning cross-section.

Thereby, exit, and hence deflection, of the optical beams L from the polygonal mirror 1094 is made in both directions symmetrically about the optical axes of the optical beams L'.

It should be noted that incidence of the optical beams L' into the motor housing part 1096 and the exiting of the optical beams L deflected by the polygonal mirror 1094 from the motor housing part 1096 are achieved via transparent covers 1025 and 1025. In other words, incident and exit of the optical beams L' and L to and from the polygonal mirror 1094 is achieved through the transparent covers 1025 and 1025.

It should be noted that each optical beams L' has a beam diameter larger than the deflection facets 1094*a* and 1094*b*, and only the part of the beam that has been reflected with rotation of the deflection facets 1094*a* and 1094*b* is used for the scanning. This means that the optical deflector 1081 forms a so-called over field optical system.

The optical beams L deflected by the polygonal mirror 1094 and exited from the motor housing part 1096 are passed through the scanning lenses 1088 and 1089 respectively and are directed to the outside of the optical deflector 1081.

Because the optical scanning apparatus 1008 uses the opposing scanning construction as noted already, the single polygonal mirror 1094 distributes the beam L in two opposite directions symmetrically about the shaft 1095 used as the center of rotation by causing reflection as shown in FIG. 17.

More specifically, the polygonal mirror 1094 reflects the optical beams LC and LBK in the left direction of FIG. 17 and the optical beams LM and LY in the right direction of FIG. 17. In order to secure necessary optical performance, the scanning lenses 1088 and 1089 are disposed symmetrically about the center of rotation of the polygonal mirror 1094.

Associated with this, the four image forming stations 1060Y, 1060M, 1060C and 1060BK are divided into two groups each including two stations and disposed symmetrically about the shaft 1095 coincident to the center of rotation of the polygonal mirror 1094.

Thus, as shown in FIGS. 18 and 19, the scanning and imaging optical system 1082 is disposed symmetrically about the plane including the shaft 1095 and crossing perpendicularly to the sub scanning cross section, wherein each of the scanning and imaging optical systems 1082Y and 1082M are provided in correspondence to the optical source unit 1019*a*, while each of the scanning and imaging optical systems 1082C and 1082BK are provided in correspondence to the optical source unit 1019*b*.

Figure 24B:
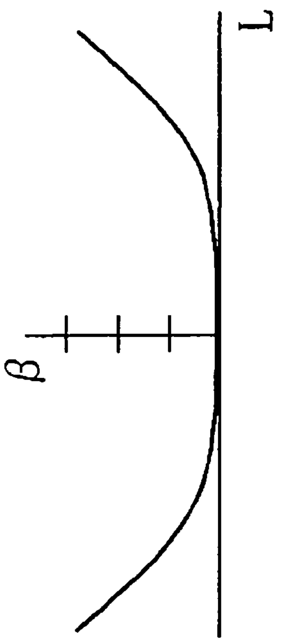
FIGS. 24A and 24B are conceptual diagrams showing the surface shape of the optical scanning element used in the optical scanning apparatus of FIG. 18 and located closest to the deflection member in the optical path of the optical beam.
Figure 24A:
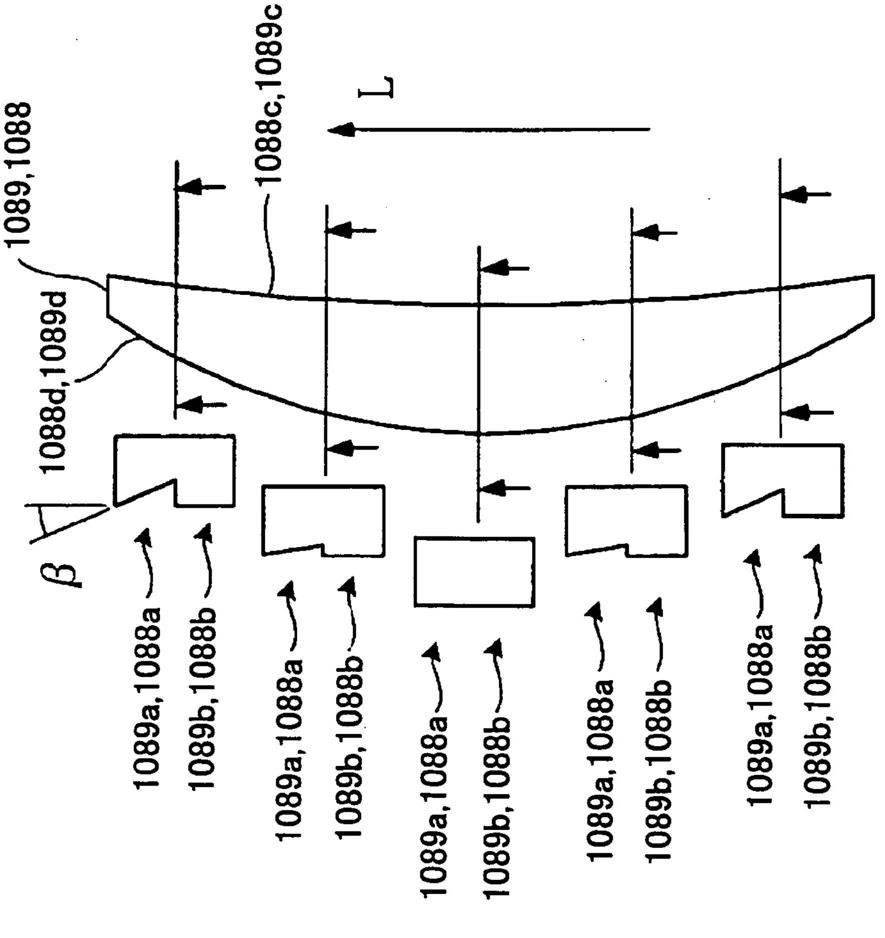

As shown in FIG. 24A, the scanning lenses 1088 and 1089 are formed to have a large thickness and have two-layer structure such that the lens 1088 includes an upper layer part 1088*a* and a lower layer part 1088*b*, while the lens 1089 includes an upper layer part 1089*a* and a lower layer part 1089*b*. Thereby, the lower layer part and upper layer part form a unitary body in each of the lenses 1088 and 1089, wherein the lenses 1088 and 1089 are formed by a resin material.

As shown in FIG. 24A, the scanning lenses 1088 and 1089 have flat end surfaces with no converging power in the sub scanning direction at surfaces 1088*c* and 1089*c* to which the optical beam L comes in and at surfaces 1088*d* and 1089*d* from which the optical beam L exits, while in the main scanning direction, both of the surfaces 1088*c* and 1089*c* and the surfaces 1088*d* and 1089*d* form a non-spherical curved surface.

Further, with regard to the second surfaces 1088*d* and 1089*d* of the scanning lenses 1088 and 1089, it should be noted that a lower part 1088*b* or 1089*b* thereof are formed parallel to the sub scanning direction, while the upper part 1088*a* or 1089*a* thereof forms an angle β with respect to the sub scanning direction and forms a deflection surface.

Thereby, the angle β is increased gradually in the main scanning direction from the center of the lens 1088 or 1089 toward the peripheral or edge part thereof, and thus, the surfaces 1088*d* and 1089*d* in the upper layer parts 1088*a* and 1089*a* of the scanning lenses 1088 and 1089 are offset. In the illustrated example, the angle β is changed in parabolic such that there appears a tilting of about 3 degrees at the edge parts of the scanning lenses 1088 and 1089 in the beam scanning direction.

Generally, oblique incidence of an optical beam L' to the deflection facets 1094*a* and 1094*b* of the polygonal mirror with tilting in the sub scanning direction with respect to the normal direction of the deflection facets 1094*a* and 1094*b*, the optical beam is rotated in the plane perpendicular to the optical axis with rotation of the polygonal mirror 1094, and there arises the problem of distortion of the optical beam. Thereby, such distortion can be canceled out by forming the second surfaces 1088*b* and 1089*b* in the form of a decentralized surface that causes face tangling gradually in the scanning direction, and with this, a uniform beam spot is obtained on the scanning surface of the photosensitive drum 1020 even in the case the optical beam L' is directed thereto obliquely.

Further, with regard to the different bending of the scanning lines caused with such distortion, it is possible to align the bending of the scanning lines by using a supporting mechanism 1103 to be explained with reference to FIGS. 25 and 26 as the bending adjustment means.

The optical beam L deflected by the deflection facet 1094*a* and the deflection facet 1094*b* of the polygonal mirror 1094 switches the optical path up and down in the sub scanning direction and passes through the scanning lenses 1088 and 1089 at respective, vertically separated positions.

More specifically, the scanning lens 1088 passes therethrough the optical beam LBK at the upper layer part 1088*a* and the optical beam LC at the lower layer part 1088*b*, while the scanning lens 1089 passes therethrough the optical beam LY at the upper layer part 1088*a* and the optical beam LM at the lower layer part 1088*b*.

Thus, the scanning lens 1088 is used commonly by the scanning and imaging optical systems 1082C and 1082BK and thus used commonly by the optical beams LBK and LC. Further, the scanning lens 1089 is used commonly by the scanning and imaging optical systems 1082M and 1082Y and thus used commonly by the optical beams LY and LM. By using the scanning lenses 1088 and 1089 located at closest positions to the polygonal mirror 1094, among the optical components 1088, 1089, 1090, 1091, 1092 and 1093 constituting the scanning and imaging optical system 1082, in the optical path of the optical beam L commonly, it becomes possible to suppress the influence of error of assembling or error at the time of manufacture on the optical beams LY and LM or optical beams LC and LBK, and it becomes possible to suppress the deviation of scanning position and maintain high precision scanning over a long time. Thereby, high quality image formation becomes possible.

The toroidal lens 1091 has a coaxial non-spherical surface at the first surface to which the optical beam L comes in and a toroidal surface at the second surface from which the optical beam exits. The toroidal lens has a power at least in the main scanning direction.

The scanning lenses 1088 and 1089 and the toroidal lens 1091 are formed of a low cost plastic material for easy molding, particularly polycarbonate or a synthetic resin containing polycarbonate as a main component, in view of low water absorption and high transparency and easiness of molding.

The mirrors 1090, 1092 and 1093 are formed by three mirrors for each of the scanning and imaging optical systems 1082Y, 1082M, 1082C and 1082BK and thus formed of the mirrors 1090Y, 1092Y, 1093Y, 1090M, 1092M, 1093M, 1090 C, 1092 C, 1093 C, 1090BK, 1092BK and 1093BK, and are arranged such that the optical path lengths from the deflection facet 1094*a* and the deflection facet 1094*b* to the beam irradiation position on the photosensitive drum 1020 take the same predetermined value, and that the optical beams LY, LM, LC and LBK hit the respective corresponding photosensitive drums 1020Y, 1020M, 1020C and 1020BK at the same angle.

Further, it should be noted that the phase of the optical irradiation position on the photosensitive drums 1020Y, 1020M, 1020C and 1020BK by the optical beams LY, LM, LC and LBK, in other words the rotational angle of the photosensitive drums 1020Y, 1020M, 1020C and 1020BK from the beam irradiation position to the toner image transfer position is identical in the photosensitive drums 1020Y, 1020M, 1020C and 1020BK.

In the scanning and imaging optical system 1082 of such a construction, the optical beams LM and LC deflected by the deflection facet 1094*a* reach the toroidal lenses 1091M and 1091C respectively after passed through the scanning lenses 1089 and 1088, by reflection caused by the mirrors 1090M and 1090C. The optical beams LM and LC exited from the toroidal lenses 1091M and 1091C are then directed to the photosensitive drums 1020M and 1020C respectively via the mirrors 1092M and 1092C or 1093M and 1093C.

The optical beams LY and LBK deflected by the deflection facet 1094*b* reach the toroidal lenses 1091Y and 1091BK respectively after passed through the scanning lenses 1089 and 1088, by reflection caused by the mirrors 1090Y and 1090BK. The optical beams LY and LBK exited from the toroidal lenses 1091Y and 1091BK are then directed to the photosensitive drums 1020Y and 1020BK respectively via the mirrors 1092Y and 1092BK or 1093Y and 1093BK.

The frame 1083 supports the scanning lenses 1088 and 1089, among the optical elements 1088, 1089, 1090, 1091, 1092 and 1093 constituting the scanning and imaging optical system 1082, indirectly via the optical deflector 1081. Further, the frame 1083 supports the mirrors 1090, 1092 and 1093 directly and the toroidal lens 1091 also directly. Further, the frame 1083 supports the optical source units 1019*a* and 1019*b* indirectly via the optical scanning apparatus 1081, and further the optical deflector 1081 directly.

As shown in FIG. 18, the frame 1083 includes a pair of side plates 1064 and 1064 disposed so as to face each other in the main scanning direction and supporting the respective ends of the mirrors 1090, 1092 and 1093 and the end parts of the toroidal lens 1091. Further, the frame 1083 includes a bottom plate 1065 disposed between the side plates 1064 and 1064 so as to connect the side plates 1064 and 1064 at both edges thereof.

The side plates 1064 and 1064 are connected to the bottom plate 1065 by calking such that the parallelism is maintained for the side plates 1064 and 1064.

It should be noted that the bottom plate 1065 is formed of a metal plate and provided with corrugation. Further, the bottom plate 1065 includes a bottom part 1065*a* corresponding to each of the photosensitive drums 1020Y, 1020M, 1020C and 1020BK and vertically bent parts 1065*b* and 1065*b* bent vertically from the bottom part 1065*a* at both ends thereof.

Further, the bottom part 1065*a* is formed with slit openings 1066Y, 1066M, 1066C and 1066BK each extending in the main scanning direction respectively at the positions corresponding to the beam irradiation positions of the photosensitive drums 1020Y, 1020M, 1020C and 1020BK. The bottom part 1065*a* is jointed with support members 1133*a*, 1133*b*, 1134*a* and 1134*b* on the top surface thereof in the vicinity of the vertically bent parts 1065*b* and 1065*b*, and hence in the vicinity of the edge parts in the main scanning direction.

The vertically bent parts 1065*b* and 1065*b* are respectively formed with openings 1123*a* and 1123*b* and openings 1124*a* and 1124*b* such that beam detectors 1121*a*, 1121*b*, 1122*a* and 1122*b* provided on the vertically bent parts 1065*b* and 1065*b* from outside are exposed at the respective, corresponding openings.

On the outer sides of the vertically bent parts 1065*b* and 1065*b*, substrates 1127*a*, 1127*b*, 1128*a* and 1128*b* of the beam detectors 1121*a*, 1121*b*, 1122*a* and 1122*b* are screwed in such a manner that photodetectors 1125*a*, 1125*b*, 1126*a* and 1126*b* of the beam detectors 1121*a*, 1121*b*, 1122*a* and 1122*b* to be described later are inserted into respective, corresponding openings 1123*a*, 1123*b*, 1124*a* and 1124*b* formed in the vertically bent parts 1065*b* and 1065*b*.

It should be noted that each of the side plates 1064 and 1064 is formed of a metal and is bent to have a U-shaped cross-s section. Thereby, the side plates 1064 and 1064 are formed with cutout openings 1075, 1075, 1076, 1076, 1077, 1077, 1078 and 1078 respectively for accepting respective ends of the mirror 1090, the toroidal lens 1091, the mirror 1092 and the mirror 1093 such that the mirror 1090, the toroidal lens 1091, the mirror 1092 and the mirror 1093 are supported on the side plates 1064 and 1064 in a bridging state. Further, the side plates 1064 and 1064 have plural mounting surfaces 1115 for mounting the optical scanning apparatus 1008 on the body of the image forming apparatus 1100. It should be noted that each of the cutout opening pairs 1075 and 1075, 1076 and 1076, 1077 and 1077, and 1078 and 1078 are formed in the state aligned in the main scanning direction.

Because the openings 1075 and 1075, 1076 and 1076, 1077 and 1077, and 1078 and 1078 are formed by punching, the openings 1075 and 1075, 1076 and 1076, 1077 and 1077, and 1078 and 1078 can formed with high precision by employing high precision punching pattern, and it becomes possible to support the mirror 1090, the toroidal lens 1091, the mirror 1092 and the mirror 1093 high precision. Thereby, deviation of scanning of the optical beam L is suppressed, and high precision optical beam scanning is maintained for prolonged time. Thus, it becomes possible to perform high quality image formation.

It should be noted that one of the side plates 1064 and 1064 has an elongated opening 1069 as the opening for inserting the optical deflector 1081. Thereby, the side plate 1064 that carries the elongated opening 1069 further includes openings 1079 and 1079 communicating with the openings 1067 and 1067 and a hole 1084 fitted with the pin 1068. Further, the side plate 1064 not having the elongated hole 1069 is equipped with a round hole 1085 used as a reference hole for engagement with one of the pins 1026 and 1026, and an elongated hole 1086 for engagement with the other of the pins 1026 and 1026.

Thus, the optical deflector 1081 is inserted from outside of the side plate 1064 having the elongated hole 1069 in the direction of arrow D1 through the elongated hole 1069 and is positioned with respect to the optical axis direction and the sub scanning direction by inserting the pins 1026 and 1026 respectively into the round hole 1085 and the elongated hole 1086.

At the same time, front surfaces 1027*a* and 1027*a* of the flanges 1027 and 1027 are abutted to the outer surface of the side plate 1064 having the elongated hole 1069, the pin 1068 is inserted in to the hole 1084, the holes 1067 and 1067 are communicated with the holes 1079 and 1079, the screwed 1078 and 1087 are screwed. With this, the optical deflector 1081 is fixed upon the frame 1083.

Thus, in the present embodiment, the optical deflector 1081 is positioned properly by engaging the housing 1039 thereof with respect to the side plates 1064 and 1064 in the main scanning direction, without decomposing the side plates 1064 and 1064 and thus maintaining the relationship between the side plates 1064 and 1064. Thereby, the optical deflector 1081 is positioned precisely in the main scanning direction and high precision scanning of the optical beam L is achieved for prolonged time. With this, the present embodiment can provide high quality image formation. In addition, the present embodiment enables detachable mounting of the optical deflector 1081 on the frame 1083 in the main scanning direction, and the productivity and easiness of maintenance of the optical scanning apparatus 1008 is improved significantly.

Further, it should be noted that the optical deflector 1081 is mounted upon the frame 1083 in the state that a part of the optical deflector 1081 is located outside the region defined by the side places 1064 and 1064 in the main scanning direction, and hence outside of the frame 1083. Thus, the separation in the main scanning direction between the side plates 1064 and 1064 supporting both ends of the mirrors 1090, 1092 and 1093 and substantially supporting both ends of the toroidal lens 1091, is reduced as compared with the width of the optical deflector 1081 in the main scanning direction, while this means that it becomes possible to reduce the overall size of the optical scanning apparatus 1008 while using the side plates 1064 and 1064 of low cost metal plate and that deviation of scanning position of the optical beam L caused by vibration such as banding of the mirrors 1090, 1092, 1093 and the toroidal lens 1091 is suppressed. Thereby, high quality image formation is achieved by maintaining high precision scanning over prolonged time period.

Further, with regard to the size reduction, it should be noted that the optical deflector 1081 holds only the minimum number of scanning lenses 1088 and 1089 located closest to the polygonal mirror 1094 in the optical path of the optical beam L, among the optical elements 1088, 1089, 1090, 1091, 1092 and 1093. Because the optical deflector 1081 has already a compact size, the overall size of the optical scanning apparatus 1008 is reduced significantly. Thereby, deviation of scanning position of the optical beam L caused vibration such as banding of the mirrors 1090, 1092, 1093 and the toroidal lens 1091 is suppressed, and high quality image formation is achieved by maintaining high precision scanning over prolonged time period.

Further, because the optical source units 1019*a* and 1019*b* are disposed in the part of the optical deflector 1081 exposed outside of the frame 1083, the optical source units 1019*a* and 1019*b* are located outside the region between the side plates 1064 in the main scanning direction, and hence outside of the frame 1083. Mainly, the substrates 1038*a* and 1038*b* are exposed at the outside of the frame 1083.

Thus, because the optical source units 1019*a* and 1019*b* are disposed such that a part thereof is exposed outside the frame 1083, it becomes possible to mount and dismount the optical source units 1019*a* and 1019*b* freely with respect to the frame 1083 or the optical deflector 1081 without decomposing the frame 1083 or the optical deflector 1081. Because the substrates 1038*a* and 1038*b* are thus exposed, the connector connections to the laser diodes 1141*a*, 1142*a*, 1141*b* and 1142*b* is facilitated substantially, and the productivity of manufacturing the image formation apparatus is improved significantly. In addition, the substrates 1038*a* and 1038*b* provide no restriction in the arrangement of the mirrors 1090, 1092, 1093 or the toroidal lens 1091, and the degree of freedom of design is improved significantly.

It should be noted that mounting of the mirrors 1090, 1092 and 1093 on the side plates 1064 and 1064 is achieved similarly as explained with reference to FIGS. 5A and 5B and the description thereof will be omitted. In FIG. 5A it should be noted that the member 223 corresponds to the mirrors 1090, 1092 and 1093, while the members 266 and 267 correspond to the side plates 1064 and 1064.

While there occurs propagation of vibration along the side plates 1064 and 1064, the mirrors 1090, 1092 and 1093 held between the side plates 1064 and 1064 in the vertical direction of the side plates 1064 and 1064, the mirrors 1090, 1092 and 1093 is less susceptible to the vibration, and the problem of deviation of scanning position of the optical beam L is suppressed successfully by suppressing vibration such as banding. Thereby, high quality image formation becomes possible. This applies also to the toroidal lens 1091.

As shown in FIG. 25, the toroidal lens 1091 is supported by the side plates 1064 and 1064 via a support mechanism 1103 of the toroidal lens 1091.

Figure 26:
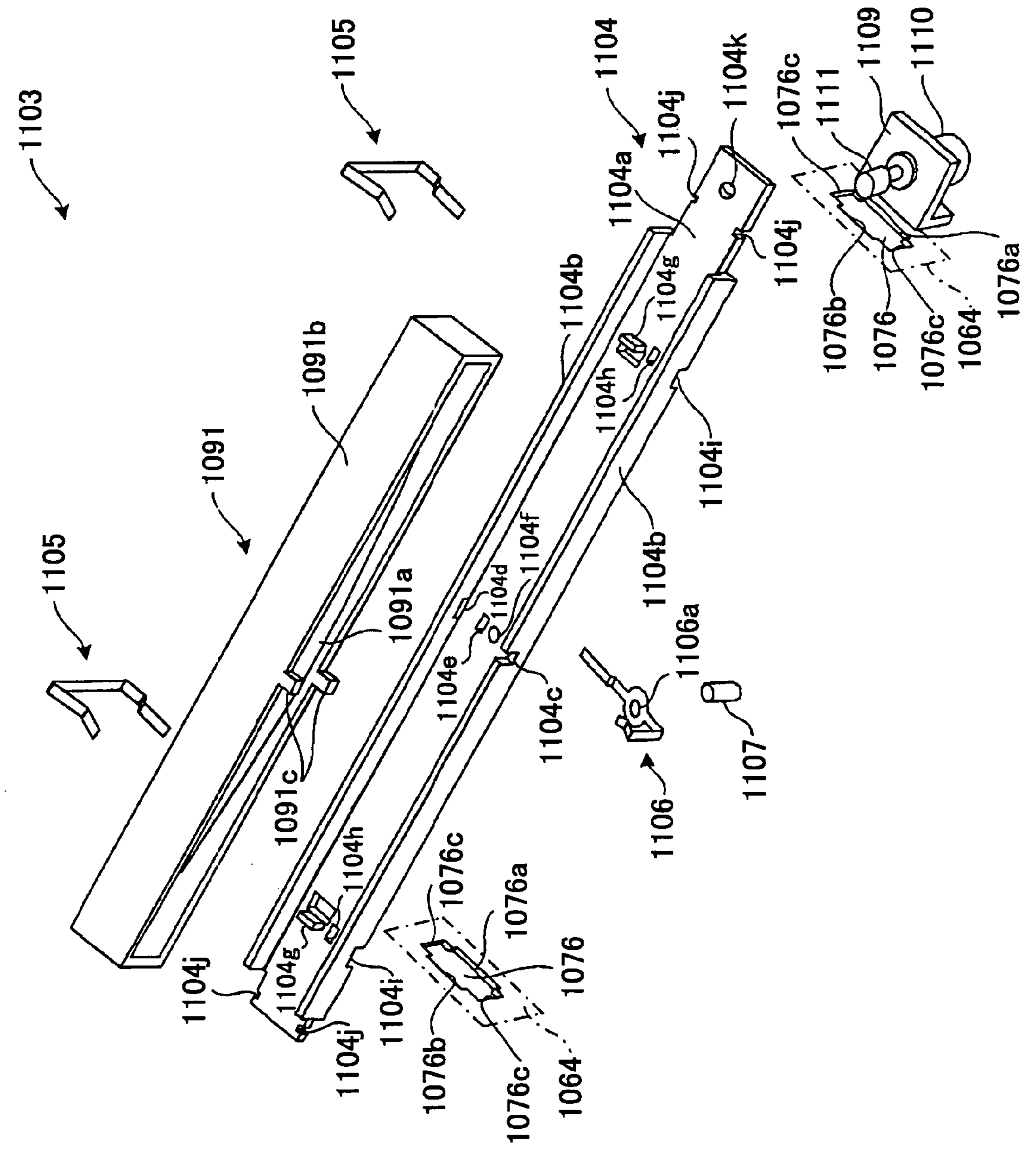
FIG. 26 is an exploded oblique view diagram of the positioning means shown in FIG. 18.

As shown in FIG. 25 or 26, the toroidal lens 1091 includes a lens part 1091*a* having a coaxial non-spherical surface and a toroidal surface and a rib part 1091*b* formed integral with the lens part 1091*a* so as to cover the lens part 1091*a*. The rib part 1091*b* has positioning projections 1091*c* and 1091*c* formed centrally to the rib part in the scanning direction in the state the toroidal lens 1091 is mounted upon the optical scanning apparatus 1008 (referred to hereinafter simply as main scanning direction).

The support mechanism 1103 includes a rib part 1091*b*, holes 1076 and 1076, a support plate 1104 acting as a supporting case body of the toroidal lens 1091, a pair of leaf springs 1105 and 1105 used as an unrig member engaging with respective ends of the toroidal lens 1091 and urging the toroidal lens 1091 to the support plate 1104, a leaf spring 1106 engaging with the toroidal lens 1091 at the central part thereof in the main scanning direction and urging the toroidal lens 1091 in the direction shown by an arrow F1 in FIG. 25, a screw 1107 used as an adjusting screw engaging at the central part of the rib 11091*b* from the downward direction, a leaf spring 1108 identical to the leaf springs 1101 and 1101, an L-shaped bracket 1109 jointed to the outside of one of the side plates 1064 and 1064, a stepping motor 1110 attached to the bracket 1109 movably in the sub scanning direction, and a screw driven by a stepping motor 1110.

The support plate 1104 is made of a metal plate and is shaped to have a U-shaped form.

The support plate 1104 includes a bottom part 1104*a*, bent pert 1104*b* and 1104*b* formed at both lateral edges of the bottom part 1104*a* so as to extend upward therefrom, a cutout 1104*c* provided centrally to one of the bent parts 1104*b* and 1104*b* in the main scanning direction in the form of a depression, an opening 1104*d* formed in the other bent part 1104*a*, an opening 1104*c* formed centrally to the bottom part 1104*a* in the main scanning direction so as to be inserted with the leaf spring 1108, and a threaded hole 1104*f* provided in the vicinity of the opening 1104*e* of the bottom part 1104*a* for being screwed with the screw 1107.

Further, the support part 1104 includes up-bent parts 1104*g* and 1104*g* respectively provided at relatively marginal parts of the bottom part 1104*a* in the main scanning direction for engagement with the respective end parts of the rib part 1091*b*, openings 1104*h* and 1104*h* formed respectively on the bottom part 1104*a* in the vicinity of the up-bent parts 1104*g* and 1104*g* for insertion of the leaf springs 1105 and 1105, and openings 1104*i* and 1104*i* formed in the bent part 1104*b* carrying the cutout 1104*c* in the vicinity of the up-bent parts 1104*g* and 1104*g* and the openings 1104*h* and 1104*h* for insertion of the leaf springs 1105 and 1105.

Further, the support plate 1104 includes cutouts 1104*j* and 1104*j* formed at both lateral edges thereof at both end parts of the bottom part 1104*a* for engagement with the holes 1076 and 1076, and a screw hole 1104*k* at an end of the bottom part 1104*a* formed in the side where the stepping motor 1110 is provided for engagement with a lead screw 1111 of the stepping motor 1110. The leaf spring 1106 is provided upon the support plate 1104 as a part thereof and has a hole 1106*a* communicating with the hole 1104*f*, wherein the hole 1106*a* and the hole 1104*f* form a hole screwed in with the screw 1107.

By using such a support mechanism 1103, the toroidal lens 1091 is integrated into the support plate 1104 as follows.

The projection 1091*c* is engaged with the cutout 1104*c*, and the bottom surface of the rib part 1091*b* is engaged with the tip end parts of the up-bent parts 1104*g* and 1104*g* for positioning the toroidal lens 1091 with regard to the support plate 1104. In this state, the toroidal lens 1091 and the support plate 1104 re stacked.

Further, the respective ends of the leaf springs 1105 and 1105 are inserted into corresponding openings 1104*h* and 1104*h* such that the leaf springs 1105 and 1105 are located between the support plate 1104 and the bottom surface of the rib part 1091*b*, in such a manner that the respective the other ends thereof are extended to the outside through the openings 1104*i* and 1104*i*. Further, the other ends of the leaf springs 1105 and 1105 are engaged with the top surface of the rib part 1091*b*, and with this, the toroidal lens 1091 is urged toward the support plate 1104. Thereby, the leaf springs 1105 and 1105 are fitted about the toroidal lens 1091 in such a state that the tip ends of the up-bent parts 1104*g* and 1104*g* engage positively at the bottom surface of the rib part 1091*b*.

Further, an end of the leaf spring 1106 is inserted into the opening 1104*e* in such a manner that the leaf spring 1106 is held between the support plate 1104 and the bottom surface of the rib part 1091*b*. Thereby, the foregoing end is inserted to the opening 1104*d* such that the foregoing end is projected to outside. Further, the openings 1014*f* and 1106*a* are communicated with each other, and the screw 1107 is screwed upon the openings 1014*f* and 1106*a* in the state that the tip end of the screw 1107 engages with the bottom surface of the rib part 1091*b*. Further, the other end of the leaf spring 1106 is engaged with the top surface of the rib part 1091*b*, such that the toroidal lens 1091 is urged toward the support plate 104. Thereby, the leaf spring 1106 is fitted and the tip end of the screw 1107 engages positively at the bottom surface of the rib part 1091*b*.

It should be noted that the toroidal lens 1091 has an elongated shape and thus low rigidity. Thereby, the toroidal lens 1091 easily causes deformation or warp with small stress such as the thermal stress caused by variation of the environmental temperature. Thereby, there is caused a problem of curve of scanning line caused by curve of the base line in the sub scanning direction as shown in FIG. 25 by the reference numeral 1102. In the present embodiment, on the other hand, the linearity of the base line 1102 of the toroidal lens 1091 in the sub scanning direction is maintained by stabilizing the shape of the toroidal lens 1091 by integrating the support plate 1104 to the toroidal lens 1091 such that the toroidal lens 1091 is extended along the support plate 1104, even in the case localized stress is applied to the toroidal lens 1091.

By using such a support mechanism 1103, the toroidal lens 1091 is supported by the side plates 1064 and 1064 in the state that the toroidal lens 1091 is mounted upon the support plate 1104 and in the state that the support plate 1104 is integrated with the side plates 1064 and 1064 as explained below.

More specifically, the bottom surface 1104*a* of the support plate 1104 is abutted to edges 1076*a* and 1076*a* of the holes 1076 and 1076 on the side plates 1064 and 1064, and cutouts 1104*j* and 1104*j* are engaged with side edges 1076*c* and 1076*c* of the holes 1076 and 1076. Further, wedge shaped leaf springs 1108 and 1108 are inserted between the upper edges of the bottom surface and edges 1076*b* and 1076*b* opposing the edges 1076*a* and 1076*a* from outside the side plates 1064 and 1064 similarly to the leaf springs 1101 and 1101 explained above, and the support plate 1104 is fixed upon the side plates 1064 and 1064 by engaging the not illustrated cutouts formed on the leaf springs 1108 and 1108 with the side edges 1076*c* and 1076*c*.

With the support mechanism 1103 of such a construction, the toroidal lens 1091 is supported between the side plates 1064 and 1064 and the lead screw is engaged with the screw hole 1104.

Thereby, the toroidal lens 1091 supported by the side plates 1064 and 1064 is rotated or tilted about the edge 1076*a* in the plane generally perpendicular to the optical axis of the optical beam L upon back and forth movement of the lead screw with forward and backward rotation of the stepping motor 1110. With this, the base line 1102 of the toroidal lens in the sub scanning direction is tilted, and there is caused a tilting of the scanning line formed at the imaging position of the toroidal lens 1091.

Here, it should be noted that occurrence of backlash at the lead screw is prevented by urging the lead plate 1104 toward the edge 1076*a* by the leaf spring 1108.

Thus, the support mechanism 1103 determines the position of the toroidal lens 1091 at one end part thereof in the main scanning direction at the edge 1076*a* of the hole 1076 formed on one of the side plates 1064 that carries thereon the stepping motor 1110, and holds the toroidal lens 1091 at the edge 1076*a* movably in the plane generally perpendicular to the optical axis of the optical beam L. Further, the support mechanism 1103 corresponding to the toroidal lens 1091BK is not equipped with the bracket 1109, the stepping motor 1110 and the lead screw 1111, and thus, the support mechanisms 1103 for the toroidal lenses 1091Y, 1091M and 1091C are used to adjust the inclination of the scanning line of the respective colors with reference to the scanning line for the black color.

Further, it should be noted that the toroidal lens 1091 is supported at the both ends thereof in the main scanning line by the tip end of the up-bent parts 1104*g* and 1104*g* and at the central part by the tip end of the screw 1107, and thus, it is possible to adjust the curving shape of the toroidal lens 1091 in the sub scanning direction, and hence the curving shape thereof as viewed from the optical axis direction of the optical beam L, by adjusting the screw 1107. Thus, the support mechanism 1103 has also the function of positioning adjustment means performing the function of the bend adjustment means that determines the central position of the toroidal lens 1091 in the main scanning direction.

The support mechanism 1103 is used as the positioning means as follows.

In the case the projecting amount of the screw 1107 is not sufficient for the height of the up-bent parts 1104*g* and 1104*g*, the base line is curved in the downward direction at the central part thereof, while in the case the projection amount of the screw 1107 exceeds the height of the up-bent parts 1104*g* and 1104*g*, the base line 1102 is bent in the upward direction at the central part thereof. Thus, by adjusting the amount of projection of the screw 1107 with regard to the height of the up-bent parts 1104*g* and 1104*g*, the focusing line of the toroidal lens 1091 is curved in the sub scanning direction, and the curve of the scanning line is compensated for.

As already noted, the curve of the scanning line is caused by oblique incidence of the optical beam L into the deflection facets 1094*a* and 1094*b*, and thus, the present embodiment provides the support mechanism 1103 for all of the stations as the positioning means for achieving alignment in direction and amount of the curve of the scanning lines, by curving the toroidal lenses 1091Y, 1091M, 1091C and 1091BK so as to cancel out the difference of curving between the stations.

Figure 27:
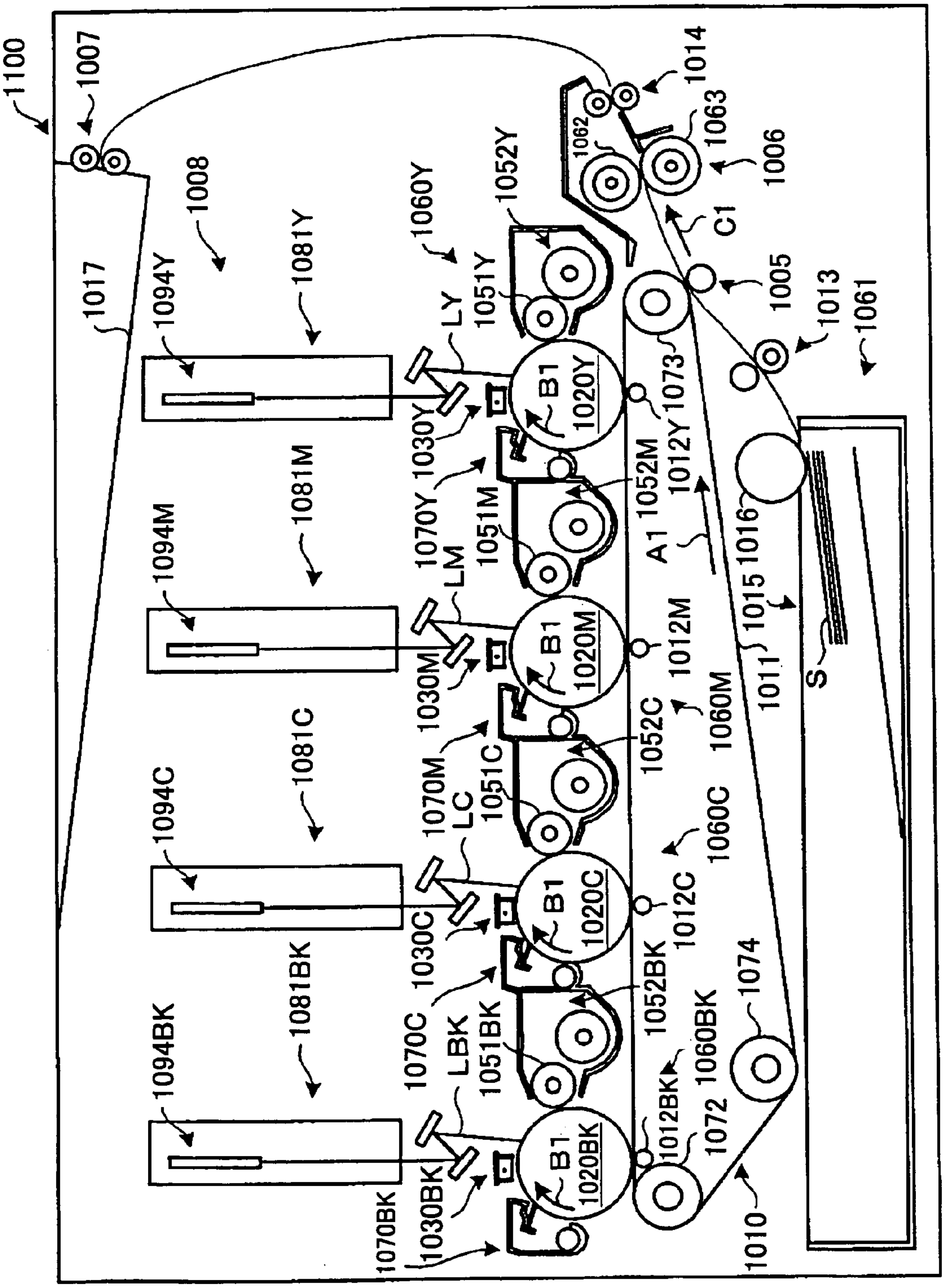
FIG. 27 is a schematic front view diagram of another image forming apparatus to which the present invention is applied.

While there has been disposed only one optical deflector 1081 for the optical scanning apparatus 1008 and the photosensitive drums 1020Y, 1020M, 1020C and 1020BK, the optical deflector 1081 may include four such optical deflectors 1081 for the optical scanning apparatus 1008 respectively in correspondence to the photosensitive drums 1020Y, 1020M, 1020C and 1020BK as shown in FIG. 27. Referring to FIG. 27, it should be noted that there are provided optical deflectors 1081Y, 1081M, 1081C and 1081BK respectively producing optical beams LY, LM, LC and LBK.

Hereinafter, explanation will be made with regard to the difference over the construction in which only one optical deflector 1081 is provided in the optical scanning apparatus 1008 for the photosensitive drums 1020Y, 1020M, 1020C and 1020BK will be explained with reference to FIGS. 27-29. Those parts constructed similarly to the corresponding parts explained previously are designated by the same reference numerals, and the description thereof will be omitted. In FIG. 27, it should be noted that the illustration of the frame 1083 is omitted.

Figure 28:
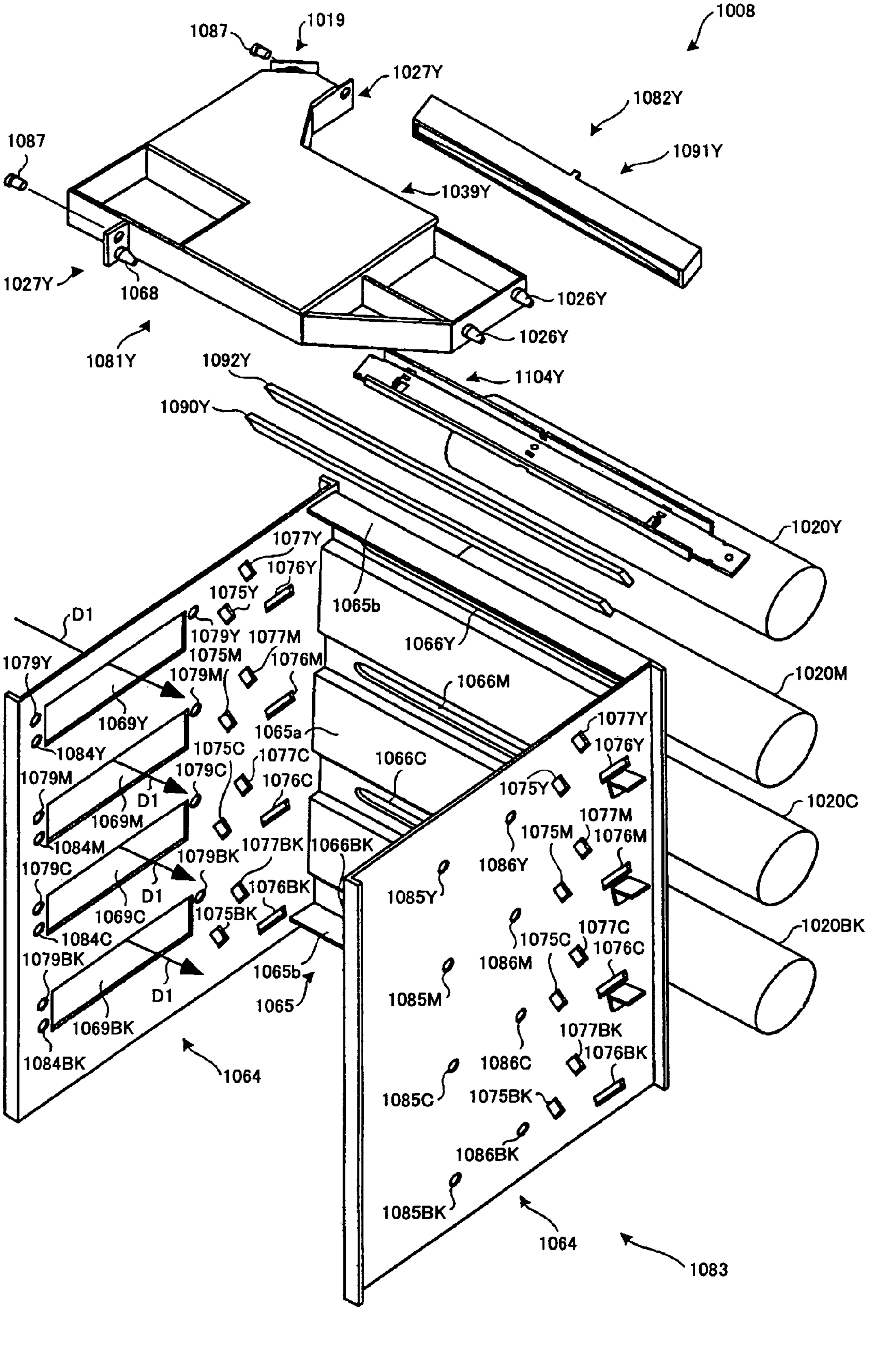
FIG. 28 is an exploded oblique view diagram showing a part of the optical scanning apparatus used in the image forming apparatus of FIG. 27.
Figure 29:
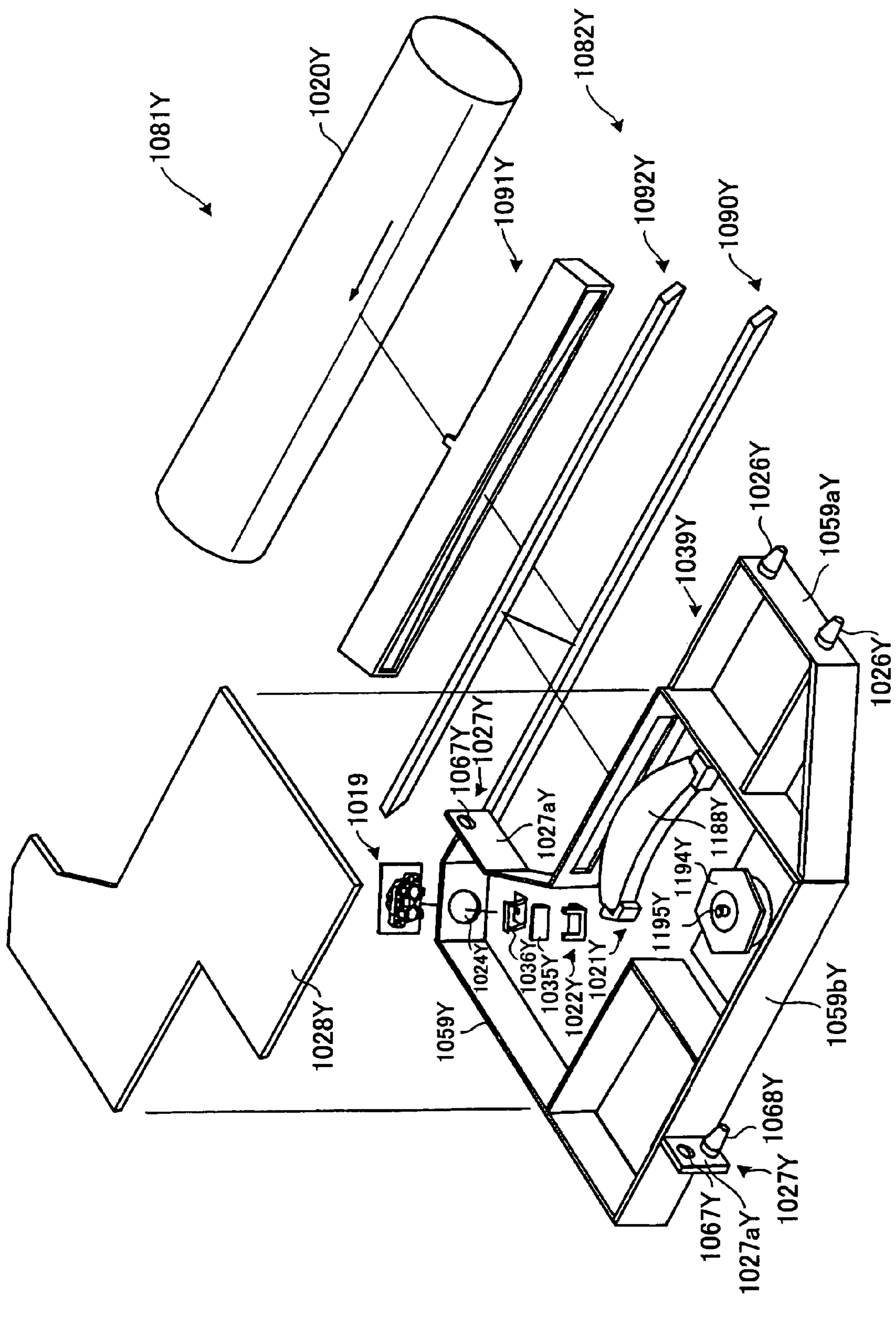
FIG. 29 is an exploded oblique view diagram showing the internal structure of the optical deflector used in the optical scanning apparatus of FIG. 27 together with the positional relationship between the optical deflector, the plural optical elements and the plural image carriers.

In the present embodiment, the optical deflectors 1081Y, 1081M, 1081C and 1081BK have generally the same construction, and thus, FIGS. 28 and 29 show only the optical deflector 1081Y. Further, those parts of the optical deflector 1081Y constructed identically with the optical deflector 1081 are designated by the same reference numerals except that the letter Y is attached at the end, and description thereof will be omitted.

Further, the optical deflectors 1081Y, 1081M, 1081C and 1081BK include only one optical source unit having the construction identical with those of the optical source units 1019*a* and 1019*b* used in the previous embodiment, and thus the description thereof will be omitted by designating the same by simply the numeral 1019 in FIGS. 28 and 29.

It should be noted that the scanning and imaging optical systems 1082Y, 1082M, 1082C and 1082BK are entirely independent. Because the scanning an imaging optical systems 1082Y, 1082M, 1082C and 1082BK have generally the same construction, only the scanning and imaging optical system 1082Y will be represented as a representative example in FIGS. 28 and 29.

The polygonal mirror 1194Y is a six-facet mirror in which all six deflection facets are parallel to the sub scanning direction.

The optical beam emitted from the optical source unit 1019 has a beam diameter smaller than the deflection facet of the polygonal mirror and moves over the deflection facet with the rotation of the polygonal mirror 1019. Thus, the optical deflector 1081Y forms a so-called under field optical system.

The scanning and imaging optical system 1082Y have a scanning lens 1188Y. The scanning lens 1188Y has a single layer construction and has coaxial non-spherical surfaces at the incident surface and the exit surface, wherein both the incident surface and the exit surface are parallel to the sub scanning direction.

The optical beam LY is emitted from the optical source unit 1019 at the height coincident to the height of the optical axis of the cylindrical lens 1035Y and the scanning lens 1188Y, and the optical beam LY causes scanning in the plane perpendicular to the shaft 1195 of the polygonal mirror 1194Y.

There is no construction corresponding to the rib 1023, leaf spring 1034 or mirror 1037 and the optical beam LY passed through the cylindrical lens 1035Y is directly supplied to the polygonal mirror 1194Y.

It should be noted that the scanning and imaging optical system 1082Y includes a scanning lens 1188Y formed by a fθ lens and used as an imaging lens, a first mirror 1090Y used as a reflection member reflecting the optical beam LY passed through the scanning lens 1188Y in the downward direction, a second mirror 1092Y deflecting the optical beam LY reflected by the mirror 1090Y in the upward direction, and a toroidal lens 1091Y used as an imaging lens processing the optical beam LY reflected by the mirror 1090Y, wherein the optical beam LY passed through the toroidal lens 1091Y scans over the photosensitive drum 1020Y.

In this embodiment, too, the optical deflector 1081 is positioned by engaging the housing 1039 to the side plates 1064 and 1064 in the main scanning direction without decomposing the side plates 1064 and 1064, and thus maintaining the arrangement of the side plates 1064 and 1064. Thereby, the optical deflector 1081 is positioned precisely with regard to the main scanning direction and the scanning position of the optical beam L is maintained precisely over a long time. Thereby, high quality image formation becomes possible. Further, the optical deflector 1081 is removable in the main scanning direction with respect to the frame 1083, and the productivity and easiness of maintenance is improved substantially.

Further, in view of the construction in which the housings 1039 of all the optical deflectors 1081 are positioned by causing engagement with respect to the side plates 1064 and 1064 all in the main scanning direction, the optical deflectors 1081 are disposed with high precision, the scanning positions are aligned precisely for the optical beams L, and high quality image formation with no color misalignment is achieved even when there is a temperature change.

Further, because a part of the optical source unit 1019 is exposed to the outside of the frame 1083, it becomes possible to mount and dismount the optical source unit 1019 freely with regard to the frame 1083 or the optical deflector 1081 without decomposing the frame 1083 or the optical deflector 1081.

Particularly, it should be noted that the substrates 1038*a* and 1038*b* are exposed. Thus, connector connection of wiring harness to the laser diodes is facilitated, and the productivity of assembling the image forming apparatus is improved. Further, the substrates 1038*a* and 1038*b* brings in no restriction in the arrangement of the toroidal lenses 1091, and thus, the degree of freedom of design is improved similarly to the previous embodiment.

In the optical scanning apparatus 1008 and the image forming apparatus 1100 explained in the previous embodiment and in the present embodiment, it should be noted that the housing 1039 is used to hold both the deflection member and the optical elements. However, it is sufficient that the housing holds only the deflection member.

Further, the holding member 1064 may hold one or more optical elements or all of the optical elements.

The optical elements explained in the various embodiments heretofore as the toroidal lens is required to have the optical power at least in the main scanning direction.

Further, the side plates 1064 may hold the holding member such that at least a part of the holding member is located outside the region between the side plates 1064.

Further, the present invention is by no means limited to the embodiments described heretofore, but various variations and modifications may be made without departing from the scope of the invention.

The present invention is based on Japanese priority patent applications 2003-326836 and 2004-056771 respectively filed on Sep. 18, 2003 and Mar. 1, 2004, the entire contents of which are incorporated herein as reference.

What is claimed is:

1. An optical scanning apparatus, comprising:

a plurality of optical sources respectively configured to generate a plurality of optical beams respectively in correspondence to a plurality of image carrying bodies;

a deflection part configured to collectively deflect said plurality of optical beams emitted from said plurality of optical sources in a main scanning direction to cause main scanning for each of said plurality of optical beams;

a plurality of reflection elements respectively configured to direct said plurality of optical beams deflected by said deflection part to respective, corresponding one of said plural image carrying bodies;

a plurality of focusing elements respectively configured to focus said plurality of optical beams to respective, corresponding one of said plural image carrying bodies;

a holding member holding said plurality of reflection elements and said plurality of focusing elements, said holding member comprising a pair of holding member elements disposed so as to face each other in said main scanning direction, said plurality of reflection elements being held between said pair of holding member elements in contact engagement therewith in a bridged state, said plurality of reflection elements being positioned relative to each other as a result of direct engagement with said pair of holding member elements, wherein said plurality of optical sources and said deflection part are accommodated in a housing, and said housing is held between said pair of holding member elements in contact therewith.

2. The optical scanning apparatus as claimed in claim 1, wherein said reflection elements comprise a mirror.

3. The optical scanning apparatus as claimed in claim 1, further comprising a compartment member provided for each of said image carrying bodies and having an opening for allowing said optical beam to reach said corresponding image carrying body selectively.

4. An optical scanning apparatus as claimed in claim 1, wherein said pair of said holding member elements comprises a metal plate formed with cutout openings, and wherein said reflection elements are held between said pair of holding member elements in a state that reflection surfaces thereof are contacted with respective said cutout openings.

5. An optical scanning apparatus as claimed in claim 1, wherein said plurality of optical sources comprise a plurality of light emitting elements, said deflection part comprising an optical element provided commonly to said plurality of optical beams.

6. An optical scanning apparatus as claimed in claim 1, wherein said focusing elements comprise an imaging element focusing said optical beam incident to said image carrying body in a sub scanning direction perpendicular to said main scanning direction.

7. An optical scanning apparatus as claimed in claim 6, wherein said imaging element is held by a supporting member, said supporting member having an end supported on one of said holding member elements and the other end movable on the other holding member element and is rotatable in a plane perpendicular to an optical axis of said optical beam.

8. An optical scanning apparatus as claimed in claim 7, wherein said supporting member comprises a warp correction mechanism correcting a warp of said imaging element at least in said sub scanning direction.

9. An optical scanning apparatus as claimed in claim 1, wherein said housing is held between said pair of holding member elements, such that a part of said housing is located in a region defined by said pair of holding member elements.

10. An optical scanning apparatus as claimed in claim 9, wherein said housing is detachable with respect to said holding member elements in said main scanning direction.

11. An optical scanning apparatus as claimed in claim 10, wherein said housing is engaged upon said holding member elements and positioned thereto in said main scanning direction.

12. An optical scanning apparatus as claimed in claim 9, wherein said optical source is located outside said region when said housing is mounted upon said holding member elements.

13. An image forming apparatus, comprising:

a plurality of optical sources respectively configured to generate a plurality of optical beams respectively in correspondence to a plurality of image carrying bodies;

a deflection part configured to collectively deflect said plurality of optical beams emitted from said plurality of optical sources in a main scanning direction to cause main scanning for each of said plurality of optical beams;

a plurality of image carrying bodies written with an electrostatic latent image from said plurality of optical beams from said plurality of optical sources;

a plurality of developing parts developing said electrostatic images at respective image carrying bodies and forming toner images with colors corresponding to said image carrying bodies; and a transfer part for transferring said toner images of respective colors formed by said plural developing parts consecutively on a sheet such that said toner images are superimposed, said image forming apparatus further comprising:

a plurality of reflection elements directing said plurality of optical beams collectively deflected by said deflection part to a corresponding one of said plurality of image carrying bodies; and a holding member holding said plurality of optical elements, said holding member comprising a pair of holding member elements disposed so as to face each other in said main scanning direction, said plurality of reflection elements being held between said pair of holding member elements in contact engagement therewith in a bridged state, said plurality of reflection elements being positioned relative to each other as a result of direct engagement with said pair of holding member elements, wherein said plurality of optical sources and deflection part are accommodated in a housing, and said housing is held between said pair of holding member elements in contact therewith.

14. The image forming apparatus as claimed in claim 13, wherein each of said holding member elements carries a bearing member for positioning a bearing part of said plural image carrying bodies.

15. An image forming apparatus as claimed in claim 14, wherein an interval between said bearing parts of said plural image carrying bodies is set to be an integer multiple of a circumferential length of said image carrying body.

16. An image forming apparatus as claimed in claim 13, further comprising a beam irradiation position changing mechanism for each of said plurality of image carrying bodies for changing a beam irradiation position of said optical beam incident thereto, said beam irradiation position changing mechanism being adjusted with regard to said beam position such that a phase of toner images transferred to said sheet is aligned.

17. An optical scanning apparatus according to claim 1, wherein said holding member elements and said housing include protrusions and corresponding voids which are used to align said housing and wherein said protrusions are on said housing, and said voids are in said holding member elements.

18. An optical scanning apparatus as claimed in claim 17, wherein the protrusions are pins, and the voids are holes.

19. An image forming apparatus as claimed in claim 13, wherein said holding member element and said housing include protrusions and corresponding voids which are used to align said housing, and wherein said protrusions are on said housing, and said voids are in said holding member elements.

20. An image forming apparatus as claimed in claim 19, wherein the protrusions are pins, and the voids are holes.

* * * * *